US012626229B1

(12) United States Patent
Weber et al.

(10) Patent No.: US 12,626,229 B1
(45) Date of Patent: May 12, 2026

(54) DETERMINING REPAIR STATUS INFORMATION TO PROVIDE IN RESPONSE TO QUERIES WITH ASSOCIATED SOURCE TRACKING AND CONFIDENCE DATA

(71) Applicant: John Snow Labs, Inc., Lewes, DE (US)

(72) Inventors: Katherine G. Weber, Cleveland Heights, OH (US); David A. Cecchini, San Paulo (BR); Veysel Kocaman, Echt (NL); David Talby, Mercer Island, WA (US)

(73) Assignee: John Snow Labs, Inc., Lewes, DE (US)

( * ) Notice: Subject to any disclaimer, the term of this patent is extended or adjusted under 35 U.S.C. 154(b) by 0 days.

(21) Appl. No.: 19/067,790

(22) Filed: Feb. 28, 2025

(51) Int. Cl.
*G06F 16/901* (2019.01)
*G06Q 10/20* (2023.01)

(52) U.S. Cl.
CPC ......... *G06Q 10/20* (2013.01); *G06F 16/9024* (2019.01)

(58) Field of Classification Search
CPC ........................... G06Q 10/20; G06F 16/9024
See application file for complete search history.

(56) References Cited

U.S. PATENT DOCUMENTS

| | | | |
|---|---|---|---|
| 10,503,905 B1 * | 12/2019 | Misra | G06F 21/64 |
| 10,678,866 B1 * | 6/2020 | Ranganathan | G06F 40/197 |
| 10,733,566 B1 | 8/2020 | Chan et al. | |
| 11,940,986 B1 | 3/2024 | Kocaman et al. | |
| 11,971,891 B1 * | 4/2024 | Yu | G06F 16/9024 |
| 12,008,026 B1 | 6/2024 | Sanz et al. | |

(Continued)

FOREIGN PATENT DOCUMENTS

WO    2015031449 A1    3/2015

OTHER PUBLICATIONS

Colin Raffel et al., "Exploring the Limits of Transfer Learning with a Unified Text-to-Text Transformer", dated Jul. 28, 2020 and retrieved on Aug. 19, 2021 from https://arxiv.org/abs/1910.10683, 67 pages.

(Continued)

*Primary Examiner* — Jorge A Casanova
(74) *Attorney, Agent, or Firm* — VLP Law Group LLP; James A. D. White

(57) ABSTRACT

Techniques are described for performing automated operations related to identifying and using repair and maintenance status information for devices and/or other items or entities, such as summarizing and encoding incoming data, identifying specific encoded information in response to natural language queries, and using the identified repair and maintenance status information in further automated manners in some situations (e.g., to automatically initiate repair or maintenance actions on a particular computing device), along with determining, tracking and providing information about source(s) of data elements stored in the database, and determining, storing and providing information about confidence levels in current accuracy of associated stored data elements. For example, source information tracking may include generating and using a source tracking graph with nodes and edges representing the processing and data flow of incoming data as part of its categorization and encoding into groups of related data items of multiple types.

20 Claims, 18 Drawing Sheets

(56) References Cited

U.S. PATENT DOCUMENTS

| | | | | |
|---|---|---|---|---|
| 12,135,740 | B1 * | 11/2024 | Yu | G06F 16/3329 |
| 12,204,565 | B1 * | 1/2025 | Yu | G06F 16/9024 |
| 2007/0234270 | A1 * | 10/2007 | Cohen | H04L 67/34 |
| | | | | 717/100 |
| 2016/0232230 | A1 * | 8/2016 | Radivojevic | G06F 16/26 |
| 2017/0033971 | A1 * | 2/2017 | Radivojevic | H04L 41/22 |
| 2017/0090995 | A1 * | 3/2017 | Jubinski | G06F 9/5083 |
| 2017/0091885 | A1 * | 3/2017 | Randolph | G06Q 50/16 |
| 2018/0060487 | A1 | 3/2018 | Barkan et al. | |
| 2018/0322958 | A1 | 11/2018 | Kalafatis | |
| 2018/0330096 | A1 * | 11/2018 | Breindel | A63F 13/352 |
| 2018/0330110 | A1 * | 11/2018 | Nelson | G06Q 30/0601 |
| 2018/0357262 | A1 * | 12/2018 | He | G06F 16/285 |
| 2019/0050562 | A1 * | 2/2019 | Rhee | G06F 21/566 |
| 2019/0188308 | A1 * | 6/2019 | Simon | G06F 16/219 |
| 2020/0134024 | A1 | 4/2020 | Banisakher et al. | |
| 2020/0226164 | A1 | 7/2020 | Eifert et al. | |
| 2021/0118536 | A1 | 4/2021 | Katouzian et al. | |
| 2021/0319858 | A1 | 10/2021 | Reumann et al. | |
| 2023/0206193 | A1 * | 6/2023 | Deshpande | G06Q 20/389 |
| | | | | 705/39 |

OTHER PUBLICATIONS

Julio Bonis, "A cognitive search engine and question answering system using SparkNLP", dated Jul. 19, 2021 and retrieved on Aug. 19, 2021 from https://medium.com/@drbonis/a-cognitive-search-engine-and-question-answeringsystem-using-sparknlp-and-t5-b3902e5f7586, 18 pages.

Santhosh Hari, "Locality Sensitive Hashing for Similar Item Search", dated Jul. 5, 2018 and retrieved on Aug. 19, 2021 from https://towardsdatascience.com/locality-sensitive-hashing-for-music-search-f2f1940ace23, 12 pages.

SQuAD2.0—The Stanford Question Answering Dataset, retrieved on Jan. 24, 2022 from https://rajpurkar.github.io/SQuAD-explorer/, 39 pages.

Qiao Jin et al., "PubMedQA: A Dataset for Biomedical Research Question Answering", dated Sep. 13, 2019 and retrieved on Jan. 24, 2022 from https://arxiv.org/abs/1909.06146, 11 pages.

Emre Varol, "Creating Clinical Knowledge Graph by Spark NLP & Neo4j", dated Sep. 21, 2021, retrieved on Mar. 11, 2022 from medium.com/spark-nlp/creating-knowledge-graph-by-spark-nlp-neo4j-9d18706aa08b, 16 pages.

Veysel Kocaman et al., "Improving Clinical Document Understanding on COVID-19 Research with Spark NLP", dated Dec. 7, 2020, retrieved on Jan. 24, 2022 from https://arxiv.org/abs/2012.04005, 9 pages.

GPT-3, Wikipedia, retrieved on Oct. 16, 2021 from en.wikipedia.org/wiki/GPT-3, 9 pages.

OHDSI OMOP Common Data Model, retrieved on Oct. 14, 2021 from www.ohdsi.org/data-standardization/the-common-data-model/, 2 pages.

Spark NLP, retrieved on Mar. 11, 2022 from nlp.johnsnowlabs.com/, 14 pages.

Federico Fancellu et al., "Neural Networks for Negation Scope Detection", Proceedings of the 54th Annual Meeting of the Association for Computational Linguistics, Aug. 7-12, 2016, 10 pages.

* cited by examiner

Figure 2C:
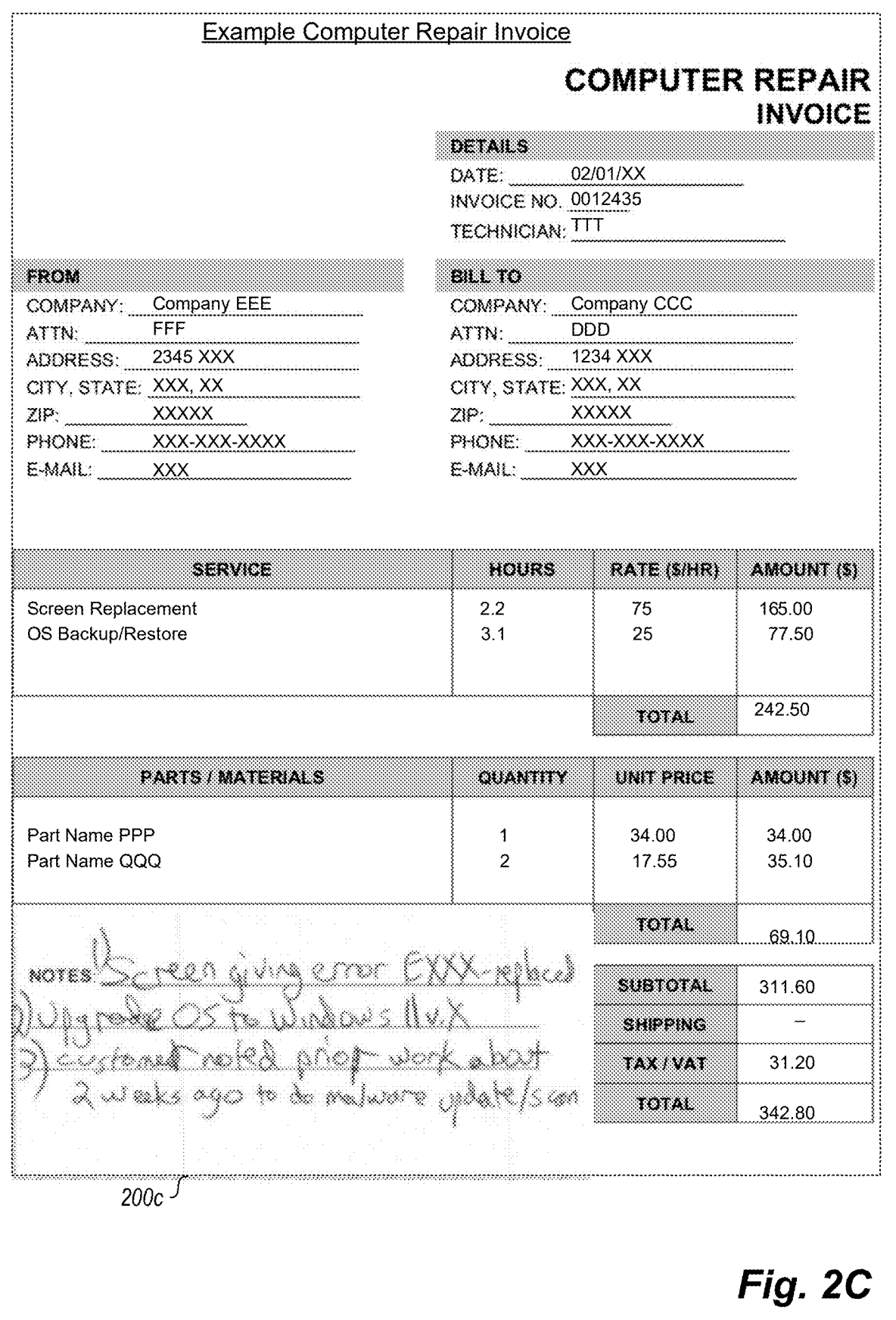

Example Computer Repair Invoice

COMPUTER REPAIR
INVOICE

DETAILS

DATE: _____ 02/01/XX _____

INVOICE NO. 0012435

TECHNICIAN: TTT

| FROM | | BILL TO | |
|---|---|---|---|
| COMPANY: | Company EEE | COMPANY: | Company CCC |
| ATTN: | FFF | ATTN: | DDD |
| ADDRESS: | 2345 XXX | ADDRESS: | 1234 XXX |
| CITY, STATE: | XXX, XX | CITY, STATE: | XXX, XX |
| ZIP: | XXXXX | ZIP: | XXXXX |
| PHONE: | XXX-XXX-XXXX | PHONE: | XXX-XXX-XXXX |
| E-MAIL: | XXX | E-MAIL: | XXX |

| SERVICE | HOURS | RATE ($/HR) | AMOUNT ($) |
|---|---|---|---|
| Screen Replacement | 2.2 | 75 | 165.00 |
| OS Backup/Restore | 3.1 | 25 | 77.50 |
| | | TOTAL | 242.50 |

| PARTS / MATERIALS | QUANTITY | UNIT PRICE | AMOUNT ($) |
|---|---|---|---|
| Part Name PPP | 1 | 34.00 | 34.00 |
| Part Name QQQ | 2 | 17.55 | 35.10 |
| | | TOTAL | 69.10 |

NOTES: 1) Screen giving error 6XXX - replaced
2) Upgrade OS to Windows 11vX
3) customer noted prior work about
2 weeks ago to do malware update/scan

| | |
|---|---|
| SUBTOTAL | 311.60 |
| SHIPPING | – |
| TAX / VAT | 31.20 |
| TOTAL | 342.80 |

Example Data Extraction and Linking

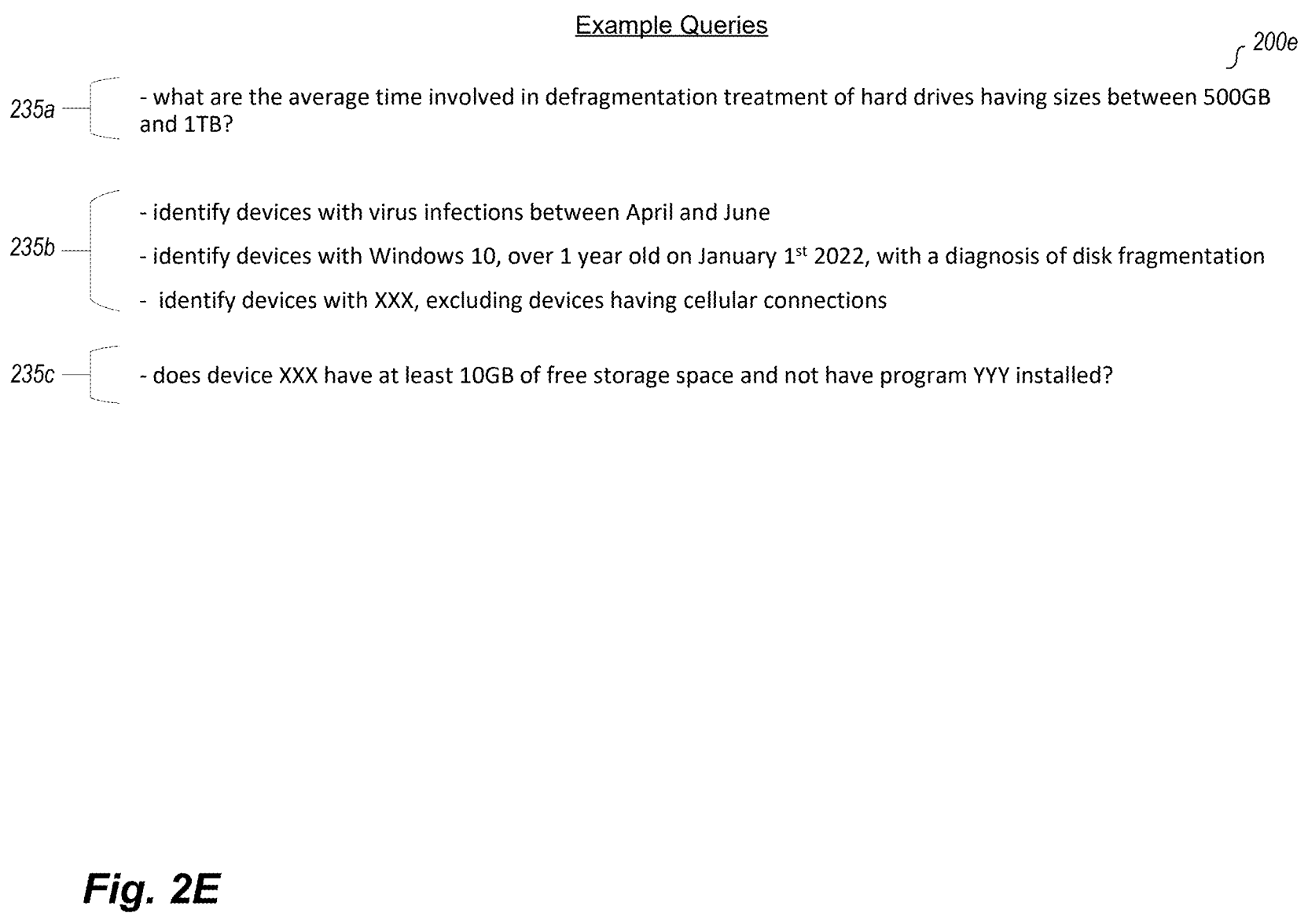

_200e

Example Queries

235a — what are the average time involved in defragmentation treatment of hard drives having sizes between 500GB and 1TB?

235b — identify devices with virus infections between April and June
— identify devices with Windows 10, over 1 year old on January 1st 2022, with a diagnosis of disk fragmentation
— identify devices with XXX, excluding devices having cellular connections 235c — does device XXX have at least 10GB of free storage space and not have program YYY installed?

Fig. 2E

Example Data Extraction and Linking

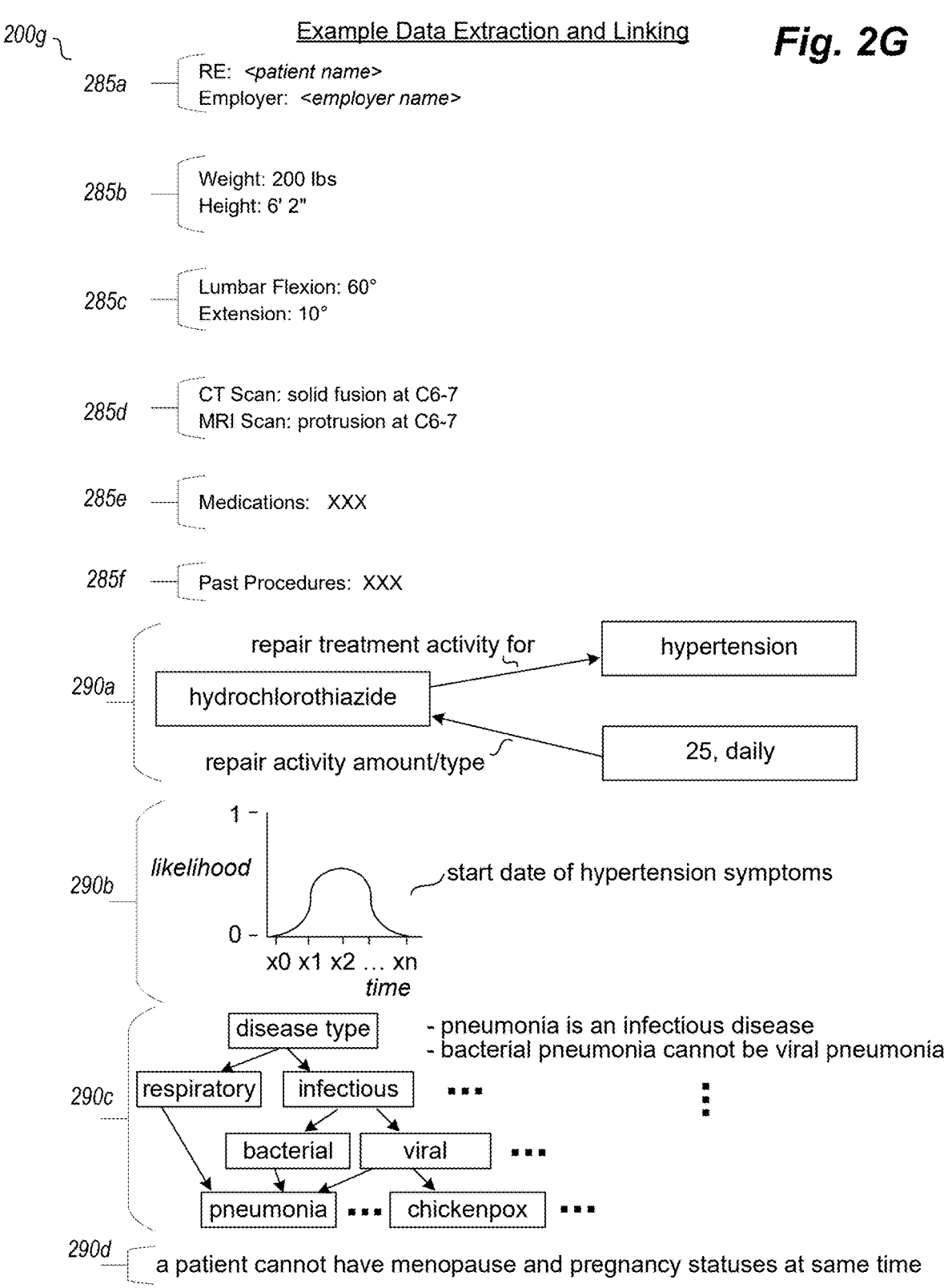

285a — RE: <patient name>
Employer: <employer name>

285b — Weight: 200 lbs
Height: 6' 2"

285c — Lumbar Flexion: 60°
Extension: 10°

285d — CT Scan: solid fusion at C6-7
MRI Scan: protrusion at C6-7

285e — Medications: XXX

285f — Past Procedures: XXX

290a repair treatment activity for hydrochlorothiazide → hypertension repair activity amount/type 25, daily 290b likelihood

1 –

0 – x0 x1 x2 … xn
time start date of hypertension symptoms

290c disease type respiratory    infectious    • • • bacterial    viral    • • • pneumonia  • • •  chickenpox  • • •

- pneumonia is an infectious disease
- bacterial pneumonia cannot be viral pneumonia

⋮

290d — a patient cannot have menopause and pregnancy statuses at same time

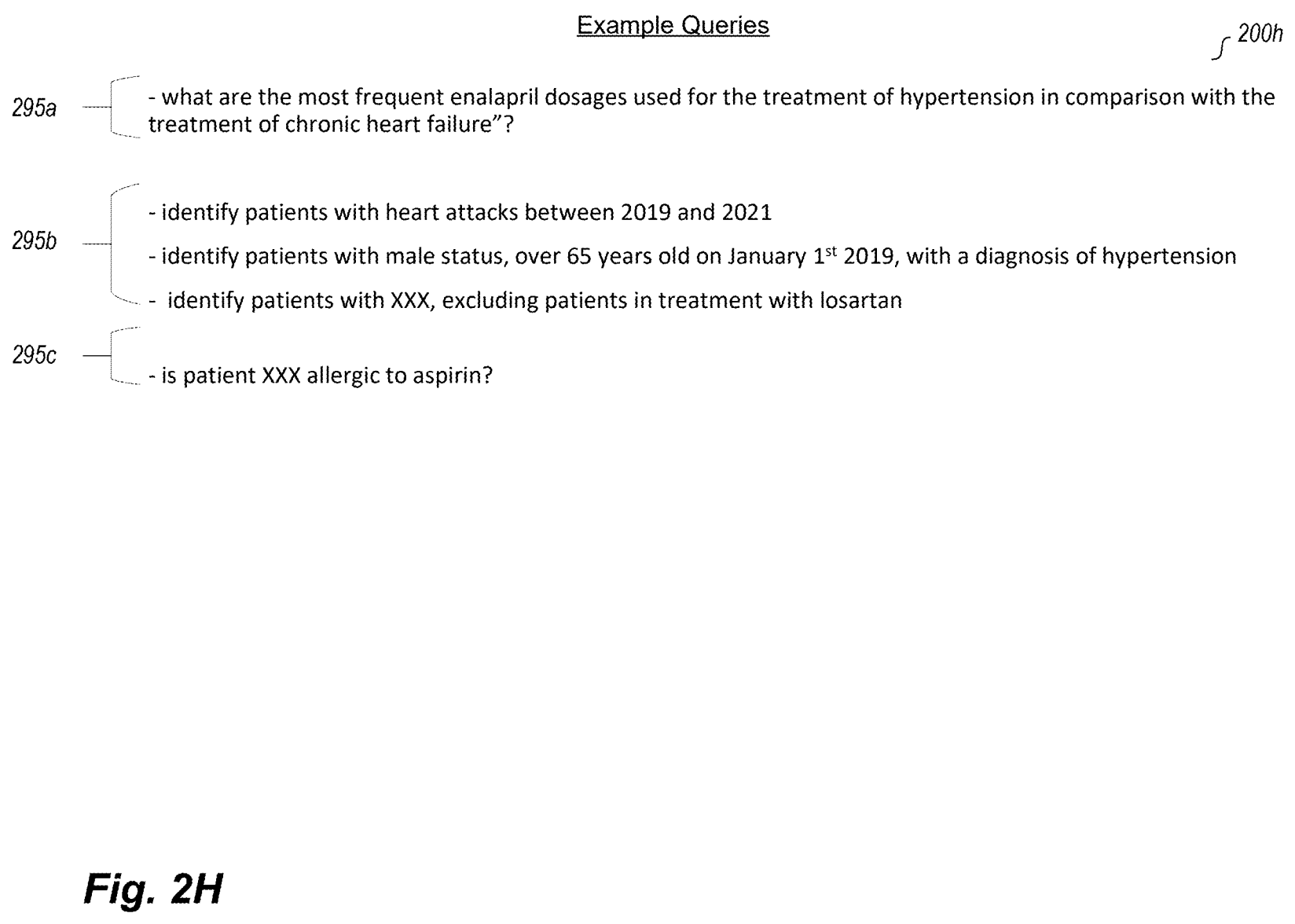

200h

Example Queries

295a
- what are the most frequent enalapril dosages used for the treatment of hypertension in comparison with the treatment of chronic heart failure"?

295b
- identify patients with heart attacks between 2019 and 2021
- identify patients with male status, over 65 years old on January 1st 2019, with a diagnosis of hypertension
- identify patients with XXX, excluding patients in treatment with losartan 295c
- is patient XXX allergic to aspirin?

Fig. 2H

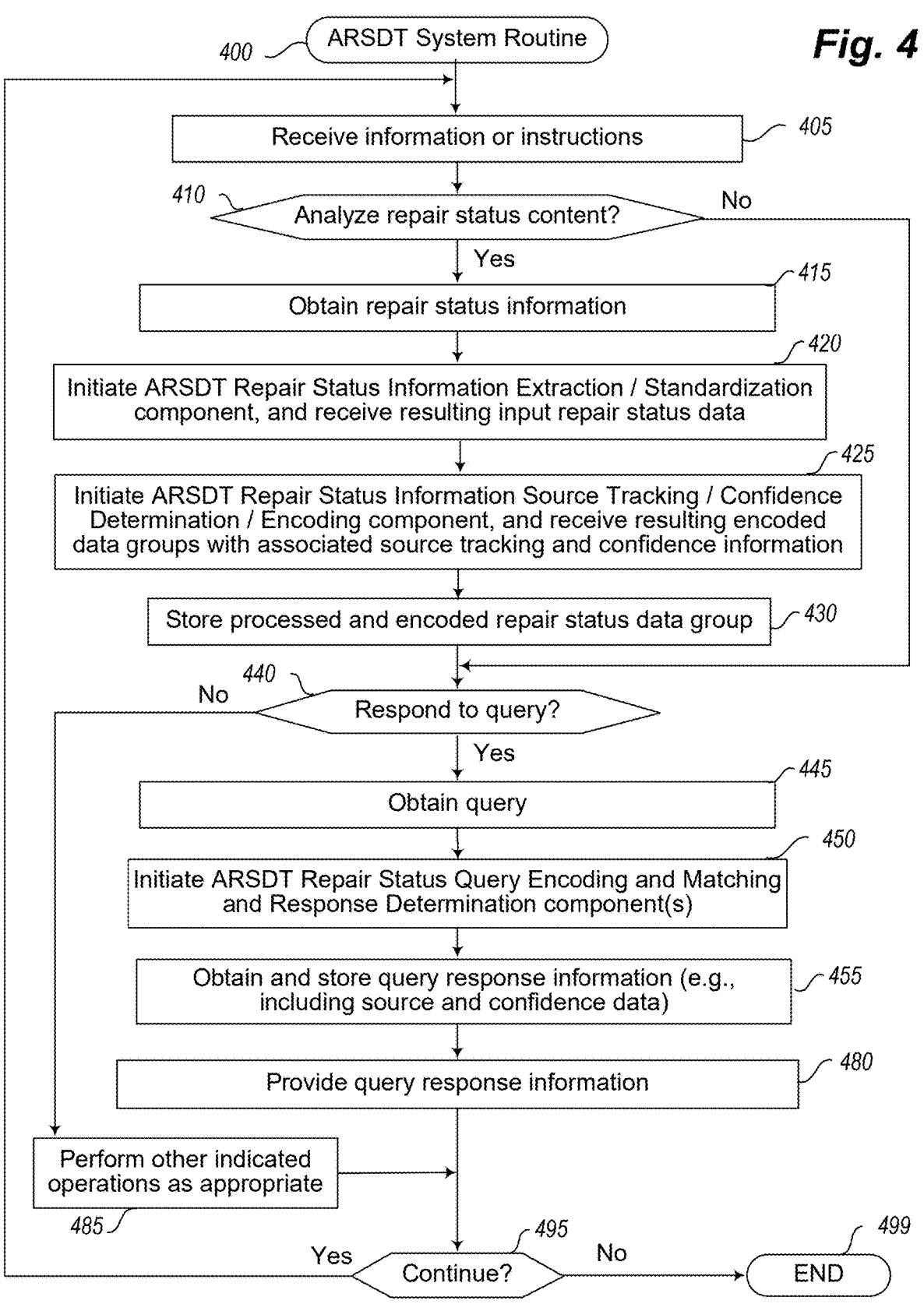

Fig. 4

400 — ( ARSDT System Routine )

Receive information or instructions — 405

410 — Analyze repair status content? — No

Yes

Obtain repair status information — 415

Initiate ARSDT Repair Status Information Extraction / Standardization component, and receive resulting input repair status data — 420

Initiate ARSDT Repair Status Information Source Tracking / Confidence Determination / Encoding component, and receive resulting encoded data groups with associated source tracking and confidence information — 425

Store processed and encoded repair status data group — 430

No   440 — Respond to query?

Yes

Obtain query — 445

Initiate ARSDT Repair Status Query Encoding and Matching and Response Determination component(s) — 450

Obtain and store query response information (e.g., including source and confidence data) — 455

Provide query response information — 480

Perform other indicated operations as appropriate

485 —

Yes   495   No

Continue?  → END — 499

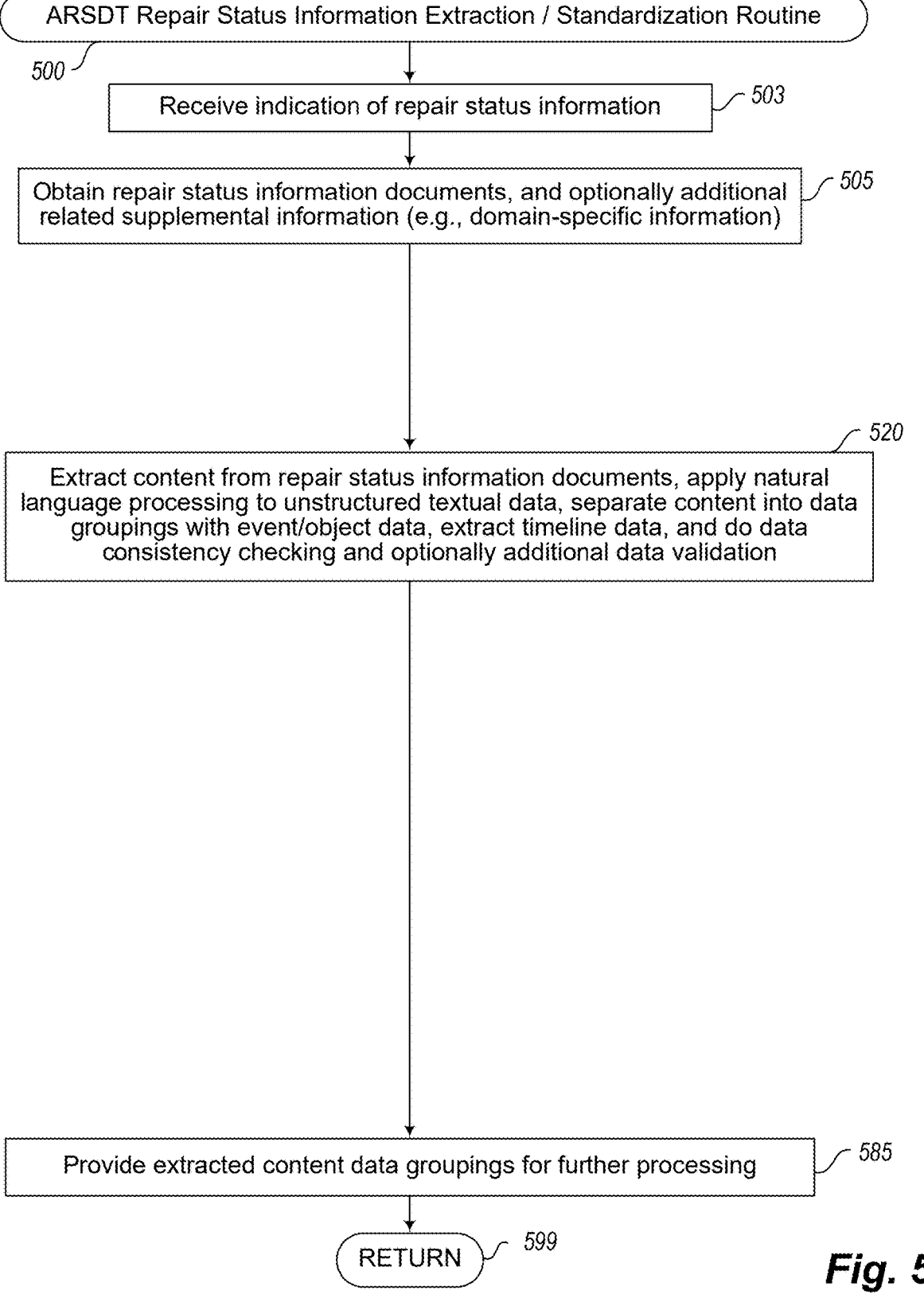

ARSDT Repair Status Information Extraction / Standardization Routine

500

Receive indication of repair status information ⟋ 503

Obtain repair status information documents, and optionally additional ⟋ 505
related supplemental information (e.g., domain-specific information)

⟋ 520

Extract content from repair status information documents, apply natural
language processing to unstructured textual data, separate content into data
groupings with event/object data, extract timeline data, and do data
consistency checking and optionally additional data validation Provide extracted content data groupings for further processing ⟋ 585

RETURN ⟋ 599

*Fig. 5*

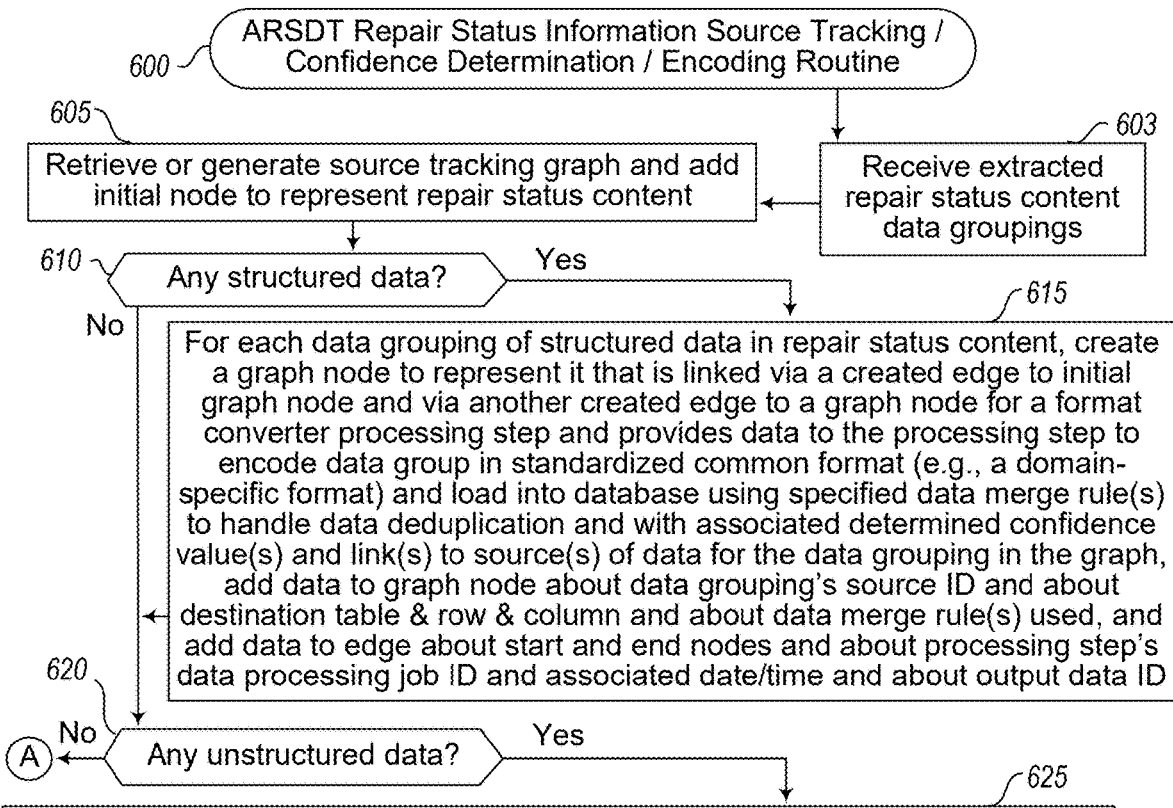

600 —( ARSDT Repair Status Information Source Tracking / Confidence Determination / Encoding Routine )

605 —

Retrieve or generate source tracking graph and add initial node to represent repair status content 603 — Receive extracted repair status content data groupings 610 —< Any structured data? >— Yes No 615 — For each data grouping of structured data in repair status content, create a graph node to represent it that is linked via a created edge to initial graph node and via another created edge to a graph node for a format converter processing step and provides data to the processing step to encode data group in standardized common format (e.g., a domain-specific format) and load into database using specified data merge rule(s) to handle data deduplication and with associated determined confidence value(s) and link(s) to source(s) of data for the data grouping in the graph, add data to graph node about data grouping's source ID and about destination table & row & column and about data merge rule(s) used, and add data to edge about start and end nodes and about processing step's data processing job ID and associated date/time and about output data ID

620 —

(A)◄— No <— Any unstructured data? >— Yes

625 — For each data grouping of unstructured data, provide data to a natural-language processing (NLP) processing step (if not already performed) to determine repair status data and any associated assertions and/or asserting entities, create a graph node to represent it that is linked via created edges to initial node via an intermediate node representing the NLP processing step, add data to graph node about data grouping's source ID and determined data from NLP processing step, and add data to each edge about its start and end nodes and to edge linked to created graph node about NLP processing step's data processing job ID and associated date/time and about output data ID For each data grouping of unstructured data, provide data from its graph node to a resolver processing step to associate a standardized code with a determined category of the repair status data, to determine confidence values in the determined category and in the code and in any associated assertions and/or relationships between data elements, and to create a new resolved data graph node linked via a created first edge to a node for the resolver processing step and via a created second edge to a database loader processing step, add data to resolved data graph node to include the determined information and data from the NLP processing (e.g., string of characters, start and end characters, etc.) and any assertions, and add data to each first and second edge about its start and end nodes and to each first edge about resolver processing step's data processing job ID and associated date/time and about output data ID

Fig. 6A     (B)   ⌐630     (C)——►( RETURN )⌐ 699

Fig. 6B

Ⓑ

*635*

For each data grouping of unstructured data, provide data from its resolved data graph node to database loader processing step to encode data group in standardized common format (e.g., a domain-specific format) and load into database using specified data merge rule(s) to handle data deduplication and with associated determined confidence value(s) and link(s) to source(s) of data for the data grouping in the graph, and add data to resolved graph node about destination table & row & column and about data merge rule(s) used

Ⓐ

*640*

Create graph nodes representing repair session ID and entity ID from extracted repair status content, provide the IDs to the database loader processing step to encode data in standardized format (e.g., a domain-specific format) and load into database with link(s) to source(s) of data for the IDs, and add data to each graph node about destination table & row & column

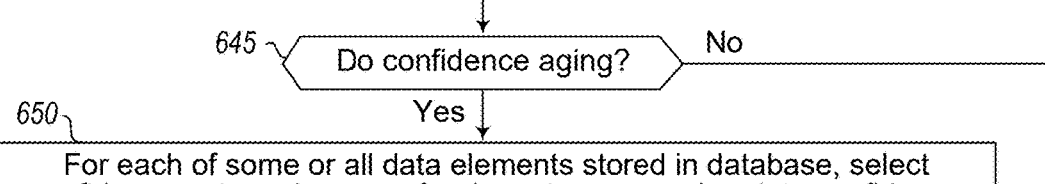

645 ⟍ Do confidence aging?    No

650 ⟍    Yes ↓

For each of some or all data elements stored in database, select confidence aging rule to use for data element, and update confidence value(s) for the data element in the database per the selected aging rule

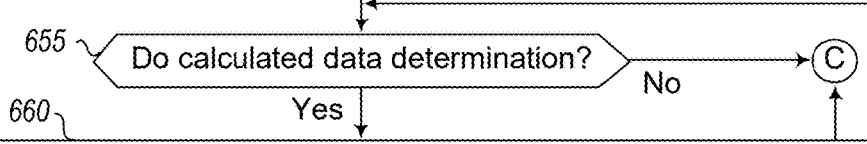

655 ⟍ Do calculated data determination?    No    Ⓒ

660 ⟍    Yes ↓

Retrieve information about one or more types of data to calculate and associated calculation rule(s); for each type of data to calculate, retrieve one or more types of input data to use in the calculation from the database (including associated confidence value(s)) and create an input graph node for each input data element (if not already created) and add the retrieved data of that type to that graph node and add created edges from the database to each input graph node with data about start and end nodes, create a calculation rule node (if not already created) with information about the calculation rule and add created edges from the input graph nodes to the calculation rule node with data about start and end nodes, generate the calculated data of that type with associated confidence value(s) using the calculation rule and the input data and create a calculated data node of that type (if not already created) with the calculated data and associated confidence value(s) and associated standardized code, provide calculated data to database loader processing step to encode data group in standardized common format (e.g., a domain-specific format) and load into database using specified data merge rule(s) to handle data deduplication and with associated determined confidence value(s) and link(s) to source(s) of data for the calculated data in the graph including the calculated data node, add data to the calculated data node about destination table & row & column and about data merge rule(s) used, and add data to created edge from calculated data node to database loader processing step node about calculation node's data processing job ID and associated date/time and about output data ID

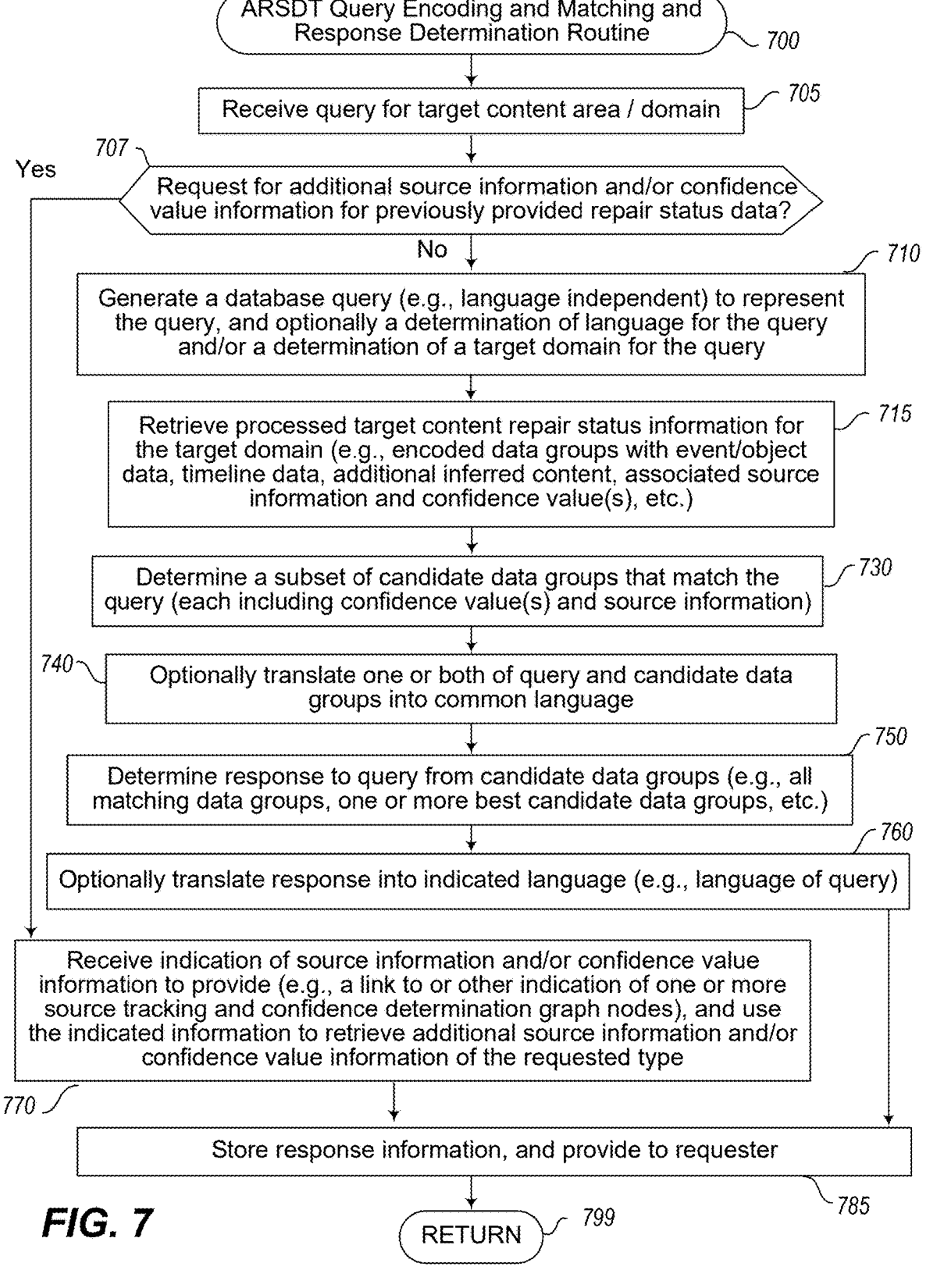

ARSDT Query Encoding and Matching and Response Determination Routine — 700

Receive query for target content area / domain — 705

707 — Yes — Request for additional source information and/or confidence value information for previously provided repair status data?

No ↓

Generate a database query (e.g., language independent) to represent the query, and optionally a determination of language for the query and/or a determination of a target domain for the query — 710

Retrieve processed target content repair status information for the target domain (e.g., encoded data groups with event/object data, timeline data, additional inferred content, associated source information and confidence value(s), etc.) — 715

Determine a subset of candidate data groups that match the query (each including confidence value(s) and source information) — 730

740 — Optionally translate one or both of query and candidate data groups into common language Determine response to query from candidate data groups (e.g., all matching data groups, one or more best candidate data groups, etc.) — 750

Optionally translate response into indicated language (e.g., language of query) — 760

Receive indication of source information and/or confidence value information to provide (e.g., a link to or other indication of one or more source tracking and confidence determination graph nodes), and use the indicated information to retrieve additional source information and/or confidence value information of the requested type

770

Store response information, and provide to requester — 785

RETURN — 799

FIG. 7

DETERMINING REPAIR STATUS INFORMATION TO PROVIDE IN RESPONSE TO QUERIES WITH ASSOCIATED SOURCE TRACKING AND CONFIDENCE DATA

TECHNICAL FIELD

The following disclosure relates generally to automated techniques for determining repair status information to provide in response to queries that is at least in part from analysis of unstructured textual repair data and that includes determined information about the source of and confidence in the provided response information, such as for use in automatically determining repairs of specific types that have been made to one or more computing devices or for other types of repair status information and for initiating further automated repair activities.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas. In addition, various other information is available via other communication mediums. However, existing search engines and other techniques for identifying information of interest suffer from various problems. Non-exclusive examples include a difficulty in identifying and using specific search terms in a useful manner, difficulty in finding answers specific to a particular topic of interest, receiving an overabundance of responses to a query that are too extensive to easily review and with many or most (or sometimes all) being only partially relevant or not relevant to the query (and that thus obscure relevant information if it actually is included in the responses), etc.

BRIEF DESCRIPTION OF THE DRAWINGS

FIGS. 2A-2I illustrate examples of performing described techniques, including automatically determining repair or maintenance status information to provide in response to queries for computing devices or other types of repair or maintenance status information.

FIG. 4 illustrates a flow diagram of an example embodiment of an Automated Repair Status Determination and Tracking ("ARSDT") system routine.

FIG. 5 illustrates a flow diagram of an example embodiment of an ARSDT Repair Status Information Extraction/Standardization component routine.

FIGS. 6A-6B illustrate a flow diagram of an example embodiment of an ARSDT Repair Status Information Source Tracking/Confidence Determination/Encoding component routine.

FIG. 7 illustrates a flow diagram of an example embodiment of an ARSDT Query Encoding and Matching and Response Determination component routine.

DETAILED DESCRIPTION

Figure 1A:
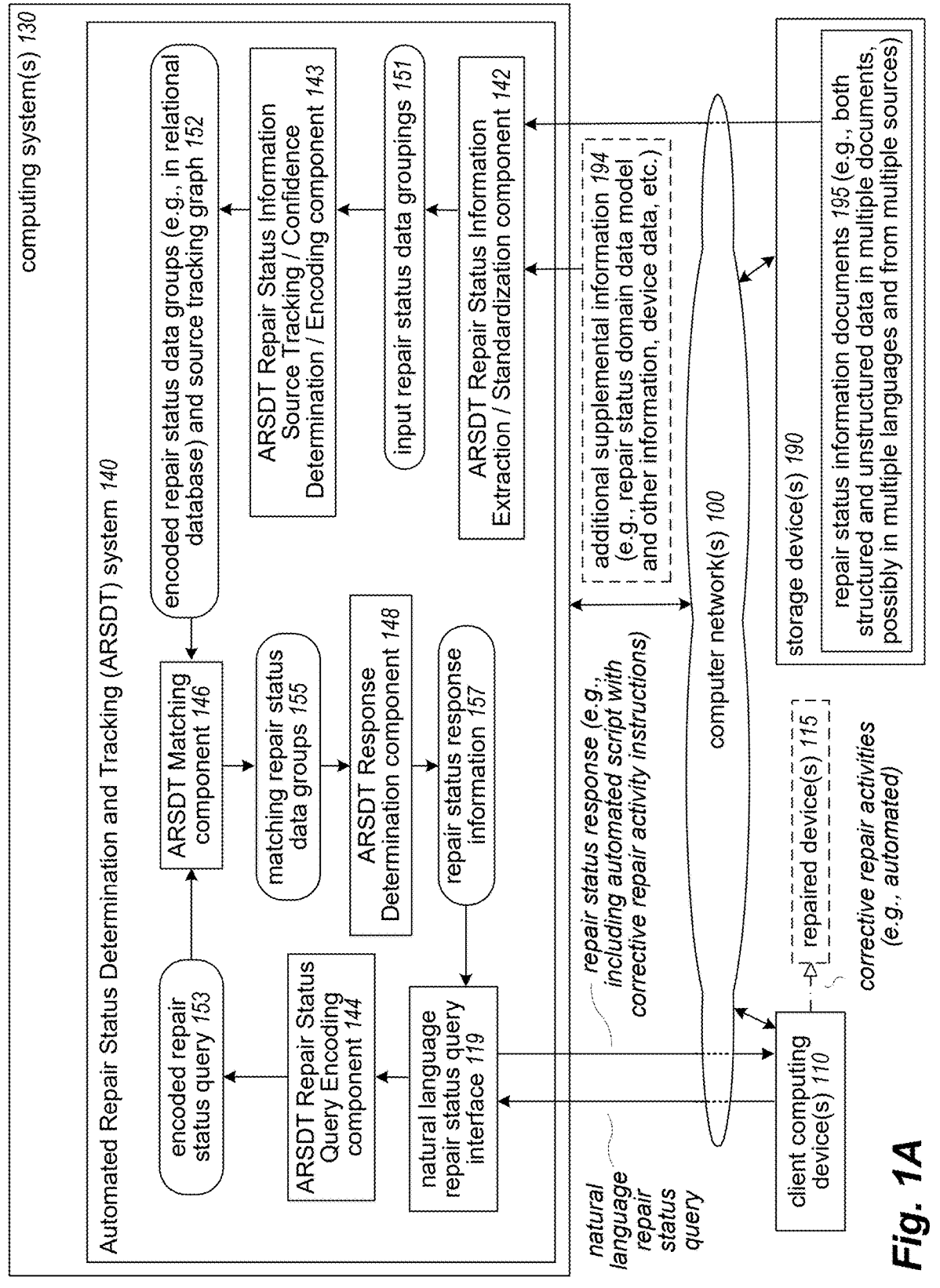
FIGS. 1A and 1B are network diagrams illustrating an example environment and a system for performing described techniques, including automatically determining repair or maintenance status information to provide in response to queries for computing devices or other types of repair or maintenance status information.

The present disclosure describes techniques for using computing devices to perform automated operations related to identifying and using repair and/or maintenance status information-such techniques may include, for example, summarizing and encoding information about repair and maintenance activities performed on a number of devices (e.g., of multiple types), determining specific repair and/or maintenance status information of one or more specified types in response to queries (e.g., natural language queries for one or more such devices that are identified based on those queries, such as a group of multiple devices that are otherwise unrelated and optionally of multiple types), and subsequently using the identified repair and/or maintenance status information in one or more further automated manners in some situations. In at least some embodiments, the identified status information about repair and/or maintenance activities relates to computing devices (e.g., computer systems, such as desktop computers, laptop computers, tablet computers, server computing systems, etc.; smart phones; etc.), with the identified repair and/or maintenance activity status information (referred to subsequently herein at times as "repair" activities or "repair" status information but intended to include both repair and maintenance activities or both repair and maintenance activity status information, respectively, unless otherwise indicated explicitly or by context) being analyzed in some such embodiments and situations to identify areas for corrective activities (e.g., additional repair activities to be performed, problems in previous repair activities to be corrected, etc.) for one or more target computing devices, and the use of such information may include automatically initiating some or all such corrective activities on the target computing device(s). In addition, in at least some embodiments, various techniques may be used to improve speed and/or accuracy of determined responses to received queries, including analyzing and validating and encoding information about repair activities for a plurality of devices (e.g., identifying particular repair and/or maintenance events and/or associated objects used, determining associated timelines, performing consistency checking, etc.), such as to encode incoming repair status information that is in multiple data formats into corresponding encoded data groups in a common data format (e.g., using a defined domain-specific data model) that are stored in a database, and then analyzing and using received queries to retrieve stored encoded repair status data groups in the database that match the queries. Additional details are included below regarding the automated summarization, identification and use of repair status information, and some or all of the techniques described herein may in at least some embodiments be performed via automated operations of an Automated Repair Status Determination and Tracking ("ARSDT") system, as discussed further below.

In at least some embodiments, the automated operations of the ARSDT system involving analysis and encoding of incoming repair status information include data validation activities such as determining and tracking the source(s) of data elements stored in the database, including particular incoming documents that provided repair status information supporting those data elements. The corresponding automated techniques include, in at least some embodiments and situations, tracking the generation of each encoded data group from the incoming repair status information (e.g., extraction of data values from tables and keyword-value pairs and other structured data, natural language processing of hand-written and other unstructured data, determinations of categories of particular repair status data elements and associated codes or other identifiers (IDs) for a standardized data classification in use, determinations of values or other results of particular tests and repair activities, etc.), and storing information about each source of resulting data elements that are encoded and stored in the database for further use. For example, in some such embodiments, one or more source tracking graphs are created, such as with graph nodes created to represent processing modules and to represent input and intermediate and final data elements, with each such graph node storing information about the represented information, and with graph edges created between pairs of graph nodes to correspond to data flow and represent processing steps performed on data elements, and with each such graph edge storing information about such processing steps and data flow-in at least some such embodiments, the tracked source information for a data element that is part of a stored encoded data group may include links to or other indications of particular graph nodes and/or graph edges corresponding to the determination of that data element (including a graph node representing an initial data grouping that is part of and extracted from an incoming repair status document), with such source links or other source indications available for subsequent use to identify and retrieve data from particular graph nodes and/or graph edges about the determination of particular stored data elements. A stored encoded data group that includes a data element of a particular type may further include various additional data items of other types about that data element, such as to include the tracked source information for that data element, with the encoded data group stored in one or more database tables in some embodiments. Additional details are included below related to the determination and use of source tracking information for stored encoded data groups, including with respect to the examples of FIGS. 2F and 2I.

In addition, in at least some embodiments, the automated operations of the ARSDT system involving analysis and encoding of incoming repair status information include data validation activities such as determining and storing one or more confidence values for associated data elements stored in the database to reflect a level of confidence that the associated data elements are currently accurate. In addition, the accuracy confidence for at least some stored data elements may change over time (e.g., decrease to reflect possible changes since those data elements were measured or otherwise generated), and the automated techniques may further include reducing or otherwise changing confidence values associated with such data elements based on a passage of time since those data elements were measured or otherwise generated (e.g., periodically, when one of those data elements is retrieved for presentation or other use, etc.). The determination of one or more confidence values for a data element indicated in a particular incoming repair status information document may be based at least in part on a source of that document (e.g., an identification of one or more entities who performed corresponding repair activities and/or who gathered and supplied the results of the repair activities) and/or on particular repair activities performed (e.g., to correspond to the accuracy of results of particular types of repair activities), including for structured data having a structure that represents information such as a category of repair status data and/or a type of result of a type of repair status activity. For unstructured data that is processed in one or more manners to generate one or more resulting data elements included in one or more encoded data groups, the one or more confidence values associated with the resulting data elements may further be based at least in part on the processing steps performed, such as to reflect measured and/or expected accuracy of the processing—as non-exclusive examples, a particular such resulting data element may in some embodiments include multiple confidence values that include an entity confidence value with respect to an entity detected (e.g., a particular device or other entity on which a repair activity is performed or that performs a repair activity, a particular repair activity or failure status or repair tool, etc.), a code resolution confidence value with respect to determination of a standardized code associated with the data element based on a determined categorization of the data element, an assertion confidence value with respect to a determined assertion associated with the data element (e.g., whether a particular repair activity or failure status is present or is not present or was previously present or is related to another device or other entity), and a relationship modeling confidence value with respect to a determined relationship of the data element to one or more other data elements (e.g., causes, is caused by, is a type of, is a part of, etc.). A stored encoded data group that includes a data element of a particular type may further include various additional data items of other types about that data element, such as to include one or more determined confidence values for that data element, with the encoded data group stored in one or more database tables in some embodiments. Additional details are included below related to the determination and use of confidence values for stored encoded data groups, including with respect to the examples of FIGS. 2F and 2I.

The described techniques provide various benefits in various embodiments, including to significantly improve the identification and use of responsive information to specified queries, including queries specified in a natural language format, and with such described techniques used in some situations to automatically determine and implement repair activities performed on indicated computing devices or other repair status information for such devices. Such automated techniques allow such response information to be generated much more quickly and efficiently than previously existing techniques (e.g., using less storage and/or memory and/or computing cycles) and with greater accuracy, based at least in part on using one or more of the following: the described tracking and use of source information for repair status data to enable validation of its generation and encoding, as well as to enable update of calculated data values when underlying input values changes; the described determination and use of confidence information for repair status data to control use of that data for particular follow-on activities and to enable validation of its usefulness, as well as to enable updates to the confidence information based on the passage of time and/or differences in newer obtained data; the described use of one or more databases, including to identify and model relationships between particular entities, objects, attributes, etc.; the described use of encoding, storage and retrieval of extracted data; the described validation model for extracted data, including consistency checking with respect to timelines and other extracted data; the described use of domain-specific information to improve and customize the summarization and encoding of information for that domain; etc. Non-exclusive examples of additional related benefits of the described techniques include the following: enabling the processing and use of much larger groups of information; enabling providing a 'no answer' response if a response to a specified query is not identified (rather than providing a search list of many results that do not include the responsive answer); enabling identifying responses to queries that are more general (e.g., open-ended); enabling identifying responses to queries using information of multiple levels of generality or specificity; enabling identifying responses to queries using timelines that are identified from extracted data; enabling identifying responses to queries using additional information that is identified from extracted data, such as related to inferred effects or other calculated or otherwise inferred repair status information; etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

In at least some embodiments, the described techniques include summarizing and encoding repair status information for a number of types of repair activities. For example, a group of information specific to one or more types of repair activities (e.g., involving some or all repair activities for a specific type or class of computing device or for a specific computing device) may be identified (e.g., in a plurality of documents from a plurality of sources and including both structured data and unstructured data, and with information for a particular device or other entity potentially identified in multiple documents from multiple sources and optionally in multiple languages), and may be analyzed to separate that group of information into smaller groupings of related data (e.g., per device or other entity, per repair activity event and/or repair service provider encounter, per repair activity type, etc.). Each such data grouping may then be further analyzed, including to identify and validate particular data of interest (e.g., identifying particular events and/or objects, determining associated timelines, performing consistency checking, etc.), and to optionally identify additional expanded content associated with that data grouping (e.g., additional information about particular devices or other entities), with the resulting data then encoded (e.g., in one or more databases to provide a consistent common format of information extracted from both structured and unstructured data) and stored for subsequent use. In at least some embodiments, the analysis activities for a data grouping may include using a language model (e.g., to perform semantic similarity matching, such as by learning and using synonyms and/or associated information at different levels of generality and/or specificity). In addition, in at least some such embodiments, the described techniques include automated operations of the ARSDT system to anonymize or otherwise redact some of the repair status information and/or other associated information about particular devices or other entities. Additional details are included below regarding summarizing and encoding repair status information, such as identifying and validating of particular data of interest, including with respect to the examples of FIGS. 2A-2I and elsewhere herein.

In addition, in at least some embodiments, the described techniques further include using encoded repair status information (e.g., for a number of types of repair activities and for multiple associated devices or other entities) to respond to queries received in a natural language format. For example, the described techniques may include receiving a query in freeform natural language text, performing natural language processing on the freeform text to identify keywords or other features to use in performing a corresponding search, converting the keywords or other features into one or more queries (e.g., using a database format), and performing one or more corresponding searches (e.g., database searches) to identify matching data groupings. In at least some embodiments, the performing of the search(es) to identify matching data groupings may include identifying one or more initial candidate data groupings that satisfy the search(es), and optionally obtaining additional expanded content to supplement the candidate data groupings that are used as part of one or more final data groupings used in the response to the query. As non-exclusive examples, the initial candidate data groupings may include data from one or more stored databases about one or more particular repair activities or other repair status for one or more particular devices or other entities, and the additional expanded content may be of one or more additional types and optionally from one or more other sources separate from the database(s) (e.g., additional information about configuration and/or composition and/or history of a particular device or other entity, optionally to include prior usage activities or other prior non-repair activities for the device or other entity, and whether from the same database(s) or one or more other sources; additional information determined about problems or other issues in the repair activities or other status for the device or other entity, whether from the one or more database(s) or one or more other sources, such as to be dynamically determined, and optionally to include one or more corrective activities to be implemented in an automated or other manner; additional information inferred about current and/or future status of a particular device or other entity based on prior repair activities and/or other additional information about the device or other entity, such as based on effects of prior repair activities and/or other prior non-repair activities; etc.). Additional details are included below regarding such use of encoded repair status information, such as related to determining and providing responses to received queries, including with respect to the examples of FIGS. 2A-2I and elsewhere herein.

The described techniques may further be used in various manners to address various types of problems. As noted above, in some embodiments the described techniques include identifying repair status information related to a particular computing device or particular type of computing device, and in some such cases providing response information that includes information about one or more corrective activities to be performed, optionally in an executable format to initiate one or more automated corrective actions on that particular computing device or on one or more computing devices of that particular type. In other embodiments, the identified repair status information may be used in other manners, such as to be provided to one or more users (e.g., the user who supplied the corresponding natural language query) for further use (e.g., to display or otherwise present some or all of the identified repair status information to the one or more users), such as for situations in which at least some further user activity is involved (e.g., remove a battery from a smart phone, attach a cable to a specified port, etc.). In some embodiments, the identified repair status information may be for types of repair activities or other repair status information that does not involve computing devices, such as repair status information related to one or more types of medical repair activities (e.g., treatments, procedures, drugs taken, medical devices used, etc.) that have been performed on an indicated human or other patient entity (e.g., to repair the patient with respect to an indicated medical symptom and/or medical condition of the patient, such as by a type of treatment specified in corresponding indicated medical repair status information; to perform maintenance on the patient, such as with respect to an indicated medical symptom and/or medical condition by performing preventive activities to reduce the likelihood of an indicated medical symptom and/or medical condition arising, etc.) or other medical status for such a patient (e.g., diseases or other conditions of a patient, prior patient activities that affect patient health, etc.)—in such embodiments, the repair status information that is summarized and encoded may include both structured and unstructured data such as, for example, doctors' notes about patients, records of hospitals or other facilities or entities related to treatments (e.g., electronic medical records, or EMRs, from hospitals and/or pharmacies and/or other medical facilities, treatment records from other entities with such information such as insurance companies and/or credit card processing systems, etc.), and additional supplemental information may include information about effects of various activities (e.g., drug interactions, medical guidelines or other information about effects of particular medications and/or activities, etc.). In addition, in at least some embodiments, the described techniques include automated operations of the ARSDT system to anonymize or otherwise redact some of the repair status information and/or other associated information about particular devices or other entities (e.g., to anonymize patient data to satisfy HIPPA, or Health Insurance Portability and Accountability Act, requirements; to satisfy GDPR, or General Data Protection Regulation, requirements, etc.).

In addition, while various of the discussion herein refers to data groupings that are extracted from "documents", such as for structured and/or unstructured data, it will be appreciated that the described techniques may be used with a wide variety of types of content items and that references herein to a "document" apply generally to any such type of content item unless indicated otherwise (explicitly or implicitly based on the context), including, for example, textual documents (e.g., Web pages, word processing documents, slide shows and other presentations, emails and other electronic messages, etc.), visual data (e.g., images, video files, etc.), audio data (e.g., audio files), software code, firmware and other logic, genetic codes that each accompany one or more sequences of genetic information, other biological data, etc., including electronic health records in one or more formats (e.g., FHIR, or Fast Healthcare Interoperability Resources; HL7, or Health Leven Seven; OMOP, or Observational Medical Outcomes Partnership; etc.). Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; mathematical equations and mathematical data structures, other types of alphanumeric data structures and/or symbolic data structures; encrypted data, etc.). In some embodiments, each of the documents has contents that are at least partially textual information, while in other embodiments at least some documents or other content items may include other types of content (e.g., images, video information, audio information, etc.).

For illustrative purposes, some embodiments are described below in which specific types of information are acquired, used and/or presented in specific ways and by using specific types of automated processing-however, it will be understood that the described techniques may be used in other manners in other embodiments, and that the invention is thus not limited to the exemplary details provided. As one non-exclusive example, while specific types of data structures (e.g., databases, domain-specific data models, data categorization models and codes, language models, etc.) are generated and/or used in specific manners in some embodiments, it will be appreciated that other types of information may be similarly generated and used in other embodiments, including for repair status information for areas other than involving computing devices (e.g., for medical-related repair and status information) and/or for types of activities other than repair and maintenance actions, and that responses to queries may be used in other embodiments in manners other than automated corrective repair actions, including display or other presentation. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical or related reference numbers may be used in the drawings to identify the same or similar elements or acts.

FIG. 1A is a network diagram illustrating an example environment in which a system for automatically determining repair status information for computing devices or other types of repair status information in response to natural language queries may be configured and provided. In particular, an embodiment of an ARSDT system 140 is executing on one or more computing systems 130, and includes several components 142, 143, 144, 146 and 148 that generate and use various information 151, 152, 153, 155 and 157.

In particular, as part of the automated operations of the ARSDT system 140 in this illustrated example embodiment, the system 140 obtains information from various repair status information documents 195 on one or more storage devices 190 about multiple types of repair activities performed and other repair status information for one or more repair domains, such as over the computer network(s) 100. The contents of the repair status information documents 195 are received by the ARSDT Repair Status Information Extraction/Standardization component 142, which analyzes those contents in order to generate resulting extracted and standardized repair status data 151, such as in a plurality of data groupings. The ARSDT Repair Status Information Source Tracking/Confidence Determination/Encoding component 143 then analyzes that data 151 in order to generate resulting encoded repair status information 152, which in this example embodiment includes groups of related data that are stored in one or more databases (not shown) and optionally additional expanded content for some or all such data groups (e.g., additional inferred contents about effects of prior repair activities and/or other associated activities), along with associated tracked source information and determined confidence values for the medical repair status data, including to generate and use one or more source tracking graphs. The encoded repair status information 152 is then made available to an ARSDT Matching component 146 for further use in addressing queries received from users.

In addition, the ARSDT system operates in an online manner in the illustrated embodiment and provides a graphical user interface (GUI) (not shown) and/or other interfaces 119 to enable one or more remote users (not shown) of client computing devices 110 to interact over the one or more intervening computer networks 100 with the ARSDT system 140 to obtain functionality of the ARSDT system. In particular, a particular client computing device 110 may interact over the one or more computer networks 100 with the natural language repair query interface 119 in order to submit a query about one or more types of repair status information (e.g., all available repair status information), such as for an indicated computing device or indicated type of computing device (e.g., corresponding to an associated device 115 for which additional corrective repair activities may be performed, and/or for the client computing device 110 itself) or other indicated target entity(ies) (e.g., all entities matching one or more specified criteria), and with the query submitted using a natural language format. The ARSDT Repair Status Query Encoding component 144 receives the natural language query, and generates a corresponding encoded repair status query 153, which in this example embodiment includes one or more database queries that summarize the meaning of the natural language query.

The encoded repair status query 153 is then made available to the ARSDT Matching component 146, which compares the encoded repair status query 153 to the encoded repair status information 152 (e.g., executes the one or more queries to perform searches in the one or more databases) in order to determine one or more candidate data groupings 155 that match the encoded repair status query 153. In some embodiments, the selection of particular candidate data groupings may further match generated embedding vectors for the repair status query and the encoded data groups, whether instead of or in addition to queries encoded for databases and encoded data groups, such as to use a similarity measure or other distance or difference measure to compare the embedding vector for the repair query to at least some embedding vectors generated for the repair status information 152 and with candidate data groups selected based on having associated embedding vectors with a similarity measure above a defined threshold (or a distance or other difference measure below a defined threshold), as discussed in greater detail elsewhere herein.

The ARSDT Response Determination component 148 then analyzes the matching repair status data groups 155 in order to determine corresponding repair status response information 157 for the received query, which it then forwards back to the requesting client computing device 110 in response to the received query via the natural language repair query interface 119. The analysis of the matching repair status data groups 155 may include, for example, analyzing the information of the data groups to select one or some or all of the data groups to use as the repair status response information 157, while in other embodiments all such matching data groups may be used without such selection. As discussed in greater detail elsewhere, the repair status response information 157 may in some embodiments and situations include executable instructions or other information to automatically cause the recipient client computing device 110 and/or an associated computing device that is to be repaired to execute those repair instructions or to otherwise take automated action to perform repair activities (e.g., corrective repair activities, preemptive additional maintenance activities, etc.). If no data group 155 is identified as a response to the received query, the component 148 may instead supply a reply message to the requesting client computing device 110 to indicate that no response is available.

After the requesting client computing device 110 receives the repair status response information 157, it may take various actions to use that received information, such as to initiate automated (or other) repair activities on itself or on an associated device 115, and/or may display or otherwise present some or all of the received information to one or more users on the client computing device. The interactions of users and/or client computing devices with the ARSDT system 140 to obtain functionality of the ARSDT system may involve a variety of interactions over time, including in some cases independent actions of different groups of users and/or client computing devices.

The network 100 may, for example, be a publicly accessible network of linked networks, possibly operated by various distinct parties, such as the Internet, with the ARSDT system 140 available to any users or only certain users over the network 100. In other embodiments, the network 100 may be a private network, such as, for example, a corporate or university network that is wholly or partially inaccessible to non-privileged users. Thus, while the ARSDT system 140 in the illustrated embodiment is implemented in an online manner to support various users over the one or more computer networks 100, in other embodiments a copy of the ARSDT system 140 may instead be implemented in other manners, such as to support a single user or a group of related users (e.g., a company or other organization, such as if the one or more computer networks 100 are instead an internal computer network of the company or other organization, and with such a copy of the ARSDT system optionally not being available to other users external to the company or other organizations, such as for a medical facility operating a copy of the ARSDT system using medical repair status information available for some or all patients of the medical facility). In addition, the ARSDT system 140 and each of its components (including components 142, 143, 144, 146 and 148) may include software instructions that execute on one or more computing systems by one or more processors (not shown), such as to configure those processors and computing systems to operate as specialized machines with respect to performing their programmed functionality.

Additional details related to operations of the ARSDT components 142-148 are discussed below with respect to FIG. 1B and elsewhere herein.

Figure 1B:
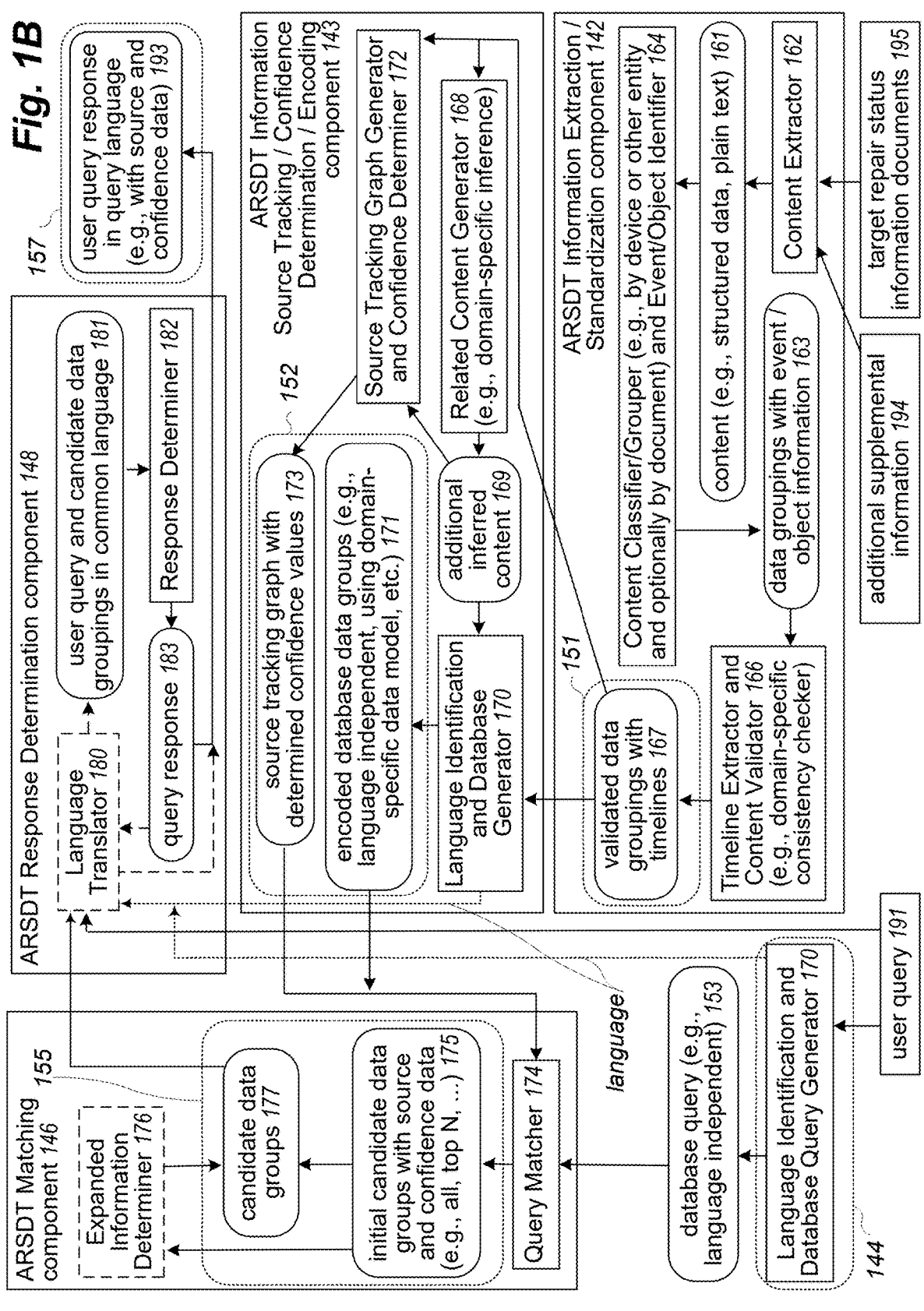

FIG. 1B continues the example of FIG. 1A, and illustrates an example embodiment of the ARSDT system that includes additional example details about the ARSDT components 142-148 of FIG. 1A, with the ARSDT system being capable of providing repair status information (or other types of information) for repair status areas/domains other than computing devices.

In this example embodiment, the ARSDT Information Extraction/Standardization component 142 receives, from target status information documents 195, information about one or more repair status areas/domains, and may further optionally obtain and use additional supplemental information 194 of one or more types as discussed below. Given documents providing status information for multiple devices or other entities and related to a domain (e.g., stored in the form of html, xml, docxs, pptxs, pdfs, images, etc.), the ARSDT system may perform automated operations that allow a user to make queries in natural language about the domain and obtain responses based on the content contained in the documents (e.g., in a real-time or near-real-time manner, such as in less than a second or in one or more seconds). In this example embodiment, the information from the target status information documents 195 is provided to a Content Extractor subcomponent 162 of the component 142, which extracts corresponding content 161 (e.g., in plain text form). In some embodiments, the subcomponent 162 may include optical character recognition (OCR) and Natural Language Processing (NLP) capabilities to extract text from images or other visual data, as well as use different parsers for different supported types of file formats. In addition, in at least some embodiments the subcomponent 162 may receive additional supplemental information 194 and analyze it to include some or all of the information in the content 161, such as in a domain-specific manner—as one non-exclusive example for the medical domain, the additional supplemental information may include information about drug interactions, time-based effects of particular activities (e.g., smoking) and/or medications/treatments, expected results from particular medical procedures or other treatments (e.g., from medical clinical guidelines), etc. In addition, the additional supplemental information 194 may include additional information about specific entities having repair status information in the documents 195, such as device recalls, demographic information and/or status information for particular people (e.g., medical patients), etc.

The content 161 from subcomponent 162 is then provided to a Content Classifier/Grouper and Event/Object Identifier subcomponent 164 of component 142, which separates the content 161 into multiple data groupings 163 of related content (e.g., data groupings of data each associated with a particular device or other entity and/or with a particular repair/maintenance event and/or encounter), such as by using identifying information to link data from different documents about the same entity (e.g., a unique device identifier for a device, such as a MAC address or persistent IP address; a social security number or patient number or patient name or other identifying number for a person; etc.)—as part of the processing, the subcomponent 164 may further perform processing to identify various parts of the content, such as particular entities, particular repair activities, particular conditions to be repaired or ameliorated, particular objects used for repair activities, particular repair-related tests that are performed, particular assertions linking two or more other pieces of data, etc., optionally based on or associated with particular codes for a particular domain (e.g., with respect to the medical domain, CPT, or Current Procedural Terminology codes; and/or ICD, or International Classification of Diseases, codes; and/or HCPCS, or Health-care Common Procedures Coding System, codes; etc.), and particular attributes associated with some or all of the other identified parts (e.g., associated timing information, such as start and/or end dates and/or duration times or other types of time periods, and whether using absolute times or times relative to another indicated time, such as a date or other time associated with a document or a particular entry in the document; a level of a repair activity performed, such as a dosage or strength of medicine used or other medical procedure or intervention; results of repair-related tests; etc.).

The data groupings 163 are then supplied to a Timeline Extractor and Content Validator subcomponent 166 of the component 142, which further analyzes information in the data groupings to extract and encode information about dates and other timing aspects of the repair status information, such as to generate timelines associated with particular devices and other entities and associated repair-related activities. The subcomponent 166 may perform further automated operations to validate the generated timelines and optionally other data of the data groupings, such as by performing consistency checks for a particular device or other entity to correlate different repair status information for that device or other entity and/or to use validation rules to ensure that repair information falls within thresholds or otherwise satisfies defined criteria, as part of generating validated data groupings 167 that include the generated timeline information. Additional details are included elsewhere herein related to such analysis and validation operations.

The validated data groupings 167 are then provided to a Related Content Generator subcomponent 168 of the component 143, which further generates additional inferred content 169 (e.g., a plurality of additional data groupings)—such additional content may be generated in a domain-specific manner, such as to calculate data values that are based on one or more other data values of incoming validated data groupings 167 and optionally previously received and stored data, to infer medical effects on patients based on an amount of time that has passed with respect to repair activities and/or other activities (e.g., an amount of time that a patient has spent smoking, an amount of time that a patient has taken a medication, an amount of time since a patient completed taking a medication and/or received a medical procedure, etc.). The validated data groupings 167 are also provided in this example to a Source Tracking Graph Generator and Confidence Determiner subcomponent 172 of the component 143. The subcomponent 172 further uses the data groupings 167 and the additional inferred content 169 to determine source tracking information and confidence values for data elements of the groupings 167 and additional inferred content 169, which generates a source tracking graph 173 with associated nodes and edges (not shown) including source tracking and confidence value information.

The validated data groupings 167 and additional inferred content 169 (if any) are then supplied to a Language Identification and Database Generator subcomponent 170 of component 143, which optionally identifies a corresponding language (e.g., if multiple languages are in use) for each data grouping (or distinct subset of a data grouping, such as the data in the data grouping that comes from a particular source document) and associates the identified language as an attribute of that data grouping (or subset), with such language information subsequently supplied to an optional Language Translator subcomponent 180 of component 148 for further use in some embodiments. The subcomponent 170 further generates encoded database data groups 171 that are stored in one or more databases (not shown), which together with graph 173 correspond to information 152 of FIG. 1A, and may further be made available to a Query Matcher subcomponent 174 of the ARSDT Matching component 146—the encoded data groups 171 may, for example, be generated using a domain-specific data model to determine the nodes, relationships, properties and/or labels that are used, such as based on information from the Observational Medical Outcomes Partnership (OMOP) data model for medical status information and other related medical data. While not illustrated in FIG. 1B, the subcomponent 170 may optionally use domain-specific information (e.g., labeled groups of content) as part of the generation of the data groups 171 if such domain-specific information is available When a user query 191 is received (e.g., expressed in natural language form), it is supplied to the Language Identification and Database Generator subcomponent 170

(whether the same subcomponent 170 of component 142, or a different copy of that subcomponent 170), which generates a representation 153 of the query encoded for the database(s) in use (e.g., by using an included model, such as a Generative Pre-Trained Transformer, or GPT, autoregressive language model that uses deep learning and has been trained to generate database expressions corresponding to freeform queries, so as to represent the query's semantic meaning)—in a manner similar to that of the data groups 171, the subcomponent 170 may optionally use domain-specific information (e.g., labeled groups of tokens) as part of the generation of the query 153 if such domain-specific information is available. As with the data groupings 167, the subcomponent 170 also optionally determines the language of the user query 191 if multiple languages are in use, and makes that information available to the Language Translator subcomponent 180 for later use in some embodiments, such as if the ARSDT system operates to translate determined responses from one or more other languages to the language in which the user query is received. The Language Identification and Database Generator subcomponent 170 that operates on the user query 191 may, for example, correspond to component 144 of FIG. 1A.

The Query Matcher subcomponent 174 of the ARSDT Matching component 146 then operates to compare the query 153 to the data groups 171 in order to generate initial candidates 175 of data groups for corresponding data groups that are identified (e.g., all matching data groups; a top N number of candidate data groups, with N being customizable or a fixed number, such as in the range of 20 to 50; etc.). To identify the candidate data groups, the subcomponent 174 may use database structure information and/or perform one or more searches of the database(s). In addition, the subcomponent 174 may retrieve information from the graph 173 about source tracking information and/or confidence value information for the candidate data groups 175 and include it with the candidate data groups—in other embodiments and situations, some or all such source tracking information and/or confidence value information may instead be retrieved and provided in response to particular received queries or other requests 153 specifically for that information, such as follow-up requests that are made after an initial query response 193 is made that includes one or more of the selected candidate data groups. In some embodiments, the initial data group candidates 175 are then supplied to an Expanded Information Determiner subcomponent 176 of the component 146, which generates expanded information for each of one or some or all of the initial data group candidates, such as to combine information that is part of additional supplemental information but not otherwise stored as part of the data groups 171 (e.g., demographic or other information for particular people) and in some cases in storage locations other than the database(s). If such expanded information is determined, a combination of the initial data group candidates 175 and additional expanded information is then used as the final candidate data groups 177 (e.g., to correspond to some or all of the information 155 of FIG. 1A.), and otherwise the initial data group candidates 175 are used as the final candidate data groups 177.

The final data groups information 177 is then optionally provided to a Language Translator subcomponent 180 of the ARSDT Response Determination component 148, along with the language information detected for the user query and the data groupings used to generate those data groups, such as to handle content in the candidate data groups 177 that are in multiple languages, and/or to handle if the user query 191 and some or all of the data group information 177 are in different languages (e.g., to translate all of the information and query to a single language, such as the language of the query, a selected language that may be different from that of some or all of the information, etc.)—alternatively, if the user query 191 and the data group information 177 are in the same language, or if multilingual functionality is not used in an embodiment, the information 177 may then directly become content 181 in which the user query and the data groups are in a common language. The subcomponent 180 may, for example, translate one or more of the pieces of information into a common language (e.g., into the language of the user query), resulting in the information 181 in the common language, such as by using a neuro machine translation model to translate the user query and/or to translate some or all of the candidate data groups and/or their expanded information (if any). The information 181 is then provided to the Response Determiner subcomponent 182 of the component 148, which generates a query response 183 in the same language as that of the user query 191, which is then output as response 193 for the user query 191—the user query response 193 may, for example, correspond to information 157 of FIG. 1A. In some embodiments, a query response 183 may, for example, include text that is not directly present in a particular data group or its expanded content that is used to generate the response, and in some embodiments and situations may include indications of additional non-textual information (e.g., images, audio, etc.) in a document from which the data group is extracted (e.g., by including links in the provided response to the corresponding parts of that document, by extracting and bodily including that additional non-textual information, etc.).

While a variety of details have been discussed with respect to the example embodiments of FIGS. 1A-1B, it will be appreciated that other embodiments may not include some such details, and/or may include other functionality that is not illustrated in these examples.

FIGS. 2A-2I illustrate further examples of performing described techniques, including automatically determining repair status information in response to natural language queries for computing devices or other types of repair status information.

Figure 2A:
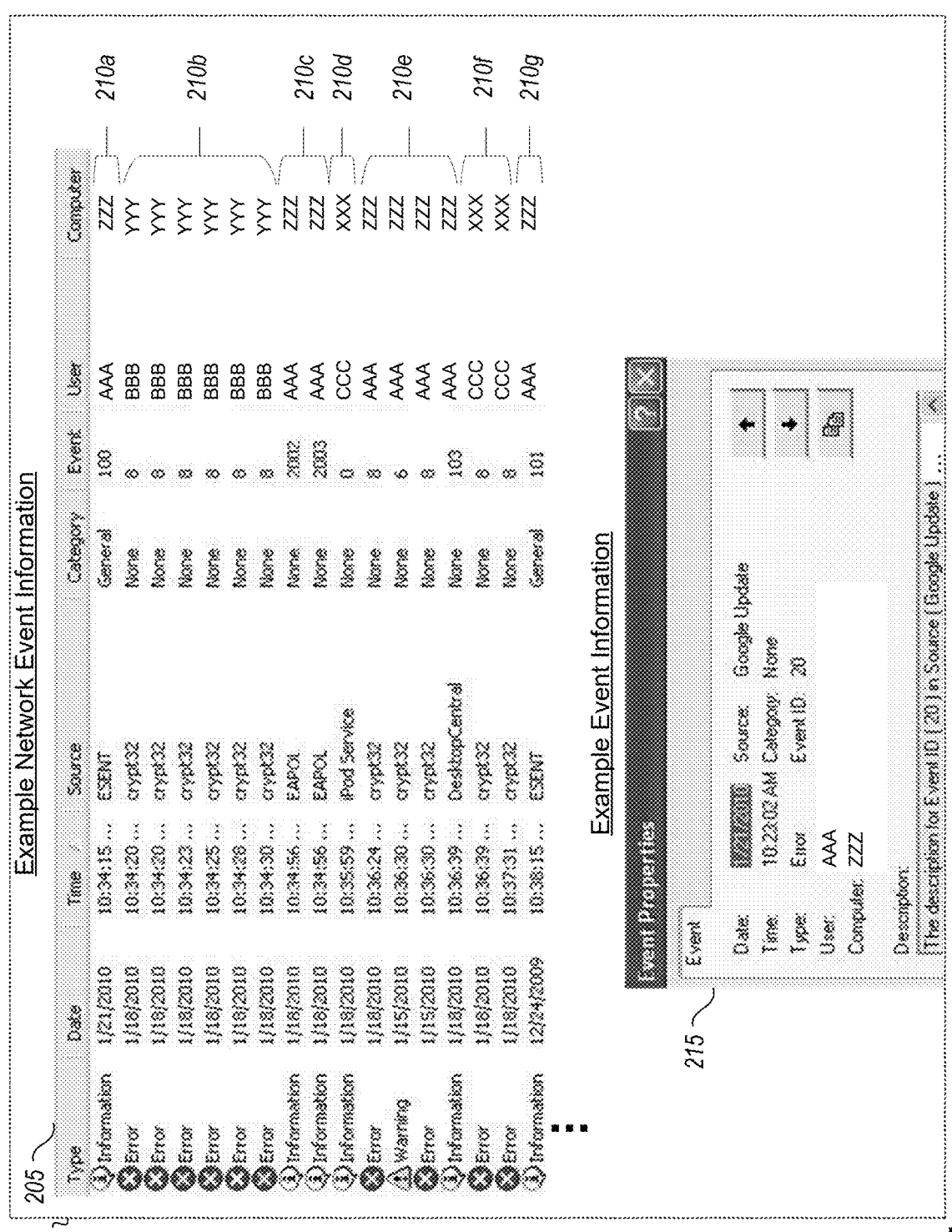

With respect to FIG. 2A, it illustrates example information 200a corresponding to network event information that may indicate repair problems and/or associated repair activities for one or more computing devices. In particular, information 205 illustrates example network event information (e.g., from an event log), which in this example may be separated into various encounters 210a-210g corresponding to different associated computing device entities XXX, YYY and ZZZ with associated user entities CCC, BBB and AAA, respectively. It will be appreciated that some encounters 210 correspond to a single event, such as for encounter 210a, while other encounters may correspond to a series of related events, such as for encounter 210b. Information 215 further provides example additional data available for each of some or all of the events, such as to include information about an associated time (in this case, with both a date and a time of day), a type, a unique ID, a source, descriptive text, etc.—it will be appreciated that the types of event information may vary in other embodiments and situations, and may be formatted in different manners than is illustrated.

Figure 2B:
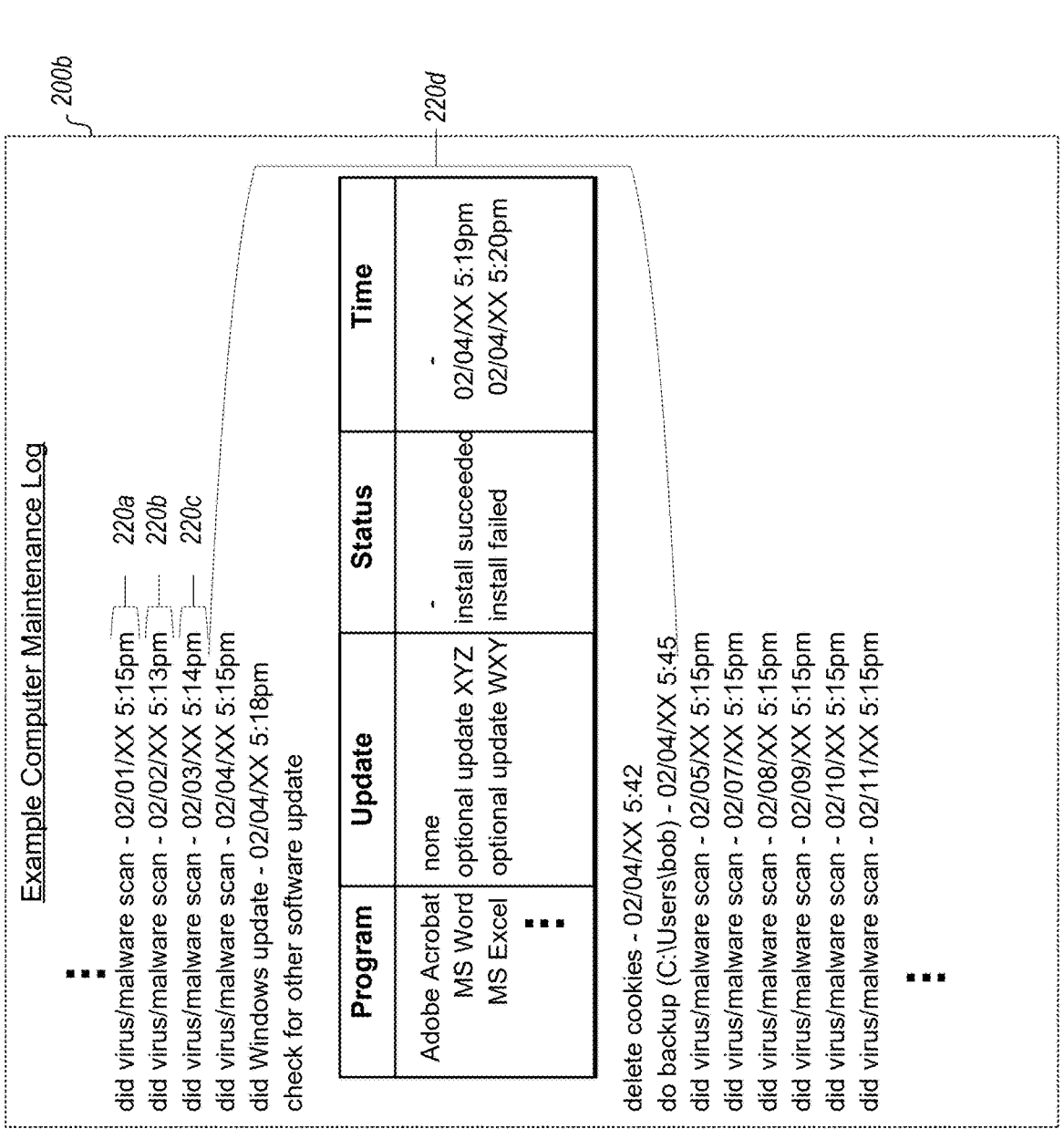

FIG. 2B continues the example of FIG. 2A, and illustrates additional example information 200b about repair activities performed for a particular associated computing device entity, and in particular illustrates example maintenance activities performed for that computing device. In this example, the maintenance activities may be separated into multiple encounters 220a-220d corresponding to different associated repair/maintenance sessions, with some such encounters 220 corresponding to a single repair activity, such as for encounter 220a, while other encounters may correspond to multiple related repair activities, such as for encounter 220d. In this example, a provider of the repair activities is not identified, and may correspond to a single provider, although in other embodiments and situations multiple providers may perform different repair activities (e.g., at different times) for the associated computing device.

FIG. 2C continues the examples of FIGS. 2A-2B, and illustrates additional example information 200c about repair activities performed for a particular associated computing device entity by a particular provider of repair activities, and in particular is part of an invoice generated by that provider in this example. Information 200c in this example includes various structural elements and associated sections, such as with the "Details" section including overview information, a "From" section including information about the provider, a "Bill To" section including information about the recipient (e.g., a user or company associated with the computing device), a table section "Service" that provides structured data about repair activity services performed in a tabular format, a table section "Parts/Materials" that provides structured data about repair objects (in this case parts and materials) used as part of the repair activity services, a "Notes" section that provides handwritten information with further details about the repair activities performed, etc.

While various example information has been provided in FIGS. 2A-2C related to types of repair information that may be available and used for computing device entities, it will be appreciated that other types of repair information may be available and used in other embodiments.

Figure 2D:
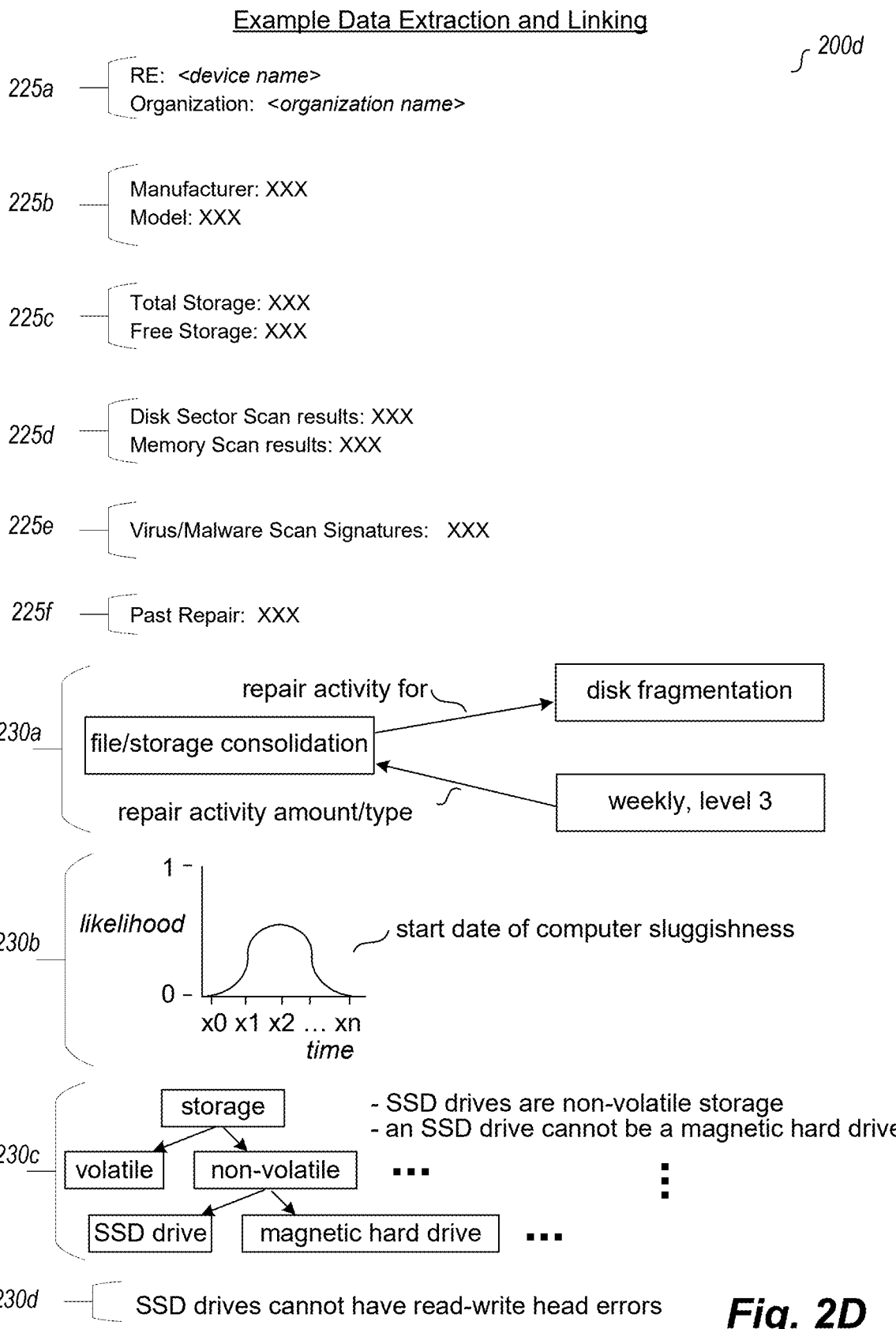

FIGS. 2D-2E continue the examples of FIGS. 2A-2C, and illustrate example data 225 and 230 that may be extracted and linked from various input documents, including in this example to have general information 225a, keyword (or 'key')-value pairs 225b, test results 225c, procedures performed 225d (and resulting information), repair information 225e, repair history information 225f, etc. Extracting repair data corresponding to an associated entity (e.g., the device or other entity on which the repair activities are performed) may include identifying particular repair activities performed and corresponding results for a particular associated device or other entity, including to determine values for particular attributes of the associated device or other entity. Entities and relationships may be generated (e.g., based on co-occurrence in the same row of a table or by analyzing the database schema), as shown in information 230a of FIG. 2D. Information 230b of FIG. 2D further illustrates an example of a time probability function used to represent a time associated with an event entity. Information 230c of FIG. 2D further illustrates one example in which inferred and/or predefined relationship information is illustrated, and/or to represent subsumption and sibling relationships (e.g., determined from existing ontology information that is imported by the ARSDT system)—it will be appreciated that an actual database representing input information about one or more computing devices will further include a variety of device-specific information. Information 230d of FIG. 2D illustrates one example of a rule used for validation of data input from the information in the input documents and the determination of corresponding inconsistencies (e.g., with respect to relationships, associated time data, etc.). Information 235a-235c of FIG. 2E further illustrates examples of queries of multiple types that may be received and responded to using stored information that is encoded from the input information.

Figure 2F:
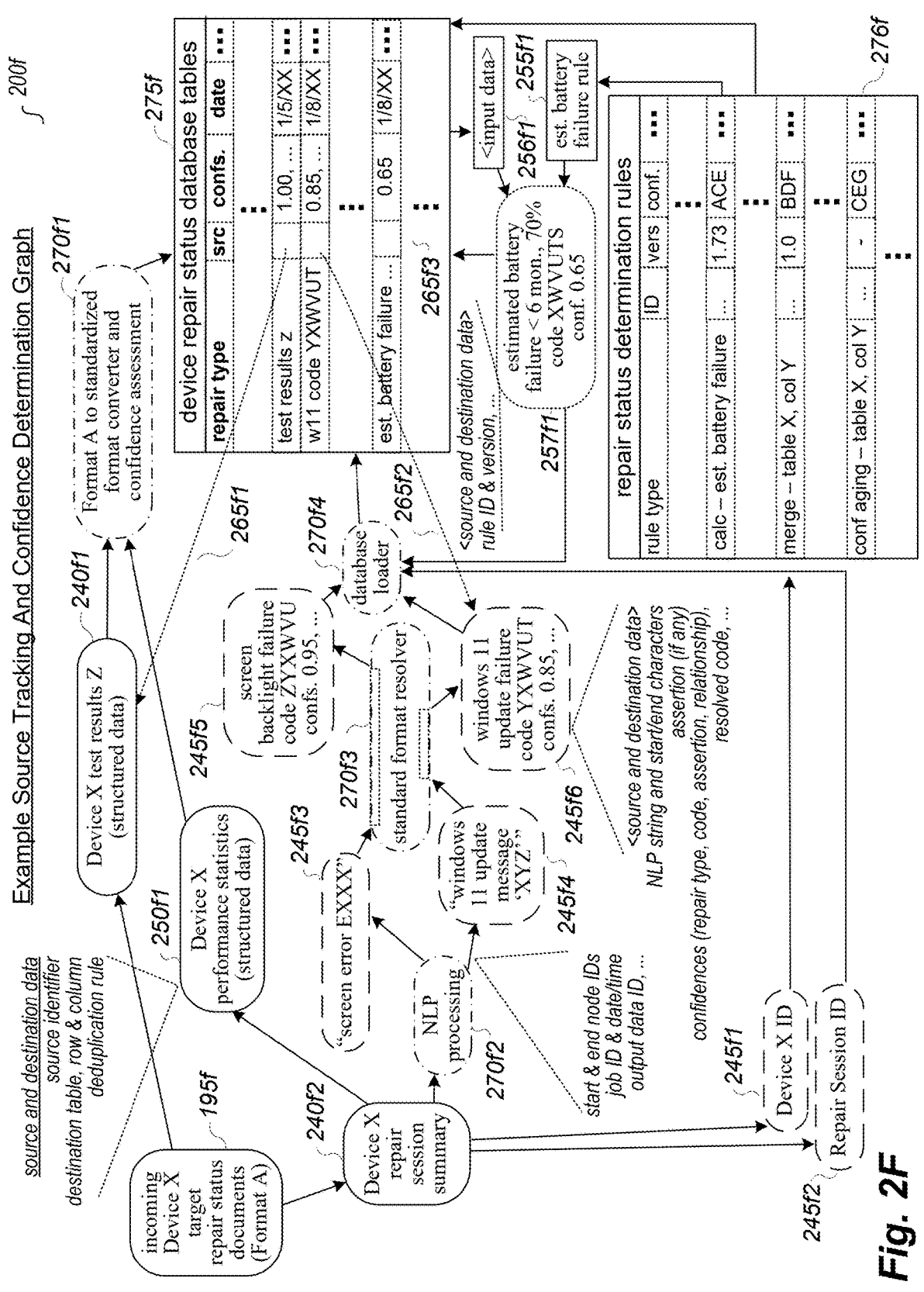

FIG. 2F continues the examples of FIGS. 2A-2E, and illustrates information 200f corresponding to an example source tracking and confidence determination graph. In particular, in this example, the processing may begin with analyzing one or more incoming repair status documents corresponding to a particular device (Device X), with a corresponding graph node 195f created in the source tracking graph to represent the document(s)—in some embodiments and situations, a separate graph node will be created for each incoming document. Additional graph nodes 240 may then be created for various information extracted directly from the incoming document(s), such as a graph node 240/1 corresponding to one or more data groupings with data for particular test results Z in a structured data format (e.g., from a first incoming document), and a graph node 240/2 corresponding to a summary of a repair session for Device X (e.g., from a second incoming document). Particular data items extracted from the repair session summary include an ID for the device that is represented in graph node 245/1, an ID for the repair session that is represented in graph node 245/2, one or more additional data groupings corresponding to additional structured data about particular performance statistics for the device that are represented in graph node 250/1 (although each separate data grouping will have a separate graph node in at least some embodiments), and additional unstructured data that is passed to an NLP processing module represented in graph node 270/2. The results of the NLP processing include a first data grouping corresponding to the extracted text of "screen error EXXX" and represented by graph node 245/3, and a second data grouping corresponding to the extracted text "Windows 11 update message XYZ" and represented by graph node 245/4. In this example, the data of the first and second data groupings in graph nodes 245/3 and 245/4 are both sent to a standard format resolver processing step represented by graph node 270/3, which generates an encoded data group 245/5 corresponding to the screen error message for data grouping 245/3 (in this example corresponding to a categorization of a screened backlight failure, given a standard code of ZYWXVU, and assigned one or more confidence values as shown), and an encoded data group 245/6 corresponding to the windows 11 update message for data grouping 245/4 (in this example corresponding to a categorization of a Windows 11 update failure, given a standard code of YWXVUT, and assigned one or more confidence values as shown). The encoded data groups represented in graph nodes 245/5 and 245/6 are each then passed to a database loader processing step represented in graph node 270/4, which loads the corresponding encoded data groups into one or more database tables 275f using a standardized format. Similarly, the information represented in graph nodes 245/1 and 245/2 are also passed to the database loader processing step for similar loading into the one or more database tables. The data groupings for the structured data represented in graph nodes 240/1 and 250/1 are passed to a related processing step represented in graph node 270/1 that converts the structured data format(s) to a data model used by the database tables 275f, along with assigning associated assessed confidence values, and loading resulting encoded data groups into the database tables 275f in a common format with the data groups resulting from the unstructured data.

In addition to the data loaded into the one or more database tables 275f that is extracted from incoming documents, the database tables may further store additional calculated data that is based on other data stored in the database tables. As one example, a defined type of data of interest to calculate may be a probability of an estimated battery failure occurring in the next six months or less, such as based on one or more data values extracted from the database and represented by one or more graph nodes 256/1 (e.g., particular battery-related errors, battery age, battery charge time, quantity of battery charging cycles, etc.), and using a rule to calculate that probability represented by graph node 255/1 in this example and retrieved in this example from a group of defined rules 276f (e.g., also stored in the one or more database tables 275f). In this example, the encoded calculation results data group 257/1 includes an estimated probability value of 70%, with a categorization type of estimate battery failure in less than six months, an associated standardized code of XWVUTS, one or more associated confidence values as shown, etc., and with the corresponding encoded data group similarly provided to the database loader step represented in graph node 270f4 for loading into the one or more database tables 275f in the common format. It will be appreciated that such calculated encoded data groups may be generated at various times, such as dynamically upon request using the most current corresponding input data values, whenever one or more of the input data values changes from new incoming data, and/or when one or more other criteria are satisfied (e.g., a defined amount of time is passed since a prior calculation, a confidence value associated with the calculated data value drops below a defined threshold or otherwise satisfies one or more defined criteria due to aging, etc.). The rules 276f may also be of additional types other than calculation rules, including in this example to include deduplication merge rules associated with particular tables and columns and used to manage having multiple values for a given data element, aging rules for confidence values that are associated with particular tables and columns and used to reduce or otherwise change confidence values over time, etc.

As part of the dataflow processing represented by the graph nodes and the graph edges between pairs of them, various information may be stored in some or all graph nodes and graph edges. For example, with respect to the data grouping represented by graph node 250/1, the node may store information related to source and destination for that data grouping, such as a unique source identifier, a destination table, row and column (as added by the processing step 270/1 during the loading of that data), and a deduplication merge rule used when loading that data. Similarly, the encoded data group 245/6 may also include such source and destination data, as well as additional data corresponding to the NLP processing performed for it, such as the NLP string used to generate the categorization, the start and end characters of that string, one or more associated assertions (if any), the resolved code corresponding to the categorization, and one or more confidence values (e.g., corresponding to the repair categorization, the resolved code, each associated assertion, any relationships of the encoded data group to other encoded data groups, etc.). Some or all of the graph edges may similarly store data, such as illustrated for the graph edge between graph nodes 270/2 and 245/4, which stores unique IDs for the start node 270/2 and end node 245/4, a unique job ID corresponding to the NLP processing that is performed and a date and time of that processing, a unique output data ID, etc. In addition, the encoded calculation data group graph node 257/1 may also store source and destination data in a manner similar to that of graph node 250/1, along with additional information related to the calculation that is performed, such as a unique ID and version of a rule performed to generate the calculated data. While the stored data is illustrated for only a few graph nodes in graph edges, it will be appreciated that such information may be stored for some or all of the graph nodes in graph edges.

FIG. 2G continues the examples of FIGS. 2A-2F, and illustrates example data 285a-285f that may be extracted and linked from various medical documents, including in this example to have general information 285a, key-value pairs 285b, test results 285c, medical procedures performed 285d (and resulting information), medications 285e, medical history information 285f, etc. Extracting repair data corresponding to an associated entity (e.g., the patient or other entity on which the repair activities are performed) may include identifying particular repair activities performed and corresponding results for a particular associated patient or other entity, including to determine values for particular attributes of the associated patient or other entity.

Figure 2I:
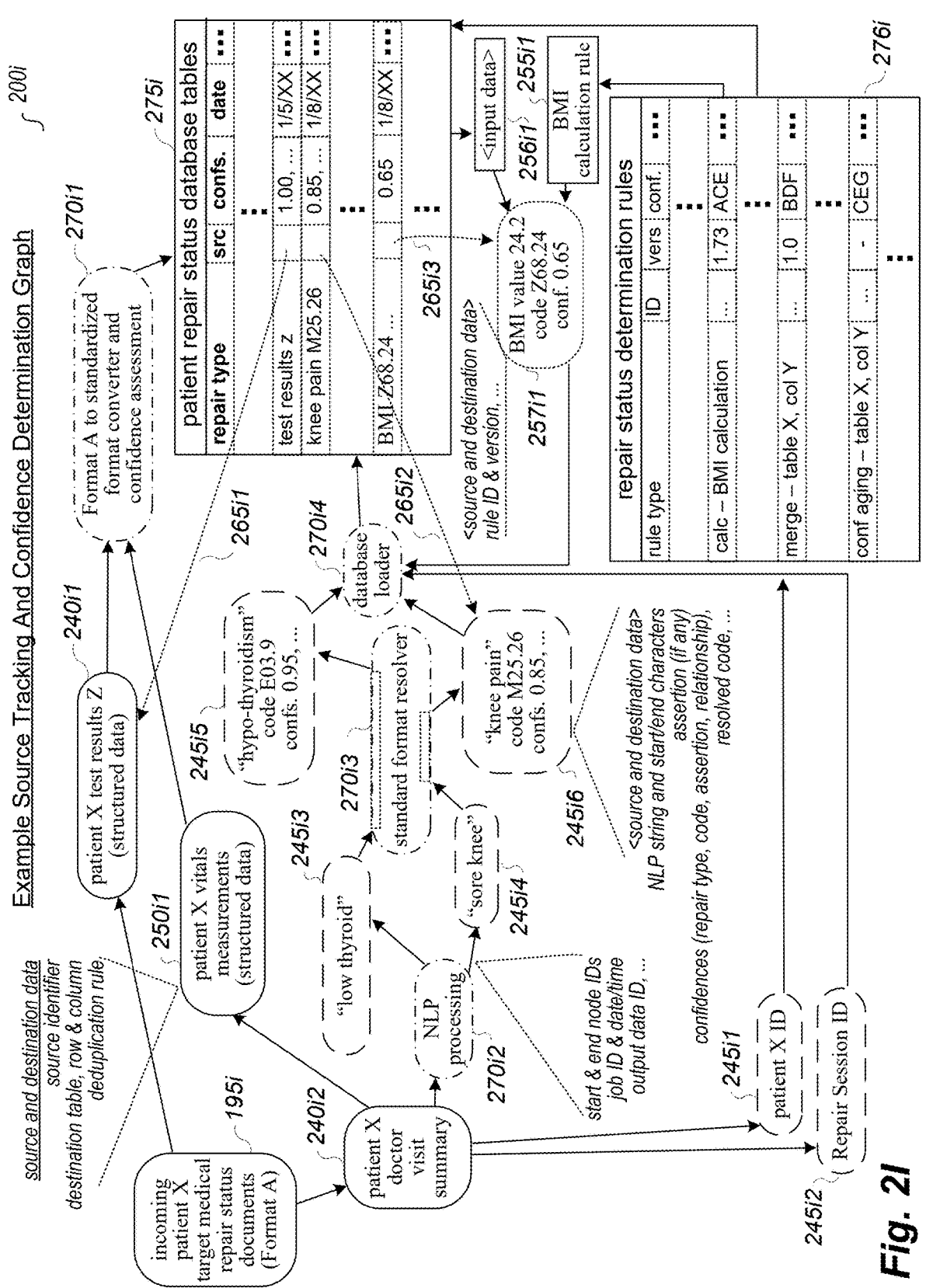

FIG. 2I continues the examples of FIGS. 2A-2H, and illustrates information 200i corresponding to an example source tracking and confidence determination graph. In particular, in this example, the processing may begin with analyzing one or more incoming repair status documents corresponding to medical information for a particular patient (Patient X), with a corresponding graph node 195i created in the source tracking graph to represent the document(s)—in some embodiments and situations, a separate graph node will be created for each incoming document. Additional graph nodes 240 may then be created for various information extracted directly from the incoming document(s), such as a graph node 240i1 corresponding to one or more data groupings with data for particular test results Z in a structured data format (e.g., from a first incoming document), and a graph node 240i2 corresponding to a summary of a medical visit/session for Patient X (e.g., from a second incoming document). Particular data items extracted from the medical visit/session summary include an ID for the patient that is represented in graph node 245i1, an ID for the medical visit/session that is represented in graph node 245i2, one or more additional data groupings corresponding to additional structured data about particular vitals measurements for the patient that are represented in graph node 250i1 (although each separate data grouping will have a separate graph node in at least some embodiments), and additional unstructured data that is passed to an NLP processing module represented in graph node 270i2. The results of the NLP processing include a first data grouping corresponding to the extracted text of "low thyroid" and represented by graph node 245i3, and a second data grouping corresponding to the extracted text "sore knee" and represented by graph node 245i4. In this example, the data of the first and second data groupings in graph nodes 245i3 and 245i4 are both sent to a standard format resolver processing step represented by graph node 270i3, which generates an encoded data group 245i5 corresponding to the low thyroid message for data grouping 245i3 (in this example corresponding to a categorization of hypo-thyroidism, given a standard code of E03.9, and assigned one or more confidence values as shown), and an encoded data group 245i6 corresponding to the sore knee for data grouping 245i4 (in this example corresponding to a categorization of knee pain, given a standard code of M25.26, and assigned one or more confidence values as shown). The encoded data groups represented in graph nodes 245i5 and 245i6 are each then passed to a database loader processing step represented in graph node 270i4, which loads the corresponding encoded data groups into one or more database tables 275*i* using a standardized format. Similarly, the information represented in graph nodes 245*i*1 and 245*l*2 are also passed to the database loader processing step for similar loading into the one or more database tables. The data groupings for the structured data represented in graph nodes 240*i*1 and 250*i*1 are passed to a related processing step represented in graph node 270*i*1 that converts the structured data format(s) to a data model used by the database tables 275*i*, along with assigning associated assessed confidence values, and loading resulting encoded data groups into the database tables 275*i* in a common format with the data groups resulting from the unstructured data.

In addition to the data loaded into the one or more database tables 275*i* that is extracted from incoming documents, the database tables may further store additional calculated data that is based on other data stored in the database tables. As one example, a defined type of data of interest to calculate may be a patient's BMI value, such as based on one or more data values extracted from the database and represented by one or more graph nodes 256*i*1 (e.g., weight, height, etc.), and using a rule to calculate that value represented by graph node 255*i*1 in this example and retrieved in this example from a group of defined rules 276*i* (e.g., also stored in the one or more database tables 275*i*). In this example, the encoded calculation results data group 257*i*1 includes an estimated value of 24.2, with a categorization type of BMI value, an associated standardized code of Z68.24, one or more associated confidence values as shown, etc., and with the corresponding encoded data group similarly provided to the database loader step represented in graph node 270*i*4 for loading into the one or more database tables 275*i* in the common format. It will be appreciated that such calculated encoded data groups may be generated at various times, such as dynamically upon request using the most current corresponding input data values, whenever one or more of the input data values changes from new incoming data, and/or when one or more other criteria are satisfied (e.g., a defined amount of time is passed since a prior calculation, a confidence value associated with the calculated data value drops below a defined threshold or otherwise satisfies one or more defined criteria due to aging, etc.). The rules 276*i* may also be of additional types other than calculation rules, including in this example to include deduplication merge rules associated with particular tables and columns and used to manage having multiple values for a given data element, aging rules for confidence values that are associated with particular tables and columns and used to reduce or otherwise change confidence values over time, etc.

As part of the dataflow processing represented by the graph nodes and the graph edges between pairs of them, various information may be stored in some or all graph nodes and graph edges. For example, with respect to the data grouping represented by graph node 250*i*1, the node may store information related to source and destination for that data grouping, such as a unique source identifier, a destination table, row and column (as added by the processing step 270*i*1 during the loading of that data), and a deduplication merge rule used when loading that data. Similarly, the encoded data group 245*i*6 may also include such source and destination data, as well as additional data corresponding to the NLP processing performed for it, such as the NLP string used to generate the categorization, the start and end characters of that string, one or more associated assertions (if any), the resolved code corresponding to the categorization, and one or more confidence values (e.g., corresponding to the repair categorization, the resolved code, each associated assertion, any relationships of the encoded data group to other encoded data groups, etc.). Some or all of the graph edges may similarly store data, such as illustrated for the graph edge between graph nodes 270*l*2 and 245*i*4, which stores unique IDs for the start node 270*l*2 and end node 245*l*4, a unique job ID corresponding to the NLP processing that is performed and a date and time of that processing, a unique output data ID, etc. In addition, the encoded calculation data group graph node 257*i*1 may also store source and destination data in a manner similar to that of graph node 250*i*1, along with additional information related to the calculation that is performed, such as a unique ID and version of a rule used to generate the calculated data. While the stored data is illustrated for only a few graph nodes in graph edges, it will be appreciated that such information may be stored for some or all of the graph nodes in graph edges.

As one non-exclusive example embodiment of analyzing incoming repair status information to generate and store resulting encoded data groups having associated source tracking information and confidence values, the described techniques may be used for ingesting information about healthcare service delivery in a wide-ranging variety of formats and creating a high-quality, reproducible, traceable dataset of information that can be used to provide a complete, longitudinal view of a patient's healthcare journey or to support population-level research, quality measurement, and reporting. Each fact in the dataset can be traced back to its source and the logic that placed it there. In contrast to prior healthcare Extract/Transform/Load (ETL) processes, the described techniques may include some or all of the following: use of natural language processing (NLP) tools to extract clinical meaning from unstructured text resources and include it in the dataset; an ability to consume data from images or PDF documents and extract information from included text; continual linkage from every data point back to the processes and documents that generated it; confidence value scores for each data point that allow assessment of the reliability of the process that generated it; and a configurable rules engine that allows different data elements to be processed.

In this non-exclusive example embodiment, automated operations may include consuming data streams in their native form and streaming them through processing steps that separate text artifacts from structured data and that sends text data through a natural language parsing pipeline to perform some or all of the following: extract any healthcare related entities (e.g., conditions, procedures, drugs, personal information, caregiver, etc.); extract assertions (e.g., indications of whether particular information is present, negated, occurred in the past, hypothetical, or is related to another person); extract relationships indicating that two or more entities are related to each other in some way (e.g., a "Blood Pressure" measurement entity is related to a value entity of "120/80"); perform code resolution normalization of such data to standard concept identifiers in medical taxonomies such as SNOMED-CT, RxNorm, and LOINC (Code Resolution); send structured data through a conversion pipeline to extract and format information in a consistent form for processing that is compatible with the output of the natural language parsing pipeline; and merge and deduplicate these inbound streams of information into a single dataset in a standard OMOP (Observational Medical Outcomes Partnership) CDM (Common Data Model) version 5.4 form, using a configurable rules engine that retains the original provenance information for each data point. The complete dataset is used as a foundation for enriched data generation, such as by using configurable rules to generate measures of interest such as BMI (body mass index), comorbidity risk scores, CMS (Centers for Medicare & Medicaid Services) risk adjustment scores, etc., such as based on conventions established in peer-reviewed literature and industry standards, and with the enriched dataset made available to query with traditional SQL tools or with the support of large language model-based tools that can use a conversational approach to developing and refining requests for information.

To enhance the utility and trustworthiness of this data in this non-exclusive example embodiment, multi-layered source tracking explainability may be used for every individual datum, calculation, and inference produced by the system. With respect to explainability, a single datum can arise from one of two sources, either originating directly in source data or being calculated from other data. Information about information sources is carried forward from the point of ingestion until it is recorded in a provenance database table, with that information returned when the associated data is requested from the system (e.g., along with pointers or other links to every source document) along with the confidence value(s) representing the assessed quality of the information. This provides a direct, one-query linkage from any given data element back to its source. Such source tracking data provenance may be represented as a directed, acyclic graph linking data sources to each other with edges that describe transformations and carry key metadata. In such a source tracking graph, provenance graph nodes represent datasets, data-points, and calculations, and may contain some or all of the following: a unique identifier locating a specific source document, resource, or record; if from a database, a code representing the table and column from which it was taken; a code representing the table and column where the datum rests; a unique row identifier for where the datum rests; a rule used to address deduplication when adding the datum to the database if a prior version of the data is already present; for a datum resulting from NLP processing, the start and stop characters, the specific string processed, the code to which it was mapped, any assertion(s) associated with the element, an entity recognition confidence value, a code resolution confidence value, an assertion confidence value, a type and version information for the NLP pipeline, the date/time of the source document, the date/time at which the NLP processing occurs; for a calculated datum, an identifier and version of a rule used to generate the calculation. In such a source tracking graph, provenance graph edges may include some or all of the following: unique identifiers of the source and destination graph nodes linked by the edge; an identifier of the target data value; a date/time of the placement of the datum in the destination; a job ID of the transformation that generated this datum; etc.—for calculations, edges may be included to every data point used in the calculation as well as to the result, and when a calculation's output is itself used as input to a further calculation, it will likewise be linked onward to an additional corresponding calculation node. In addition to linking data points in the end dataset back to their sources, the source tracking provenance graph may be used to trigger recalculations as the dataset is updated—post-update, each calculation in the dataset is traced back to its source data, and if that information has changed, the result may be recalculated.

To further enhance the utility and trustworthiness of this data in this non-exclusive example embodiment, confidence value determination may be used for every individual datum, calculation, and inference produced by the system. With respect to confidence value determination, input data from an electronic health record and/or in structured data fields may be treated as accurate (e.g., a confidence value of 1.0 on a scale of 0 to 1), while input arising from other sources is given a default confidence value that reflects the overall quality of the source. Information that is imputed by algorithm (e.g., an NLP processing step or some other computation) is given a confidence value that represents the quality of the data. NLP processes in this pipeline produce specific confidence value scores for some or all of the following: entity detection; code resolution; assertion; relationship modeling; etc., and one or more of these confidence values may be used when a datum is used in another calculation. Confidence values are subject to change over time—for example, the value of a given lab result or diagnosis can be set to degrade at an assigned rate as time passes. Confidence values may also be grouped into categories, such as the following: regulatory-grade evidence (e.g., a diagnosis documented within structured electronic health record data, such as in a confidence value range from 100% down to X %); intermediary-grade evidence (e.g., relying on assumptions, unstructured data, or old values, such as in a confidence value range from X–1% down to a lower Y %); low-grade evidence (e.g., having a low-quality determination process and/or based on one or more other low-confidence values, such as in a confidence value range from Y–1% down to 0). Confidence values are produced as input data from multiple sources are merged, with deduplication and merging take place at the field level, meaning that each column in each record has the best-possible quality information given the available incoming information.

Merging rules in this non-exclusive example embodiment can be specified at the table level and at the column level, with tables processed in a specific order to preserve referential integrity in child records. Each table is configured with certain columns that indicate an absolute match: for PERSON, if PERSON_SOURCE_VALUE is the same, the tool merges all records with that value. The match rules can be more complex, however. For example, a record in the VISIT_OCCURRENCE table has a start date and an end date, and two VISIT_OCCURRENCES are not permitted to have dates that overlap, such that the rule resolves and condenses overlapping visits. CONDITION_OCCURRENCE has a complex match rule that has absolute matches on PERSON_ID and CONDITION_START_DATE but an approximate match on the condition itself. Approximate match specifies distance in the ontology tree between concepts. For each column in each table, rules for the merge are specified, with each rule stored as a versioned algorithm represented in JSON in a SQL database. Rules that may be applied include the following: maximum value; minimum value; mean value; most common value; highest-confidence value (e.g., one type of confidence value, such as entity recognition confidence, or a specified combination of more than one type of confidence value, or the confidence that a particular value is in fact associated with a particular measurement); most general value (e.g., for values in an ontology, the value highest in the IS_A hierarchy, such as to prefer "Diabetes" to "Diabetes mellitus in mother complicating pregnancy, childbirth and/or puerperium"; for datetimes, less granular values such as "2024-11-15" to "2024-11-15T01:03:32.456Z"; etc.); most specific value (opposite of most general value); newest value; oldest value; etc. Rules serve two goals. First, they shape the data into conformity with data standards and ETL conventions. Second, they are applied in the interest of obtaining the best overall quality of information about a patient and their care. For many columns, a combination of the rules described above will apply. For example, a patient's weight might be the mean of the last three measures as long as each included value's confidence value>0.95 and the last three measures were taken in the last 12 months and none is more than one standard deviation away from the mean value. Rule execution produces two outputs. First, the selected value is placed in the correct table/row/column in the destination table. Second, a new record is inserted in the source tracking provenance table, indicating the source, rules, and destination of the datum.

Thus, the combined dataset in this non-exclusive example embodiment represents facts, measurements, and events from input data that arises from clinical documentation. In addition, the dataset is supplemented by a rich supply of calculated values, such as comorbidity indices or risk scores, which are important to a full understanding of a patient's health. Each such value is calculated from a documented, traceable algorithm that is stored as versioned JSON in the application database. Algorithms are based on current standards and peer-reviewed research. References to the algorithm's source are included as metadata about the calculation. In addition to considering the input values alone, however, each calculation also reads the confidence value for each datum and (pending configuration) may weight the data accordingly in its calculations. Each calculation is also stored with a text description explaining the algorithm in plain language. This description can be used as part of displaying the elements and reasoning that are incorporated in the calculation of the final value. Calculations themselves produce a confidence value score for the data value they produce, with the data value written in an observation table, and the confidence value score written to the data value result's graph node in the source tracking provenance graph, an observation_type_concept_id set to indicate that the value has been calculated per algorithm, and a source tracking provenance record being written to indicate what version of the calculation produced the value, with what confidence, and on what date. Algorithms for calculating the confidence of a derived value may be unique to each calculation and may consider the confidence of each input value, the age of those values, and then apply a customized weighting to different components of the input dataset. In addition, enriched data calculations can depend on each other. For example, the Framingham Risk Index (FRI) score for Hard Coronary Heart Disease relies on Age, Body Mass Index (BMI), Systolic Blood Pressure (SBP), smoking status, and presence/absence of Diabetes to calculate the 10-year risk of cardiovascular disease. Each data element being included in the FRI comes with a confidence score and can be traced back to source data—and when the element is itself a calculated value (such as BMI), its own components are traceable and have their own confidence levels which merge to produce a single confidence value for the BMI ingredient of the FRI calculation. Calculations may also be designed to be persistent, written to the dataset as an "as-of-now" value, or they may be generated on the fly—generally speaking, a value that is "as-of-a-previous-date" will be dynamically generated. The decision of whether to generate on the fly may be made after prioritizing speed against the cost of generating and storing individual calculations. The graph of dependencies underlying each calculated value allows the system to trigger re-calculations when any of the supporting data elements is changed or updated after a data load.

In addition, in this non-exclusive example embodiment, every calculation is stored with key source tracking information to support the information it produces, such as some or all of the following: a plain-English description of the calculation and its source values; configurable JSON which controls the calculation itself; rendered python that produces the specific calculated values as well as derived confidence values, based on interpretation of the configurable JSON; references to peer-reviewed literature and/or authoritative standards that support this definition of the calculation; version control for the calculation; etc. Accordingly, the final dataset provides the following: a complete view of the patient's healthcare journey; integrated information from sources beyond electronic health records; data stored in an internationally recognized standard common format; a dataset enriched with reproducible, industry-standard measures; and data ready for inference and reporting. Every item in this dataset is directly linked via a single table link back to the source that produced it, along with quality/confidence value information. If a query about a calculated value is made, the individual elements that were considered in a calculation are retrieved, along with their sources, and presented. The algorithms used to generate this information are designed to be deterministic and, given the same dataset, reproduce the same result every time they are run, which produces trustworthy information for clinical and scientific purposes.

As another non-exclusive example, incoming medical documents may include free text documents (e.g., clinical notes, discharge reports, nursing notes, radiology reports, etc.) and/or one or more sets of structured data (e.g., a list of result values linked to a single laboratory request, such as from a laboratory information management system) for one or more human patient entities or other entities, some or all of which are each associated with a time value (e.g., with different levels of granularity, such as from a date to milliseconds) and with at least one patient identification value or other entity identification value (e.g., unique identifiers, optionally with multiple separate identifiers being used for a single patient or other entity, such as by different medical service providers or related entities)—in addition, if different medical documents from different sources (e.g., hospitals, clinics, medical offices, laboratories, etc.) use the same identifier for different entities, the ARSDT system may further manage such identifiers separately for the different entities (e.g., using a combination of provider and identifier as an entity identification value, by changing the identifier value for some or all such different entities to be unique, etc.). The ARSDT system may further support various types of structured data and related standards (e.g., using formats and/or standards such as HL7, or Health Leven Seven; FHIR, or Fast Healthcare Interoperability Resources; OMOP, or Observational Medical Outcomes Partnership; etc.) used to store and communicate electronic medical record information.

Continuing with the other non-exclusive example embodiment, and with respect to classification and semantic tagging of the information in the medical documents, the ARSDT system may, for unstructured data (e.g., clinical notes), use one or more pretrained NLP models that classify a clinical document by its type (e.g., nursing note, evolution note, pathology report, list of medications, etc.) and/or identify different sections within a single document (e.g., Subjective, Objective, Assessment and Plan sections in a clinical SOAP note; "Family History" and "Medication List" from a discharge note; etc.). The one or more pretrained NLP models (e.g., Bert, or Bidirectional Encoder Representations from Transformers) may further be used in combination with one or more cognition models and/or clustering techniques (e.g., using one or more KD, or K-dimensional, trees), such as with vector representations optionally used by the NLP model(s) and/or clustering techniques. In addition, the ARSDT system may, for structured data (e.g., electronic medical records in tabular format), map table names and table columns (e.g., based on semantic similarity and/or edit distance, such as using Levenshtein distance) against biomedical terminologies—for example, a column named "SysBlodPress" and another column named "SBP" may be mapped to the SNOMED (Systematized Nomenclature Of MEDicine) concept "Systolic Blood Pressure::271649006". One or more NLP models may further optionally be used to do further processing (e.g., acronym disambiguation and expansion, spell checking, neuromachine translation, lemmatization and stemming, etc.). The ARSDT system may also optionally use value-based rules for disambiguation during semantic tagging such as, for example, if a column named "SBP" is determined by semantic similarity (e.g., using embedded mediated techniques) to refer to "Systolic Blood Pressure" but all values are between 0 and 1 (when the range of acceptable systolic blood pressure has been defined by a rule as, for example, 50 to 250) that column will instead not be used to represent Systolic Blood Pressure.

Continuing with the other non-exclusive example embodiment, and with respect to extraction of data groupings from the information in the medical documents, the ARSDT system may, for unstructured data (e.g., in a natural language format), perform four tasks (e.g., in a sequence), including entity recognition, entity assertion, entity resolution (e.g., against controlled vocabularies), and entity relationship extraction. The entity recognition task may include, for example, using a name entity recognition deep learning model trained to assign a semantic type (e.g., "disease", "symptom", "medication", "dosage", "others", etc.) for every token (e.g., word) in a text sequence—the task may, for example, include using a lookup table (e.g., based on GloVe, or Global Vectors for Word Representation) for fast processing and/or an NLP model (e.g., Bert) for greater accuracy but using additional time. The entity assertion may include, for example, using a deep learning model that is trained to classify some or all entities (e.g., excluding a catchall "others" class), such as "negation", "hypothesis", "relative to other person", "confirmation", etc.—for example, if a text says "The patient does not have schizophrenia", entity "schizophrenia" is identified to have a "negated" relationship for that segment of text, such as with respect to the patient entity. The entity resolution may include, for example, using a model that is trained to, given a controlled vocabulary of reference (e.g., using the International Classification of Diseases, such as ICD-10) and a previously identified entity (e.g., the chunk "pulmonary hypertension" identified as "Disease"), select and rank the elements of the controlled vocabulary that are semantically closest to that chunk—in this example, the processing may assign the chunk "pulmonary hypertension" to the ICD-10 code "127.20 Pulmonary hypertension, unspecified". The entity relationship extraction for unstructured data may include, for example, using one or more models trained to establish relationships between different entities found in the text—for example, if the source states that "the patient is on ibuprofen 500 mg to treat his pain" and the entities "ibuprofen (drug)" and "500 mg (dosage)" and "pain (disease)" have been identified previously, this model is able to add a relationship of "treatment for" between "ibuprofen" and "pain" and a relationship of "dosage of" between "500 mg" and "ibuprofen", as well as to associate all of that information with that patient. The entity relationship extraction for structured data (e.g., a table with prescription data) may include, for example, using semantic column resolution as a first step, in a manner similar to the semantic tagging discussed above, but using a smaller list of "semantic classes" rather than a whole controlled vocabulary of hundreds or thousands of concepts (e.g., similar to the list of semantic classes of trained NLP name entity recognizers)—for example, if a first column is named "SysBloodPress" and a second column is named "Temperature", a semantic type assigned to both may be "clinical_measure", but during classification and semantic tagging the first column may be mapped to "Systolic Blood Pressure" and the second column to "Temperature". A second step may include assigning relationships between the different values found in different columns and/or tables based on a database schema in use—for example, if a database is among the input information with the following tables:

| Table diagnoses: | | | |
|---|---|---|---|
| UID | Patient ID | Date | Diagnosis |
| 1 | 1 | Jan. 3, 2018 | Hypertension |
| 2 | 1 | Apr. 5, 2019 | Anemia |

| Table prescriptions: | | | | | |
|---|---|---|---|---|---|
| UID | Patient ID | Date | Medication | Dosage (mg) | Diag_uid |
| 1 | 1 | Feb. 5, 2018 | Losartan | 20 | 1 |
| 2 | 1 | Jan. 2, 2019 | Hydrochlorothiazide | 25 | 1 |

The following semantics may be generated

| Table | Column | Class |
|---|---|---|
| diagnoses | Date | Date |
| diagnoses | Diagnosis | Disease |
| prescription | Date | Date |
| Prescription | Medication | Drug |
| Prescription | Dosage(mg) | Dosage | and the entities and relationships shown in information 290a of FIG. 2G may be generated (e.g., based on co-occurrence in the same row of a table or by analyzing the database schema).

Continuing with the other non-exclusive example embodiment, and with respect to temporal attribution for the information in the medical documents, the ARSDT system may represent a sequence of data for a single patient along a timeline by assigning a time value for every piece of data. For example, the ARSDT system may determine an overall time for a document or other group of information, and initially assign that overall time to each piece of data extracted from that group of information—however, some data pieces (often in unstructured data and/or freeform text) have time references expressed in a relative manner (e.g., "she presents fever since 2 weeks ago", "anemia during his infancy", "pain for several days", etc.) and/or lacking detail or specificity (e.g., "the patient was diagnosed of cancer in 2021", etc.), and the ARSDT system may use one or more entity recognizers that are trained to identify different time references and units and to match corresponding information (e.g., natural language time expressions) to time periods (e.g., combining a relative time reference such as "two days ago" with an overall current date for the associated document or other group of information such as 2020-01-15 to infer that "two days ago" means 2020-01-13). In addition, in order to represent time references in a systematic manner, the ARSDT system may further generate a probability function for some or all pieces of data (e.g., a probability function whose area totals 1 with the timeline being the abscissa, or horizontal "X", axis). A simplex approach can be used in which a probability of 1 is assigned to the median second of the time period associated with that piece of data—for example, if the overall initial time is expressed as a day such as 2022-02-01, the time probability of that data piece would be of 1.0 (100%) for the 2022-02-01 12:00:00 second, while if the overall initial time is expressed as a year the time probability of that data piece would be assigned to be 1.0 during the 2021-07-02 12:00:00 second (middle second of the middle day of the year), etc. Alternatively, the ARSDT system can instead (e.g., based on its configuration) apply a homogeneous probability (e.g., a rectangular probability distribution) along the time unit expressed in the document or other group of input information—for example, if the source time is expressed as a day such as 2022-02-01 and given that a single day has 86,400 seconds, a probability of 1/86400 will be assigned to every second of that day so that the sum of probabilities for that day is equal to 1. For less specific time references (e.g., "many days ago", "during his infancy", "some time ago", etc.), the ARSDT system may use one or more time probability functions (e.g., normal distribution, continuous Bernoulli distribution, Kumaraswamy distribution, Log-normal distribution, etc.) to represent different time uncertainty patterns, with information 290b of FIG. 2G illustrating one example of such a time probability function.

Continuing with the other non-exclusive example embodiment, and with respect to storing extracted data from the medical documents, the ARSDT system may store the extracted data in a database, and may determine a schema to use that represents possible entity classes and relations between them, such as by inferring the different entities and relationships based on what has been observed in the information being input (e.g., relationships found by NLP-based entity relation extractor models and/or in original input structured database schemas), and/or by predefining at least some such valid relationships and entities before analysis of a group of information to be analyzed. Time probability functions and relationship assertions (e.g., confirmed, negated, hypothesis, etc.) are also stored along with data pieces and relationships. Information 290c of FIG. 2G illustrates one example in which inferred and/or predefined relationship information is illustrated—it will be appreciated that an actual database representing input information will further include a variety of patient-specific information. The use of such a database enables relationships to be explicitly modeled and used, and provides various benefits as discussed elsewhere herein.

Continuing with the other non-exclusive example embodiment, and with respect to validation of data input from the information in the medical documents and the determination of corresponding inconsistencies (e.g., with respect to relationships, associated time data, etc.), the ARSDT system may use an ontology reasoner with a set of rules (e.g., tens of rules, hundreds of rules, thousands of rules, etc.) to determine if there are pieces of data whose entity-entity relationships and/or entity-entity co-occurrence (e.g., time-based co-occurrence restrictions) are inconsistent with the rules. For example, rules may have forms such as "a patient cannot have a menopause status and a pregnancy status at the same time", "a patient with a female status cannot have prostate cancer at any time", "a patient with a previous cholecystectomy cannot have a new cholecystectomy later on" (as once the gallbladder has been removed it cannot be removed anymore), etc., with information 290d of FIG. 2G illustrating one example of such a rule. In addition, stored ontologies in a format (e.g., SNOMED or ICD-10 controlled vocabularies) may be imported and used for the generation of some subsumption and sibling relationships in at least some embodiments—for example, inclusion of such an ICD-10 graph may automatically produce a subsumption rule such a "a pneumonia is an infectious disease", "a pneumonia is a respiratory disease" and a siblings exclusion rule that "a bacterial pneumonia cannot be a viral pneumonia", with similar information 290c illustrated in FIG. 2G. When a new group of data pieces is loaded into the database, the ontological rules may be used to determine and report inconsistencies (e.g., to an operator user of the ARSDT system, optionally along with a list of possible solutions).

Continuing with the other non-exclusive example embodiment, and with respect to using stored information to answer natural language queries, the ARSDT system may receive and respond to various types of queries—for example, the system may support at least queries related to entity relationships (e.g., "what are the most frequent enalapril dosages used for the treatment of hypertension in comparison with the treatment of chronic heart failure"?), queries related to groups (or "cohorts") of patients sharing one or more common attributes or otherwise satisfying one or more specified criteria (e.g., corresponding to one or more of a time-based criteria, such as "patients with heart attacks registered between 2019 and 2021"; inclusion criteria, such as "males, over 65 years old at Jan. 1, 2019 with a diagnosis of hypertension"; exclusion criteria, such as excluding or not including "patients in treatment with losartan"; etc.), queries related to specific patients (e.g., "is patient XXX allegoric to aspirin" or "when did this patient have a prescription for WWW"), etc. Information 295a-295c of FIG. 2H illustrates examples of such queries. For a query that is not specific to one or more particular patients, the ARSDT system may convert the query into a database format, and use the converted query to determine and provide a list or other grouping of information about a group of one or more patients that match the query (e.g., in a relational database format, such as using an OMOP schema). To support such natural language queries, the ARSDT system may, for example, train and use an NLP transformer model (e.g., sequence to sequence)—in some embodiments, an existing language model (e.g., T5, GPT2, GPT3, etc.) is adapted for the specific task of transforming a natural language query into the query language of the database (e.g., SQL), such as by using a list of paired natural language queries and corresponding database queries.

Non-exclusive examples of types of data that may be extracted from medical records in at least some embodiments include one or more of the following:

| Patient Information |
| --- |
| Age |
| Fetus Or Newborn |
| Birth |
| Gender |
| Race Or Ethnicity |
| Social Determinant Of Health |

-continued

Patient Information

Employment Status
Relationship Status
Sexual Orientation
Female Reproductive Status
Alcohol Intake
Smoking
Medical Family History

Medical Record

Clinical Department
Medical Record Section Header
Medical History Header
Vital Signs Header

Temporal

Date
Relative Date
Time
Relative Time

Oncology

Oncological Disease
Tumor Finding
Cancer Staging
Cancer Modifier
Metastasis

Diseases

Disease Or Syndrome Or Disorder
Symptom
Clinical Modifier
Injury Or Poisoning
Psychological Condition
Overweight
Obesity
Kidney Disease
Diabetes
Cerebrovascular Disease
Hyperlipidemia
Heart Disease
Communicable (Infectious) Disease
Hypertension
Death

Maternal Health

Pregnancy
Labor Delivery
Puerperium

Clinical Measurements

Weight
Height

-continued

Clinical Measurements

Body Mass Index
Blood Pressure
Respiration
Temperature
O2 Saturation
Pulse
Triglycerides
HDL Cholesterol
LDL Cholesterol
Total Cholesterol

Medical Tests

Medical Test
Medical Test Findings
Imaging Medical Test
Imaging Medical Test Findings
Electrocardiogram Findings

Medical Procedures And Treatments

Treatment
Medical Procedure
Oncology Therapy
Oxygen Therapy
Diet
Vaccine
Allergen
Medical Device

Medication Information

Drug Brand Name
Drug Ingredient
Substance
Substance Quantity
Drug Strength
Dosage
Route Of Administration
Drug Form
Drug Frequency
Drug Duration

Anatomical

External Body Part
Internal Organ
Direction

Patient Information

Age
Fetus Or Newborn
Birth
Gender
Race Or Ethnicity
Social Determinant Of Health
Employment Status
Relationship Status
Sexual Orientation
Female Reproductive Status -continued

| Patient Information |
| --- |
| Alcohol Intake |
| Smoking |
| Medical Family History |

Non-exclusive examples of types of documents from which medical data may be extracted in at least some embodiments include one or more of the following:

| Document Type |
| --- |
| Alcohol And/Or Substance Abuse Service Attachment |
| Ambulance Records |
| Ambulatory Cardiac Rhythm Monitor (Holter) Study |
| Anesthesia Records |
| Anoscopy Study |
| Arthroscopy Study |
| Attending Discharge Summary |
| Attending Initial Evaluation Note |
| Attending Progress Note |
| Audiology Study |
| Autopsy Report |
| Bronchoscopy Study |
| Cancer Related Multigene Analysis In Plasma Cell-Free DNA By Molecular Genetics Method |
| Cardiac Catheterization Study |
| Cardiac Electrophysiology Study |
| Cardiac Service Attachment |
| Cardiac Stress Study Procedure |
| Chemotherapy Records |
| Chiropractic Episode Of Care Medical Records |
| Chiropractic Medicine Initial Evaluation Note |
| Chiropractic Medicine Progress Note |
| Colonoscopy Study |
| Colonoscopy Study Through Stoma |
| Colposcopy Study |
| Consult Note |
| Consultant Initial Evaluation Note |
| Consultant Progress Note |
| Courtesy Consultation Document |
| Critical Care Records |
| Ct Study |
| Dentist Operation Note |
| Dentistry Discharge Summary |
| Dentistry Initial Evaluation Note |
| Dentistry Note |
| Dentistry Procedure Note |
| Dentistry Progress Note |
| Diagnostic Imaging Study |
| Dialysis Records |
| Discharge Summary |
| EEG Study |
| EGD Study |
| EKG Study |
| Electromyogram Study |
| Emergency Department Medical Records |
| Emergency Department Progress Note |
| Endoscopy Study |
| Enteroscopy Study |
| Enteroscopy Study Through Stoma |
| ERCP Study |
| Esophagoscopy Study |
| Exercise Stress Test Study |
| Eye Ultrasound Study |
| Flexible Sigmoidoscopy Study |
| Heterophoria Study |
| Hospice Care Note |
| Hospital Consultations Document |
| Initial Evaluation Note |
| Labor And Delivery Records |
| Laboratory Report |
| Medical Records |
| Medical Social Services Attachment |
| Mg Breast Study |
| Mr Study |
| Neonatal Intensive Care Records |

-continued

| Document Type |
| --- |
| Nerve Conduction Study |
| Nuclear Medicine Study |
| Nurse Initial Evaluation Note |
| Nurse Practitioner Initial Evaluation Note |
| Nurse Practitioner Progress Note |
| Nurse Progress Note |
| Nurse Transfer Note |
| Nursery Records |
| Nystagmogram Study |
| Occupational Therapy Episode Of Care Medical Records |
| Occupational Therapy Initial Evaluation Note |
| Occupational Therapy Note |
| Occupational Therapy Progress Note |
| Occupational Therapy Service Attachment |
| Outpatient Consultation 2nd Opinion |
| Pathology Study |
| Perimetry Study |
| Perioperative Records |
| Peritoneoscopy Study |
| Physical Therapy Episode Of Care Medical Records |
| Physical Therapy Initial Evaluation Note |
| Physical Therapy Note |
| Physical Therapy Progress Note |
| Physical Therapy Service Attachment |
| Physician Discharge Summary |
| Physician Emergency Department Note |
| Physician Episode Of Care Medical Records |
| Physician History And Physical Note |
| Physician Initial Evaluation Note |
| Physician Procedure Note |
| Physician Transfer Note |
| Physician, Operation Note |
| Plan Of Care Note |
| Podiatry Episode Of Care Medical Records |
| Podiatry Initial Evaluation Note |
| Podiatry Operation Note |
| Podiatry Procedure Note |
| Podiatry Progress Note |
| Polysomnography (Sleep) Study |
| Portable Xr Study |
| Procedure Note |
| Progress Note |
| Provider-Unspecified, History And Physical Note |
| Psychiatric Service Attachment |
| Psychiatry Initial Evaluation Note |
| Psychiatry Note |
| Psychiatry Progress Note |
| Psychiatry Study |
| Psychology Episode Of Care Medical Records |
| Psychology Initial Evaluation Note |
| Psychology Progress Note |
| Replacement Of Percutaneous Gastrojejunostomy Upper GI Tract Document |
| Respiratory Therapy Service Attachment |
| Radiographic Fluoroscopy Study |
| Social Service Episode Of Care Medical Records |
| Social Worker Initial Evaluation Note |
| Social Worker Note |
| Social Worker Progress Note |
| Spect Study |
| Speech Therapy Episode Of Care Medical Records |
| Speech Therapy Service Attachment |
| Speech-Language Pathology Initial Evaluation Note |
| Speech-Language Pathology Note |
| Speech-Language Pathology Progress Note |
| Spirometry Study |
| Surgical Operation Note |
| Surgical Pathology Study |
| Temperature Charts |
| Tonometry Study |
| Transfer Summary Note |
| Ultrasound Study |
| Visual Acuity Study |
| X Ray Study |

Non-exclusive examples of types of document sections from which medical data may be extracted in at least some embodiments include one or more of the following:

| Document Sections |
| --- |
| Advance Directives |
| Allergies And Adverse Reactions Document |
| Chief Complaint Narrative-Reported |
| Complications Document |
| Discharge Diet (Narrative) |
| Evaluation Note |
| Functional Status Assessment Note |
| History General Narrative-Reported |
| History Of Family Member Diseases Narrative |
| History Of Hospitalizations + Outpatient Visits Narrative |
| History Of Immunization Narrative |
| History Of Medical Device Use |
| History Of Medication Use Narrative |
| History Of Past Illness Narrative |
| History Of Present Illness Narrative |
| History Of Procedures Document |
| Hospital Admission Diagnosis Narrative-Reported |
| Hospital Consultations Document |
| Hospital Course Narrative |
| Hospital Discharge Dx Narrative |
| Hospital Discharge Instructions |
| Hospital Discharge Medications Narrative |
| Hospital Discharge Physical Findings Narrative |
| Hospital Discharge Studies Summary Narrative Instructions |
| Medication Administered Narrative |
| Medications On Admission (Narrative) |
| Objective Narrative |
| Payment Sources Document |
| Physical Findings Narrative |
| Physical Findings Of General Status Narrative |
| Plan Of Care Note |
| Planned Procedure Narrative |
| Postprocedure Diagnosis Narrative |
| Problem List Narrative-Reported |
| Procedure Disposition Narrative |
| Procedure Estimated Blood Loss Narrative |
| Procedure Findings Narrative |
| Procedure Implants Narrative |
| Procedure Indications [Interpretation] Narrative |
| Procedure Narrative |
| Procedure Specimens Taken Narrative |
| Reason For Referral (Narrative) |
| Reason For Visit Narrative |
| Relevant Diagnostic Tests/Laboratory Data Narrative |
| Review Of Systems Narrative-Reported |
| Social History Narrative |
| Subjective Narrative |
| Subjective Narrative |
| Surgical Drains Narrative |
| Surgical Operation Note Fluids Narrative |
| Surgical Operation Note Implants Narrative |
| Surgical Operation Note Postoperative Diagnosis Narrative |
| Surgical Operation Note Postoperative Diagnosis Narrative |
| Surgical Operation Note Surgical Complications [Interpretation] Narrative |
| Surgical Operation Note Surgical Procedure Narrative |
| Vital Signs |

Non-exclusive examples of types of NLP models that may be used in at least some embodiments include one or more of the following:

| |
| --- |
| Albert Embeddings |
| Bert Embeddings |
| Deberta Embeddings |
| Distilbert Embeddings |
| Elmo Embeddings |
| Gpt2 Transformer |
| Longformer Embeddings |
| Roberta Embeddings |
| T5 Transformer |

-continued

| |
| --- |
| Universal Sentence Encoder |
| XImroberta Embeddings |
| XInet Embeddings |

Non-exclusive examples of types of cognition models that may be used (e.g., for classification and/or semantic tagging, optionally in combination with one or more NLP models) in at least some embodiments include one or more of the following:

| |
| --- |
| Albert Embeddings |
| Bert Embeddings |
| Deberta Embeddings |
| Distilbert Embeddings |
| Elmo Embeddings |
| Gpt2 Transformer |
| Longformer Embeddings |
| Roberta Embeddings |
| T5 Transformer |
| Universal Sentence Encoder |
| XImroberta Embeddings |
| XInet Embeddings |

Non-exclusive examples of types of clustering techniques that may be used in at least some embodiments (e.g., in combination with one or more NLP models) include one or more of the following:

| |
| --- |
| K-Means |
| Affinity Propagation |
| Spectral Clustering |
| Ward Hierarchical Clustering |
| Agglomerative Clustering |
| Dbscan |
| Optics |
| Gaussian Mixtures Clustering |
| Birch Algorithm |
| Bisecting K-Means |
| Mean-Shift Clustering |

With respect to using one or more language models, each such language model may, in at least some embodiments, be a deep learning model (e.g., based on transformer architecture) that is trained in an unsupervised manner (e.g., with a target task to predict the occurrence of a next word or next sentence or to predict randomly masked words) over very large text corpora. Such language models may thus be able to represent, by a list of numbers (embeddings), any new content provided to them in such a way that similar content (semantically considered) will have similar embeddings (dot product of the embeddings array tend to be higher when both contents are semantically similar). That characteristic provides a vector space semantic representation of any arbitrary textual content, allowing classical clustering algorithms to be applied (e.g., based in difference vector distances as Euclidean or Cosine distances).

With respect to using one or more embedding models, each such language model may, in at least some embodiments, be of one of two types. One type of embedding model is based on lookup tables and generate a vocabulary based on the tokens found in a corpus used during training, assigning a single embedding to every token, and with a single token represented by the same embedding (array of values), thus making the retrieval of the embedding of that token a simple lookup table query. Another type of embedding model is context-aware, with the calculation of an embedding of a token being performed so as to take into account the context (words that surround a particular token in that particular content), such that a single token (e.g., bank) may have different embedding representations depending on the context in which the token appears (e.g., "A dark bank of cloud loomed on the horizon" versus "I must go to the bank and change some money"), resulting in the embeddings representing content being more precise but slower to generate than using lookup tables. In addition, when classifying a token, an embedding model may provide a "confidence" value between 0 to 1 for a most probable label assigned to that token (e.g., a type of entity to which that token belongs, such as may be assigned by a softmax layer of the embedding model), such that the higher the confidence value, the more confident the model is when assigning the label, enabling such confidence values to be used to filter named entities recognized with a high confidence as reported by the model.

With respect to use of one or more models to extract data, non-exclusive examples are described in "Improving Clinical Document Understanding On COVID-19 Research With Spark NLP" by Veysel Kocaman et al. (Dec. 7, 2020, accessible at arXiv:2012.04005v1), and in "Neural Networks For Negation Scope Detection" by Federico Fancellu et al. (Aug. 7-12, 2016, Proceedings Of The 54th Annual Meeting Of The Association For Computational Linguistics), each of which is hereby incorporated by reference.

Non-exclusive examples of semantic general types that may be used in at least some embodiments when extracting data include one or more of the following:

---

Patient Information
Medical Treatment
Medical Problem
Medical Test
Temporal
Location

---

It will be appreciated that questions and other queries in a medical domain may be of various types, such as related to a particular diseases or other medical conditions, particular medical symptoms, particular medicines and other treatments and other health-related activities involved in preventative actions or other actions to improve fitness and wellbeing, particular surgeries and other medical procedures, particular medical devices and other health-related objects used with respect to medical treatments and other health-related activities, particular patients or groups of patients, etc., and that the summarization and encoding of information for a medical domain may include identifying and encoding information about some or all such elements (e.g., diseases or other conditions, symptoms, treatments, medical procedures, medical devices and other health-related objects, patients, etc.). In addition, it will be appreciated that a variety of other types of information may be available and used in other embodiments, including to provide a response in a different format than is shown in the examples of FIGS. 2A-2I.

Various details have been provided with respect to FIGS. 2A-2I, but it will be appreciated that the provided details are non-exclusive examples included for illustrative purposes, and other embodiments may be performed in other manners without some or all such details.

Additional details related to embodiments of a system for analyzing and using repair status data are included in U.S. Pat. No. 11,940,986, filed Aug. 23, 2022 and issued Mar. 26, 2024 and entitled "Determining Repair Status Information Using Unstructured Textual Repair Data In Response To Natural Language Queries" (e.g., with respect to a described ARSD system, and with some embodiments of the described ARSDT system including some or all functionality of such an ARSD system in at least some embodiments), which is incorporated herein by reference in its entirety.

In addition, in some embodiments, the automated operations of the ARSDT system may further include encoding repair status information and/or associated queries in an additional manner, such as to encode content embedding vectors to represent some or all data groupings and to similarly encode additional embedding vectors that represent received natural language queries and are used to identifying similar content embedding vectors, to provide and use a trained validation model to evaluate each candidate data grouping and determine if that candidate data grouping is validated as including a responsive answer to the natural language query (e.g., without determining the particular answer that is present in a candidate content group validated to include a responsive answer), etc. Additional details related to embodiments of a system for generating and using such embedding vectors and associated techniques are included in co-pending U.S. Non-Provisional patent application Ser. No. 17/583,048, filed Jan. 24, 2022 and entitled "Determining Repair Instructions In Response To Natural Language Queries" (e.g., with respect to a described ARID system, and with some embodiments of the described ARSDT system including some or all functionality of such an ARID system in at least some embodiments), which is incorporated herein by reference in its entirety.

Figure 3:
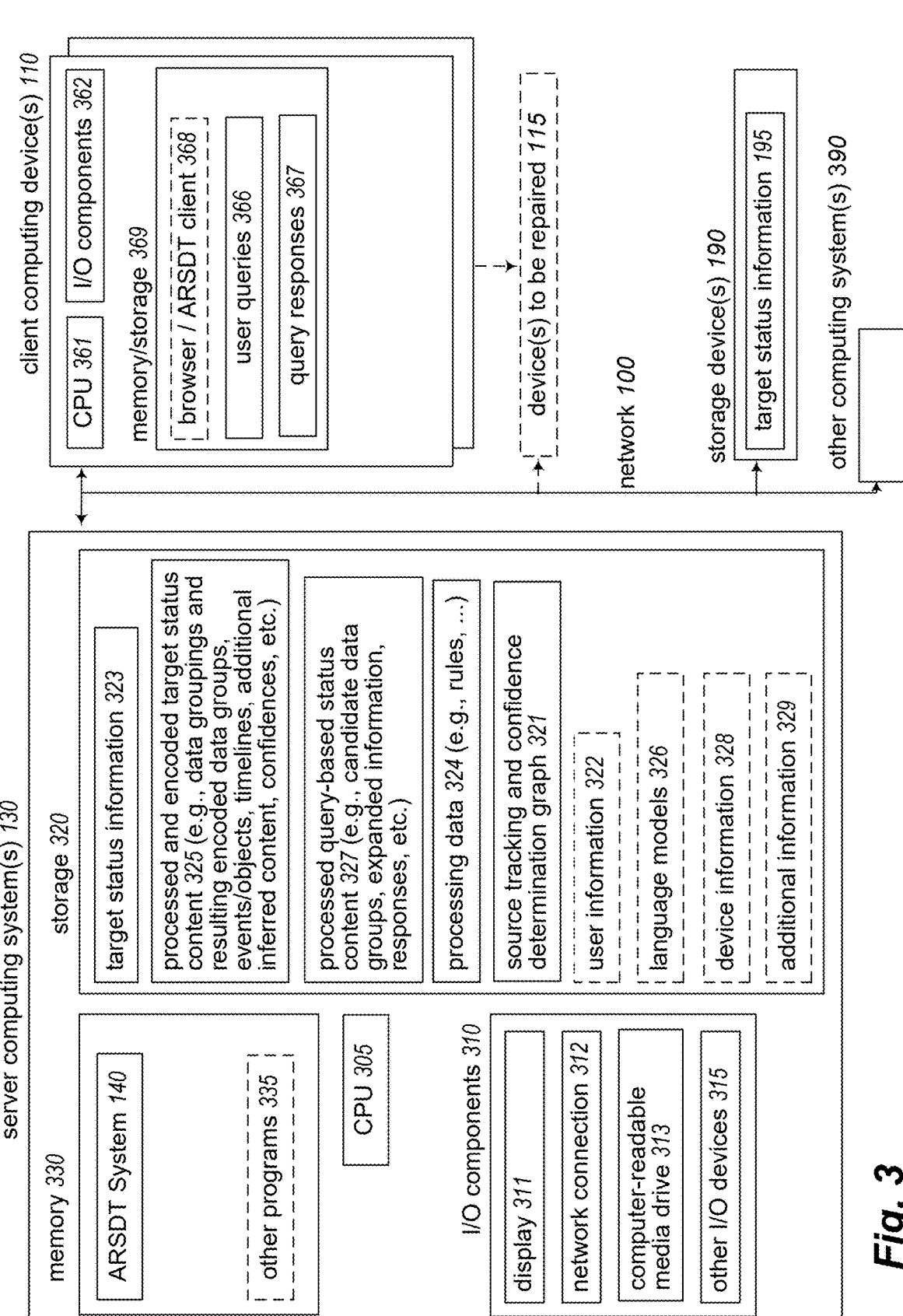
FIG. 3 is a block diagram illustrating an example of a computing system for use in performing described techniques, including automatically determining repair or maintenance status information to provide in response to queries for computing devices or other types of repair or maintenance status information.

FIG. 3 is a block diagram illustrating an embodiment of one or more server computing systems 130 executing an implementation of an ARSDT system 140—the server computing system(s) and ARSDT system may be implemented using a plurality of hardware components that form electronic circuits suitable for and configured to, when in combined operation, perform at least some of the techniques described herein. In the illustrated embodiment, each server computing system 130 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 130 and executing ARSDT system 140 may communicate with other computing systems and devices via one or more networks 100 (e.g., the Internet, one or more cellular telephone networks, etc.), such as user client computing devices 110 (e.g., used to supply queries; receive responses; and use the received response information, such as to implement automated repairs to associated devices 115 and/or to display or otherwise present response information to users of the client computing devices), optionally one or more devices 115 to be repaired (e.g., if the devices include networking capabilities or other data transmission capabilities), optionally other storage devices 190 (e.g., used to store and provide information for one or more target domains/repair areas), and optionally other computing systems 390.

In the illustrated embodiment, an embodiment of the ARSDT system 140 executes in memory 330 in order to perform at least some of the described techniques, such as by using the processor(s) 305 to execute software instructions of the system 140 in a manner that configures the processor (s) 305 and computing system 130 to perform automated operations that implement those described techniques. The illustrated embodiment of the ARSDT system may include one or more components, not shown, to each perform portions of the functionality of the ARSDT system, and the memory may further optionally execute one or more other programs 335. The ARSDT system 140 may further, during its operation, store and/or retrieve various types of data on storage 320 (e.g., in one or more databases or other data structures, such as one or more databases, not shown), such as various types of user information 322, target status information 323 (e.g., local copies of some or all of status information 195 on remote systems such as storage devices 190; domain-specific information to use in customizing the encoding of content for a domain and/or other additional supplemental information; etc.), processed and encoded target status content 325 of one or more types (e.g., data groupings and resulting encoded data groups and associated enhanced and/or supplemental information, such as including timeline data, additional inferred content, etc., and optionally stored in one or more database formats in one or more databases), processed query-based status content 327 (e.g., candidate data groups and associated information such as their expanded information, generated responses, etc.), processing data 324 of various types (e.g., rules of one or more types), one or more source tracking and confidence determination graphs 321, optionally language models 326 to use in generating encoded content, optionally entity-specific information 328 (e.g., related to devices to be repaired or to other entities), and/or various other types of optional additional information 329.

Some or all of the user client computing devices 110 (e.g., mobile devices), devices 115 to be repaired, storage devices 190, and other computing systems 390 may similarly include some or all of the same types of components illustrated for server computing system 130. As one non-limiting example, the computing devices 110 are each shown to include one or more hardware CPU(s) 361, I/O components 362, and memory and/or storage 369, with a browser and/or ARSDT client program 368 optionally executing in memory to interact with the ARSDT system 140 and present or otherwise use query responses 367 that are received from the ARSDT system for submitted user queries 366. While particular components are not illustrated for the other devices/systems 190 and 115 and 390, it will be appreciated that they may include similar and/or additional components.

It will also be appreciated that computing system 130 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ARSDT system 140 may in some embodiments be distributed in various components, some of the described functionality of the ARSDT system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ARSDT system 140 executing on server computing systems 130) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 is a flow diagram of an example embodiment of an ARSDT system routine 400. The routine may be provided by, for example, execution of the ARSDT system 140 of FIGS. 1A and 1B, and/or the ARSDT system 140 of FIG. 3, and/or corresponding functionality discussed with respect to FIGS. 2A-2I and elsewhere herein, such as to automatically determine responses (e.g., repair status information or related information) in response to natural language queries (e.g., with respect to computing devices or other devices, with respect to medical information, etc.) along with associated tracked source information and/or determined confidence values. In the illustrated embodiment, the routine analyzes information about one or more domains of interest at various times (e.g., about one or more devices or other entities, from one or more service providers, etc.), such as to pre-process information about a particular domain (e.g., as instructed by a human operator of the ARSDT system, as requested by a third-party entity, etc.) to determine at least some types of domain-specific information for use in responding to later queries based on such information, while in other embodiments the routine may instead dynamically generate some or all types of domain-specific information in response to requests from users or other entities in at least some situations.

In the illustrated embodiment, the routine 400 begins at block 405, where instructions or other information is received. The routine continues to block 410, where it determines if the instructions or other information received in block 405 are to analyze target status content, such as for a target repair status area or other target domain, and if so continues to block 415 where it retrieves or otherwise obtains the target status information (e.g., uses information received in block 405) to be analyzed (e.g., multiple documents that are part of information for the target domain). In block 420, the routine then initiates execution of an ARSDT Target Status Information Extraction/Standardization component routine to extract and standardize input repair status data into various data groupings for further analysis, such as corresponding to component 142 of FIGS. 1A and 1B, and with one example of a corresponding routine for performing such activities discussed further in FIG. 5. In block 425, the routine then initiates execution of an ARSDT Target Status Information Source Tracking/Confidence Determination/ Encoding component routine to track source information and determine associated confidence values for the repair status data, and encodes data groups corresponding to the data groupings for storage and subsequent use, such as corresponding to component 143 of FIGS. 1A and 1B, and with one example of a corresponding routine for performing such activities discussed further in FIGS. 6A-6B. In block 430, the routine then receives the target status encoded data groups from block 425, and stores the information for subsequent use. It will be appreciated that, while the routine indicates proceeding to block 425 immediately after block 420 and to block 430 immediately after block 425, in other embodiments the routine may operate in an asynchronous manner such that other operations are performed (e.g., corresponding to handling another set of instructions or information that are received in block 405, such as from a different user or other entity) while waiting for a response from blocks 420 and/or 425, and that the operations of blocks 420 and/or 425 may be performed in a substantially immediate manner (e.g., less than one second, less than 10 seconds, less than one minute, etc.) in at least some embodiments.

After block 430, or if it is instead determined in block 410 that the information or instructions received in block 405 are not to analyze content for a target repair status area or other target domain, the routine continues to block 440, where it determines if the information or instructions received in block 405 are to respond to a received query, and if not continues to block 485. Otherwise, the routine continues to block 445 where it obtains a query in natural language form (e.g., using information received in block 405), and then proceeds to block 450 to initiate execution of ARSDT Query Encoding and Matching and Response Determination components' routines, such as to correspond to components 144, 146 and 148 of FIGS. 1A and 1B, and with one example of a corresponding routine for performing such activities discussed further in FIG. 7. In block 455, the routine then receives query response information from block 450, and stores the information for later use, with the query response information then provided in block 480 as a response to the received query. It will be appreciated that, while the routine indicates proceeding to block 455 immediately after block 450, in other embodiments the routine may operate in an asynchronous manner such that other operations are performed (e.g., corresponding to handling another set of instructions or information that are received in block 405, such as from a different user or other entity) while waiting for a response from block 450, and that the operations of block 450 may be performed in a substantially immediate manner (e.g., in a real-time or near-real-time manner, such as a fraction of a second, a second, less than 10 seconds, etc.) in at least some embodiments.

In block 485, the routine proceeds to perform one or more other indicated operations as appropriate, with non-exclusive examples of such other operations including retrieving and providing previously determined or generated information (e.g., previous user queries, previously determined responses to user queries, previously summarized and encoded content for one or more target domains, etc.), receiving and storing information for later use (e.g., information about one or more target domains, such as some or all of a corpus of documents for the domain, domain-specific labeled data groupings or other content for the domain, etc.), providing information about how one or more previous query responses were determined, performing housekeeping operations, etc.

After blocks 480 or 485, the routine continues to block 495 to determine whether to continue, such as until an explicit indication to terminate is received (or alternatively only if an explicit indication to continue is received). If it is determined to continue, the routine returns to block 405 to await further information or instructions, and if not continues to block 499 and ends.

FIG. 5 is a flow diagram of an example embodiment of an ARSDT Target Status Information Extraction/Standardization routine 500. The routine may be provided by, for example, execution of the ARSDT Status Information Extraction/Standardization component 142 of FIGS. 1A-1B and/or a corresponding component (not shown) of the ARSDT system 140 of FIG. 3 and/or with respect to corresponding functionality discussed with respect to FIGS. 2A-2I and elsewhere herein, such as to extract and standardize input repair status data into various data groupings for further analysis. In addition, in at least some situations, the routine 500 may be performed based on execution of block 420 of FIG. 4, with resulting information provided and execution control returning to that location when the routine 500 ends. In this example, the routine 500 is performed with respect to an initial analysis of domain-specific content for a target domain (e.g., medical records and optionally other associated health-related information for one or more patients), but in other embodiments may be similarly performed to update previously analyzed information, such as to analyze additional documents that become available for a domain after a prior analysis of other documents and use of resulting information has been completed. Furthermore, in a manner similar to that of the other routines, the routine 500 may determine domain-specific information in advance of the use of that determined information, and/or dynamically in response to a request for such information.

The illustrated embodiment of the routine 500 begins at block 503, where an indication of target status information to be analyzed (e.g., an indication of a target domain that includes such target status information, particular documents with some or all of the target status information, etc.) is received. In block 505, the routine then obtains documents with information about the target domain and optionally additional domain-specific information (e.g., domain-specific labeled data groupings and/or other content, etc.), such as by using currently provided information about that domain information, using previously stored domain information and/or information about a location of such domain information, by searching for or otherwise dynamically identifying corresponding domain information, etc. In block 520, the routine then extracts the content from the target status information documents and separates the content into multiple data groupings, and optionally generates expanded data grouping information (e.g., with additional inferred content) for each data grouping-some or all such data groupings may include, for example, information about events and objects (and their attributes, if appropriate), about timelines, etc., and with the information of the data groupings validated via consistency checking and/or other operations. After block 520, the routine continues to block 585 to provide the generated information for later use, such as to the requester that initiated invocation of the routine 500. After block 585, the routine continues to block 599 and ends.

FIGS. 6A-6B are a flow diagram of an example embodiment of an ARSDT Target Status Information Source Tracking/Confidence Determination/Encoding routine 600. The routine may be provided by, for example, execution of the ARSDT Status Information Extraction/Standardization component 142 of FIGS. 1A-1B and/or a corresponding component (not shown) of the ARSDT system 140 of FIG. 3 and/or with respect to corresponding functionality discussed with respect to FIGS. 2A-2I and elsewhere herein, such as to track source information and determine associated confidence values for repair status data groupings, and to encode data groups corresponding to the data groupings for storage and subsequent use. In addition, in at least some situations, the routine 600 may be performed based on execution of block 425 of FIG. 4, with resulting information provided and execution control returning to that location when the routine 600 ends. In this example, the routine 600 is performed with respect to an initial analysis of domain-specific content for a target domain (e.g., medical records and optionally other associated health-related information for one or more patients), but in other embodiments may be similarly performed to update previously analyzed information, such as to analyze additional documents that become available for a domain after a prior analysis of other documents and use of resulting information has been completed. Furthermore, in a manner similar to that of the other routines, the routine 600 may determine domain-specific information in advance of the use of that determined information, and/or dynamically in response to a request for such information.

The illustrated example embodiment of the routine 600 begins in block 603, where extracted repair status content data groupings are received. In block 605, the routine then proceeds to retrieve an existing source tracking graph or generate a new source tracking graph, and adds an initial node to the graph to represent the received repair status content. In block 610, the routine then determines if the received repair status content includes any structured data, and if not proceeds to block 620. Otherwise, the routine continues to block 615 where, for each received data grouping of structured data in the repair status content, the routine creates a graph node to represent it that is linked via a created edge to the initial graph node and via another created edge to an existing or created graph node for a format converter processing step, and provides the structured data in that data grouping to that format converter processing step to encode a corresponding data group in a standardized common format (e.g., a domain-specific format). The routine in block 615 further loads the encoded data group into a database, including using specified data merge rule(s) to handle data deduplication if multiple values exist for one or more data elements, and with associated determined confidence value(s) and link(s) to the source(s) of data for the data grouping in the graph. The routine further adds data to the graph node for the data grouping about the data grouping's source ID and about the destination table, row, column in which each data element is stored, and about the associated data merge rule(s), and also adds data to each of one or more of the generated edges about its start and end nodes and about the data processing step's job ID and associated date/time of the processing, and about an output data ID. After block 615, the routine continues to block 620.

In block 620, the routine then determines if the received repair status content includes any unstructured data, and if so continues to block 625 where, for each data grouping of unstructured data, the routine provides the unstructured data to a natural-language processing (NLP) processing step (if not already performed) to determine included repair status data and any associated assertions and/or asserting entities, and creates a graph node to represent the data grouping that is linked via created edges to the initial node (e.g., via an intermediate node representing the NLP processing step). The routine also adds data to the graph node about the data grouping's source ID and about determined data from the NLP processing step, and further adds data to each generated edge about its start and end nodes, and to the edge linked to the created graph node about NLP processing step's job ID and associated date/time of the processing and about output data ID.

In block 630, the routine then, for each data grouping of unstructured data, provides data from its graph node to a resolver processing step to associate a standardized code with a determined category of the repair status data, to determine confidence values in the determined category and in the code and in any associated assertions and/or relationships between data elements, and to create a new resolved data graph node and add data to it to that includes the determined information and data from the NLP processing (e.g., string of characters, start and end characters, etc.) and any assertions. The routine further creates a first edge from the resolved data graph node that is linked to a node for the resolver processing step, and a second edge to a database loader processing step, adds data to each first and second edge about its start and end nodes, and adds data to the first edge about the resolver processing step's job ID and associated date/time and about the generated output data ID.

In block 635, the routine then, for each data grouping of unstructured data, provides data from its resolved data graph node to the database loader processing step to encode a corresponding data group in a standardized common format (e.g., a domain-specific format), and loads the encoded data group into the database using one or more specified data merge rule(s) to handle data deduplication, and with associated determined confidence value(s) and link(s) to source(s) of data for the data grouping in the graph, and further adds data to the resolved graph node about the destination table, row and column in which each data element is stored and about the data merge rule(s) used.

After block 635, or if it is instead determined in block 620 that the received extracted repair status content does not include any data groupings of unstructured data, the routine continues to block 640 to create graph nodes representing a repair session ID and an entity ID from extracted repair status content, provides the IDs to the database loader processing step to encode the data in the standardized format (e.g., a domain-specific format), loads the encoded data into the database with link(s) to source(s) of data for the IDs, and adds data to each graph node about the destination table, row and column in which each data element is loaded.

In block 645, the routine then determines whether to perform any confidence aging activities, such as periodically or as otherwise indicated, and if so continues to block 650 to, for each of some or all of the data elements stored in the database, to use for the data element, and to update the confidence value(s) for the data element in the database per the selected aging rule if appropriate.

After block 650, or if it is instead determined in block 645 to not to confidence aging, the routine continues to block 655 to determine whether to perform any calculated data determinations, such as periodically, whenever new input data is added to the database, when other specified criteria are satisfied, etc. If so, the routine continues to block 660, where it retrieves information about one or more types of data to calculate and associated calculation rule(s) and then, for each type of data to calculate, retrieves one or more types of input data to use in the calculation from the database (including associated confidence value(s)), and create an input graph node for each input data element (if not already created) and adds the retrieved input data of that type to that graph node. The routine further adds created edges from a graph node representing the database to each input graph node with data about its start and end nodes, creates a calculation rule node (if not already created) with information about the calculation rule, and adds created edges from the input graph nodes to the calculation rule node with each having data about its start and end nodes. The routine further generates the calculated data of that type with one or more associated confidence values using the calculation rule and the input data, and creates a calculated data node of that type (if not already created) with the calculated data and associated determined confidence value(s) and associated standardized code. The routine then provides the calculated data to the database loader processing step to create an encoded data group in the standardized common format (e.g., a domain-specific format) and loads the encoded data group into database using specified data merge rule(s) to handle data deduplication, along with associated determined confidence value(s) and link(s) to the source(s) of data for the calculated data in the graph (e.g., the calculated data node). The routine further adds data to the calculated data node about the destination table, row and column for each data element and about data merge rule(s) used, and adds data to the created edge from the calculated data node to database loader's processing step node about the calculation node's data processing job ID and associated date/time and about the output data ID.

After block 660, or if it is instead determined in block 655 not to do any calculated data determinations, the routine continues to block 699 and returns.

FIG. 7 is a flow diagram of an example embodiment of an ARSDT Query Encoding and Matching and Response Determination routine 700. The routine may be provided by, for example, execution of the ARSDT Query Encoding component 144 and ARSDT Matching component 146 and ARSDT Response Determination component 148 of FIGS. 1A-1B and/or of one or more corresponding components (not shown) of the ARSDT system 140 of FIG. 3 and/or with respect to corresponding functionality discussed with respect to FIGS. 2A-2I and elsewhere herein, such as to respond to a received query for a target domain by determining a response to the query using summarized and encoded information about the target domain, including tracked source information and/or determined confidence values for particular data elements. The routine 700 may be initiated by, for example, execution of block 450 of FIG. 4, with resulting information provided and execution control returning to that location when the routine 700 ends. In addition, in a manner similar to that of the other routines, the routine 700 may dynamically determine and provide responses to received queries in the illustrated embodiment, but in other embodiments may determine and store responses to some or all queries for some or all domains in advance of receiving corresponding new user queries (e.g., based on instructions received from a human operator of the ARSDT system, based on previous queries by other users, etc.) and use such stored responses when such new queries are received. In addition, in the illustrated embodiment, the determination of encoded domain information in FIGS. 5 and 6A-6B is illustrated as being performed separately from the use of such information in FIG. 7, although in other embodiments such activities may be performed in other manners, including to dynamically perform some or all of the activities of FIGS. 5, 6A-6B and 7 in response to a received user query or other corresponding instruction.

The illustrated embodiment of the routine 700 begins in block 705, where a query is received corresponding to a target domain or other target content area. In block 707, the routine then determines if the query is for source information and/or confidence value information (e.g., additional source information and/or confidence value information for previously provided repair status data), and if not continues to block 710. In block 710, the routine then generates an encoded version of the query in a format corresponding to one or more databases in use (e.g., in a language-independent manner, such as by identifying and using defined information corresponding to a database schema for such a database), optionally determines the language for the query, and determines a target domain to use for the query if not indicated in the information received in block 705 (e.g., based on an analysis of the content of the query), although in other embodiments such a query may instead be compared to information for multiple domains (e.g., all domains for which encoded information is available). In block 715, the routine then retrieves processed and encoded information for the target domain (e.g., encoded data groups and any additional/expanded information, etc.), such as including tracked source information and/or determined confidence values for some or all retrieved data groups, and by performing one or more corresponding queries on one or more such databases, although in other embodiments may instead dynamically generate such information (e.g., if the user query corresponds to a new target domain for which previously stored information is not available, if updates to the underlying information for the target domain are available but not yet analyzed, etc.).

In block 730, the routine then determines one or more candidate data groups that match the query(ies), such as some or all results of performing the query(ies). In block 740, the routine then optionally translates one or both of the query and the candidate data groups into a common language, such as if the multiple candidate data groups are in different languages and/or if the query is in a different language from one or more of the candidate data groups. In block 750, the routine then determines a response to the query from the candidate data groups, such as all of the candidate data groups, by analyzing the candidate data groups (including any associated expanded information) to select one or more of the candidate data groups (or subsets of one or some or all of the candidate data groups) that are determined to best match the query, etc. In block 760, the routine then optionally translates the determined response into an indicated language, such as the language of the query if some or all of the determined response is in a different language.

If it is instead determined in block 707 that the received query is for source information and/or confidence value information, the routine continues to block 770 to receive an indication of the source information and/or confidence value information to provide (e.g., a link to or other indication of one or more graph nodes in a source tracking and confidence determination graph, such as previously provided with one or more corresponding encoded data groups and selected by a user to obtain additional information), and to use the indicated information to retrieve additional source information and/or confidence value information of the requested type—in at least some embodiments and situations, the retrieval of the requested information may include accessing one or more graph nodes (and/or associated graph edges to and/or from the one or more graph nodes) and retrieving information stored in them, such as to provide source information that includes a chain of processing to produce target status data associated with the requested source information and/or confidence value information (e.g., information about how the confidence value determination was performed, including any aging or other changes after initial determination).

After blocks 760 or 770, the routine continues to block 785 to store the determined response information for later use, and to provide that determined information to the requester that initiated invocation of the routine 700. After block 785, the routine continues to block 799 and ends.

Figure 8:
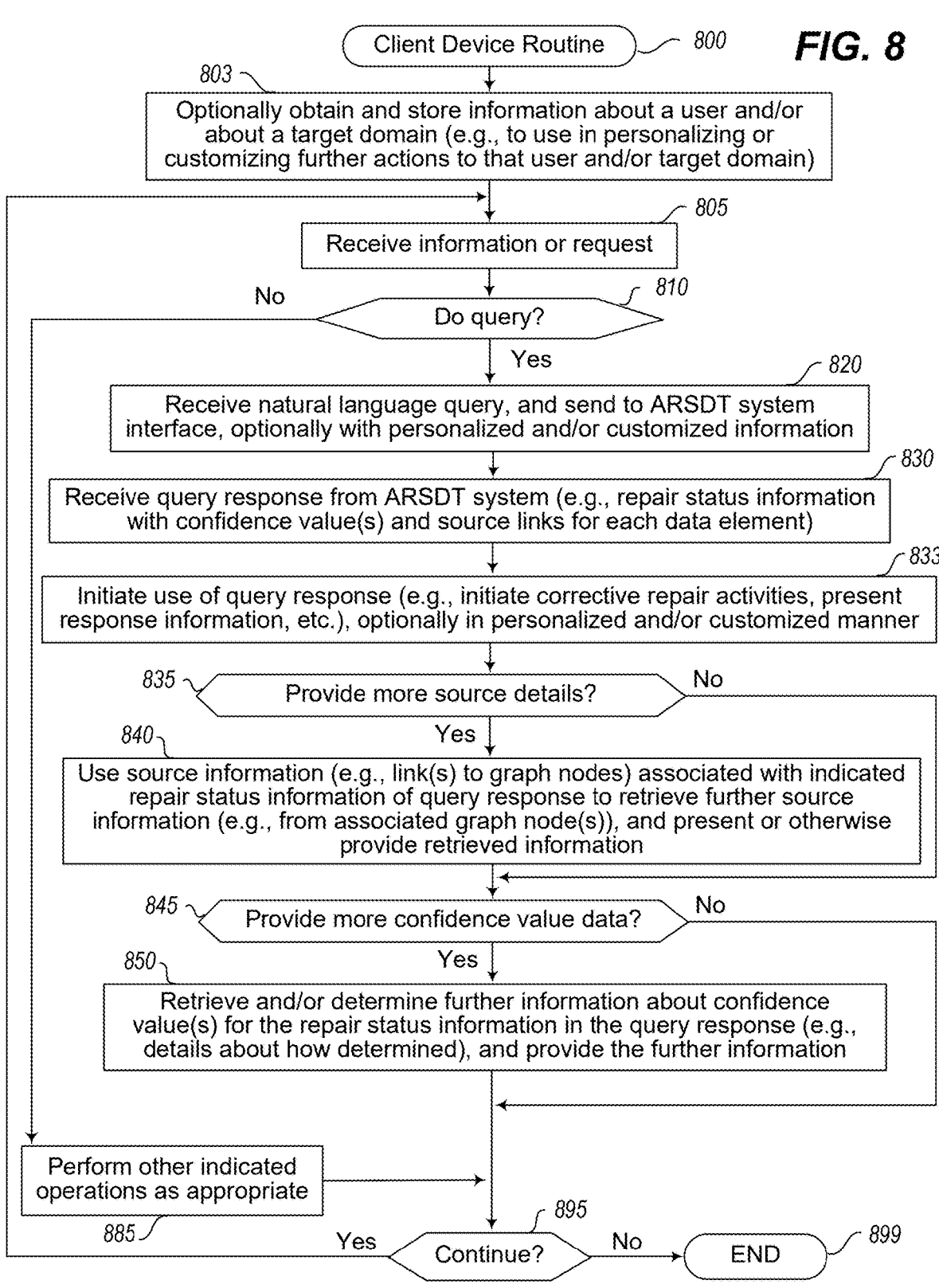
FIG. 8 illustrates a flow diagram of an example embodiment of a client device routine.

FIG. 8 is a flow diagram of an example embodiment of a client device routine 800. The routine may be provided by, for example, operations of a client computing device 110 of FIGS. 1A-1B and/or a client computing device 110 of FIG. 3 and/or with respect to corresponding functionality discussed with respect to FIGS. 2A-2I and elsewhere herein, such as to interact with users or other entities who submit queries (or other information) to the ARSDT system, to receive responses (or other information) from the ARSDT system, and to use the received information in one or more manners (e.g., to automatically implement corrective repair activities in accordance with a received response that includes corresponding executable instructions; to otherwise assist in initiating corrective or preventative repair activities in accordance with a received response that includes corresponding information, such as by displaying or otherwise presenting at least some such information to one or more users to enable them to perform at least some of the corresponding activities; to otherwise assist in providing information from the determined response to one or more users or other requesting entities; etc.).

The illustrated embodiment of the routine 800 begins at block 803, where information is optionally obtained and stored about the user and/or about a target domain, such as for later use in personalizing or otherwise customizing further actions to that user and/or that target domain. The routine then continues to block 805, where information or a request is received. In block 810, the routine determines if the information or request received in block 805 is to perform a query, and if not continues to block 885. Otherwise, the routine continues to block 820, where it receives the query in a natural language format (e.g., freeform text), and sends a query to the ARSDT system interface to obtain a corresponding response, optionally after personalizing and/or customizing the information to be provided to the ARSDT system (e.g., to add information specific to the user, such as location, demographic information, preference information, etc.; to add an indication of one or more specific target domains to use; etc.). In block 830, the routine then receives a response to the query from the ARSDT system, such as to include repair status information or other information along with corresponding source information (e.g., links to or other indications of particular source tracking and confidence determination graph nodes). In block 833, the routine then initiates use of the received query response information, such as to initiate automated repair activities, to display or otherwise present response information to the user, etc., including to optionally perform such use in a personalized and/or customized manner (e.g., to perform a display or other presentation in accordance with preference information for the user, to select a type of action to take based on information specific to the user, etc.). It will be appreciated that, while the routine indicates proceeding to block 830 immediately after block 825, in other embodiments the routine may operate in an asynchronous manner such that other operations are performed (e.g., corresponding to handling another set of instructions or information that are received in block 805, such as from a different user or other entity) while waiting for a response from block 825, and that the operations of block 825 may be performed in a substantially immediate manner (e.g., less than one second, less than 10 seconds, less than one minute, etc.) in at least some embodiments.

After block 833, the routine continues to block 835 to determine whether to provide more source information details, such as for the repair status data provided in block 833 and by waiting to determine if a corresponding request is received using that provided repair status data (e.g., to determine if a link or other indication of one or more graph nodes that was previously provided is selected by the user), and if so continues to block 840 to use the previously provided source information to retrieve further source information (e.g., from one or more indicated graph nodes) that is then presented or otherwise provided. After block 840, or if it is instead determined in block 835 that more source information details were not requested, the routine continues to block 845 to determine whether to provide more confidence value information, such as for the repair status data provided in block 833 and by waiting to determine if a corresponding request is received using that provided repair status data (e.g., to determine if a link or other indication of one or more graph nodes or other sources of confidence value information is selected by the user), and if so continues to block 850 to use the previously provided confidence value information to retrieve further confidence value information (e.g., from one or more indicated graph nodes) that is then presented or otherwise provided. After block 850, or if it is instead determined in block 845 that there is not a request for further confidence value information, the routine continues to block 895.

In block 885, the routine instead performs one or more other indicated operations as appropriate, with non-exclusive examples including sending information to the ARSDT system of other types (e.g., status information about a new target domain for which to summarize and encode information before corresponding user queries are received, information to be processed for an indicated target domain, etc.), receiving and responding to requests for information about previous user queries and/or corresponding responses for a current user and/or client device, receiving and store information for later use in personalization and/or customization activities, receiving and responding to indications of one or more housekeeping activities to perform, etc. After block 885, the routine continues to block 895.

In block 895, the routine determines whether to continue, such as until an explicit indication to terminate is received (or alternatively only if an explicit indication to continue is received). If it is determined to continue, the routine returns to block 805, and if not continues to block 899 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

encoding, by one or more computing systems, and from multiple documents that are from multiple sources and that include data represented in multiple data formats including structured data and unstructured data, repair status information that indicates multiple types of repair and maintenance actions performed for a plurality of devices, including:

separating, by the one or more computing systems, content from the multiple documents into a plurality of data groupings each including a subset of the repair status information that is about an indicated performed repair or maintenance action and that uses one of the multiple data formats;

generating, by the one or more computing systems, multiple encoded data groups to represent the repair status information, wherein each of the multiple encoded data groups is associated with one of the plurality of data groupings and specifies data items of multiple types about the indicated repair or maintenance action for that associated one data grouping in a common format, and wherein the generating of the multiple encoded data groups includes, by the one or more computing systems:

determining, for each of the plurality of data groupings, a type of the indicated repair or maintenance action for that data grouping, including, for each data grouping in a subset of the plurality having a data format that does not include structured data, performing one or more analysis steps on identified data of that data grouping for the determining of the type of the indicated repair or maintenance action for that data grouping, and further including, for each data grouping in the plurality having a data format that does include structured data, using a structure of that data grouping for the determining of the type of the indicated repair or maintenance action for that data grouping;

determining, for each of the plurality of data groupings, source information for that data grouping that includes at least some of the content of one of the multiple documents that provides that data grouping, and that further includes, for each data grouping in the subset of the plurality having a data format that does not include structured data, information about the performing of the one or more analysis steps on the identified data of that data grouping;

determining, for each of the plurality of data groupings, one or more confidence values for that data grouping that are based at least in part on the source information for that data grouping, and that, for each data grouping in the subset of the plurality having a data format that does not include structured data, are further based in part on results from the performing of the one or more analysis steps on the identified data of that data grouping;

generating a source tracking graph that represents at least some of the determined source information for each of the plurality of data groupings, including, for each of the plurality of data groupings, generating a first node in the graph for that data grouping, and further including, if that data grouping is in the subset of the plurality having a data format that does not include structured data, generating one or more second nodes in the graph each representing one of the one or more analysis steps for that data grouping, and further generating at least one third node each representing at least one of the results from the performing of the one or more analysis steps on the identified data of that data grouping, and further generating edges between pairs of nodes in the graph to each represent data flow between the nodes of that pair, and wherein at least one node generated for data grouping includes at least one of the determined one or more confidence values for that data grouping; and generating, for each of the plurality of data group-
ings, the associated encoded data group for that
data grouping in the common format and to
include at least the determined type of the indi-
cated repair or maintenance action for that data
grouping, and one or more indications of the
determined source information for that data
grouping, and the determined one or more confi-
dence values for that data grouping, wherein the
one or more indications of the determined source
information for that data grouping include one or
more links to one or more nodes of the one or
more source tracking graphs that are generated for
that data grouping; and storing, by the one or more computing systems and for
each of the plurality of data groupings, the generated
associated encoded data group for that data grouping
in the common format for subsequent use;

generating, by the one or more computing systems, one or
more additional encoded data groups in the common
format based at least in part on the multiple encoded
data groups and storing the generated one or more
additional encoded data groups for subsequent use,
including, for each of the one or more additional
encoded data groups and by the one or more computing
systems;

identifying, for an additional type of data that is related
to at least one of an additional repair or maintenance
action and that is not included in the multiple docu-
ments, one or more of the stored encoded data groups
having one or more data items that affect the addi-
tional type of data;

calculating the additional type of data using at least the
one or more data items in each of the identified one
or more encoded data groups, and determining one
or more additional confidence values for the calcu-
lated additional type of data based at least in part on
the one or more confidence values included in each
of the identified one or more encoded data groups;
and generating that additional encoded data group in the
common format and to include at least the calculated
additional type of data related to the at least one of
the additional repair or maintenance action, and an
indication of source information including at least
the identified one or more encoded data groups, and
the determined one or more additional confidence
values;

providing, by the one or more computing systems and in
response to a received query about at least one of the
plurality of devices, repair and maintenance action
information for the at least one device, including:

identifying, by the one or more computing systems, one
or more stored encoded data groups as candidates
that match the graph database query, wherein the one
or more stored encoded data groups are a subset of
the multiple encoded data groups and the additional
encoded data groups, the one or more stored encoded
data groups including at least one of the additional
encoded data groups and each having repair or
maintenance information for the at least one device;
and generating, by the one or more computing systems and
using at least one stored encoded data group of the
one or more stored encoded data groups, the
response information to include at least the repair or
maintenance information for the at least one device from each of the at least one stored encoded data
groups, and to include indicated source information
for each of the at least one stored encoded data
groups, and to include one or more determined
confidence values for each of the at least one stored
encoded data groups; and providing, by the one or more computing systems and
after the providing of the repair and maintenance action
information for the at least one device, additional
related information including:

providing, by the one or more computing systems and
in response to a selection of included indicated
source information for one of the at least one stored
encoded data groups, additional information about
one or more sources for one or more data items
included in that one stored encoded data group by
using the one or more links that are to the one or
more nodes of the source tracking graph and that are
included in the indicated source information for that
one stored encoded data group; and providing, by the one or more computing systems and
in response to a selection of one or more included
confidence values for one of the at least one stored
encoded data groups, additional information about
determining of the one or more included confidence
values from one or more nodes of the source tracking
graph associated with that one stored encoded data
group.

2. The computer-implemented method of claim 1 further
comprising, in response to the received query, determining,
by the one or more computing systems, executable instruc-
tions to automatically implement further repair or mainte-
nance actions for the at least one device, including trans-
mitting the executable instructions to the at least one device
and initiating execution of the executable instructions on the
at least one device to cause automatic implementation of the
further repair or maintenance actions for the at least one
device.

3. A computer-implemented method comprising:

encoding, by one or more computing systems, and from
multiple documents that are from multiple sources and
that include data represented in multiple data formats,
repair status information that indicates at least one of
performed repair or maintenance actions using both
structured data and unstructured data, including:

separating, by the one or more computing systems, the
repair status information into a plurality of data
groupings each including a subset of the repair status
information that is about an indicated performed
repair or maintenance action and that includes one of
structured data or unstructured data;

generating, by the one or more computing systems,
multiple encoded data groups in a common format to
represent the repair status information, wherein each
of the multiple encoded data groups is associated
with one of the plurality of data groupings and
specifies data items of multiple types about the
indicated performed repair or maintenance action for
that associated one data grouping, the generating of
the multiple encoded data groups including, by the
one or more computing systems:

analyzing, for each of the plurality of data groupings,
the subset of the repair status information for that
data grouping to produce results including at least
a category of the indicated repair or maintenance
action for that data grouping, including, for each
data grouping in a subset of the plurality that does not include structured data, performing one or more analysis steps on identified data of that data grouping to produce the results for that data grouping, and further including, for each other data grouping in the plurality that does include structured data, using a structure of the structured data of that data grouping to produce the results for that data grouping, and wherein the produced results for each of at least some of the plurality of data groupings further include a status resulting from the indicated repair or maintenance action for that data grouping;

determining, for each of the plurality of data groupings, source information for that data grouping that includes at least some of the repair status information in one of the multiple documents that provides that data grouping, and that further includes, for each data grouping in the subset of the plurality that does not include structured data, information about the performing of the one or more analysis steps on the identified data of that data grouping;

determining, for each of the plurality of data groupings, one or more confidence values for that data grouping that are based at least in part on the source information for that data grouping, and that, for each data grouping in the subset of the plurality that does not include structured data, are further based in part on the produced results for that data grouping;

generating one or more source tracking graphs that represent at least some of the determined source information for each of the plurality of data groupings, including, for each of the plurality of data groupings, generating one or more first graph nodes for that data grouping to represent the produced results for that data grouping, and further including, if that data grouping is in the subset of the plurality that does not include structured data, generating one or more second graph nodes each representing one of the one or more analysis steps for that data grouping, and generating edges between pairs of graph nodes to each represent data flow between the graph nodes of that pair corresponding to the performing of the one or more analysis steps for that data grouping, and wherein at least one graph node generated for data grouping includes at least one of the determined one or more confidence values for that data grouping; and storing, by the one or more computing systems and for each of the plurality of data groupings, the generated associated encoded data group for that data grouping in the common format, including adding the category of the indicated repair or maintenance action for that data grouping as one of the data items for that associated encoded data group, and adding one or more additional data items of that associated encoded data group having indicated source information for that data grouping including indications of one or more graph nodes of the one or more source tracking graphs that are generated for that data grouping, and adding the determined one or more confidence values for that data grouping as one or more of the data items of that associated encoded data group, and further adding, for each of the at least some data groupings, the status resulting from the indicated repair or maintenance action for that data grouping as one of the data items for that associated encoded data group;

storing, by the one or more computing systems, one or more additional encoded data groups in the common format that are generated based at least in part on the multiple encoded data groups, including, for each of the one or more additional encoded data groups and by the one or more computing systems:

identifying, for an additional type of repair or maintenance data not included in the multiple documents, one or more of the stored encoded data groups each having one or more data items that affect the additional type of repair or maintenance data;

calculating, using at least the one or more data items in each of the identified one or more stored encoded data groups as input, the additional type of repair or maintenance data, and determining an additional confidence value for the calculated additional type of repair or maintenance data based at least in part on confidence values included in the identified one or more encoded data groups; and generating that additional encoded data group in the common format and to include multiple data items including at least the calculated additional type of repair or maintenance data, and an indication of source information including at least the identified one or more encoded data groups, and the determined additional confidence value; and providing, by the one or more computing systems and in response to a received query about indicated repair or maintenance data, response information for the received query, including:

identifying, by the one or more computing systems and from the multiple encoded data groups and the additional one or more encoded data groups, one or more stored encoded data groups that match the query and that include at least one additional encoded data group; and generating, by the one or more computing systems, the response information to include the indicated repair or maintenance data from the identified one or more stored encoded data groups, and to include indicated source information from the identified one or more stored encoded data groups, and to include one or more confidence values from the identified one or more stored encoded data groups.

4. The computer-implemented method of claim 3 wherein the repair status information from the multiple documents indicates at least one of performed repair or maintenance actions for at least one device, wherein the received query relates to one device of the at least one device, and wherein the method further comprises, in response to the received query, determining, by the one or more computing systems, executable instructions to automatically implement further repair or maintenance actions for the one device, including transmitting the executable instructions to the one device and initiating execution of the executable instructions on the one device to cause automatic implementation of the further repair or maintenance actions for the one device.

5. The computer-implemented method of claim 3 further comprising, after the providing of the response information:

receiving, by the one or more computing systems, a selection of indicated source information that is included in the response information from one of the identified one or more stored encoded data groups; and providing, by the one or more computing systems and in response to the selection, additional information about one or more sources for one or more data items included in that one stored encoded data group by retrieving the additional information from the one or more nodes of the source tracking graph that are indicated in the selected indicated source information.

6. The computer-implemented method of claim 3 further comprising, after the providing of the response information:

receiving, by the one or more computing systems, a selection of one or more confidence values that are included in the response information from one of the identified one or more stored encoded data groups; and providing, by the one or more computing systems and in response to the selection, additional information about determining of the selected one or more confidence values from one or more graph nodes of the one or more source tracking graphs that are associated with that one stored encoded data group.

7. A non-transitory computer-readable medium having stored contents that cause one or more computing systems to perform automated operations, the automated operations including at least:

encoding, by the one or more computing systems and from one or more documents that are from one or more sources and have repair status information represented as unstructured data, the repair status information into multiple encoded data groups, including:

separating, by the one or more computing systems, the repair status information into a plurality of data groupings each including distinct repair or maintenance data; and generating, by the one or more computing systems, the multiple encoded data groups to represent the repair status information, each encoded data group being associated with one of the plurality of data groupings and including data items of multiple types, the generating including, by the one or more computing systems:

determining the data items of the multiple types for each of the multiple encoded data groups, including, for each of at least some data groupings of the plurality each having unstructured data, performing one or more analysis steps on the repair or maintenance data of that data grouping to produce results that include a categorization of the repair and maintenance data and that are used as one or more of the data items of the multiple types for the associated encoded data group for that data grouping, and including determining at least one additional data item of those data items to include determined source information for the produced results indicating at least some of the repair status information providing that data grouping, and further including determining at least one further data item of those data items to include one or more determined confidence values for the produced results that are based at least in part on the source information for the produced results and on the performing of the one or more analysis steps; and storing, for each of the plurality of data groupings, the associated encoded data group for that data grouping to include the data items of the multiple types for that encoded data group;

storing, by the one or more computing systems, one or more additional encoded data groups that are generated based at least in part on the multiple encoded data groups, including, for each of the one or more additional encoded data groups and by the one or more computing systems:

identifying, for an additional type of repair or maintenance data not included in the multiple documents, one or more of the stored encoded data groups each having one or more data items that affect the additional type of repair or maintenance data;

calculating, using at least the one or more data items in each of the identified one or more stored encoded data groups as input, the additional type of repair or maintenance data, and determining an additional confidence value for the calculated additional type of repair or maintenance data based at least in part on confidence values included in the identified one or more encoded data groups; and generating that additional encoded data group to include multiple data items including at least the calculated additional type of repair or maintenance data, and an indication of source information including at least the identified one or more encoded data groups, and the determined additional confidence value; and providing, by the one or more computing systems and in response to a received query about indicated repair or maintenance data, response information for the received query, including:

identifying, by the one or more computing systems and from the multiple encoded data groups and the additional one or more encoded data groups, one or more stored encoded data groups that match the query and that include at least one additional encoded data group; and generating, by the one or more computing systems, the response information to include the indicated repair or maintenance data from the identified one or more stored encoded data groups, and to include indicated source information from the identified one or more stored encoded data groups, and to include one or more confidence values from the identified one or more stored encoded data groups.

8. The non-transitory computer-readable medium of claim 7 wherein the repair status information from the one or more documents indicates at least one of performed repair or maintenance actions for at least one device, wherein the received query relates to one device of the at least one device, and wherein the automated operations further include, in response to the received query, determining executable instructions to automatically implement further repair or maintenance actions for the one device, including transmitting the executable instructions to the one device and initiating execution of the executable instructions on the one device to cause automatic implementation of the further repair or maintenance actions for the one device.

9. The non-transitory computer-readable medium of claim 7 wherein the stored contents include software instructions that, when executed by the one or more computing systems, cause the one or more computing systems to perform further automated operations including:

generating a source tracking graph that represents at least the determined source information for the produced results for the at least some data groupings, including, for each of the at least some data groupings, generating nodes in the source tracking graph that represent the one or more analysis steps for that data grouping and that represent the produced results for that data grouping, and further generating edges in the source tracking graph between pairs of those generated nodes to each represent data flow between the nodes of that pair corresponding to the performing of the one or more analysis steps for that data grouping, wherein at least one of those generated nodes includes at least one of the determined one or more confidence values for that data grouping, and wherein the storing of the associated encoded data group for each of the plurality of data groupings includes using, for each of the at least some data groupings, information about at least one of the generated nodes in the source tracking graph for that data grouping as part of the at least one additional data item including source information for that encoded data group.

10. The non-transitory computer-readable medium of claim 7 wherein the repair status information is in multiple documents that are from multiple sources and that include both structured and unstructured data about at least one of repair or maintenance actions, wherein the plurality of data groupings include the at least some data groupings each having unstructured data and further include additional data groupings each having structured data, wherein the determining of the data items of the multiple types for each of the multiple encoded data groups further includes, for each of the additional data groupings each having structured data, using a structure of the structured data for that additional data grouping to extract information about a repair or maintenance action that is used as one or more of the data items of the multiple types for the associated encoded data group for that additional data grouping, and including determining at least one additional data item of those data items to include determined source information for the extracted information indicating at least some of the repair status information providing that additional data grouping, and further including determining at least one further data item of those data items to include one or more determined confidence values for the extracted information that are based at least in part on the source information for the produced results, wherein the storing of the associated encoded data groups for the plurality of data groupings includes storing the associated encoded data groups in a common format, and wherein the generating of the response information further involves, for each of one or more additional identified encoded data groups that match the query and are each associated with one of the additional data groupings, including in the generated response information at least some of the data items of the multiple types for that additional identified encoded data group, including the source information for that additional identified encoded data group, and including the determined one or more confidence values for each of the at least one stored encoded data groups.

11. A system comprising:

one or more hardware processors of one or more computing systems; and one or more memories with stored instructions that, when executed by at least one of the one or more hardware processors, cause the one or more computing systems to perform automated operations including at least:

encoding, from one or more documents that are from one or more sources and have repair status information represented as unstructured data, the repair status information into multiple encoded data groups, including:

separating the repair status information into a plurality of data groupings each including distinct repair or maintenance data; and generating the multiple encoded data groups to represent the repair status information, each encoded data group being associated with one of the plurality of data groupings and including data items of multiple types, the generating including:

determining the data items of the multiple types for each of the multiple encoded data groups, including, for each of at least some data groupings of the plurality each having unstructured data, performing one or more analysis steps on the repair or maintenance data of that data grouping to produce results that include a categorization of the repair and maintenance data and that are used as one or more of the data items of the multiple types for the associated encoded data group for that data grouping, and including determining at least one additional data item of those data items to include determined source information for the produced results indicating at least some of the repair status information providing that data grouping, and further including determining at least one further data item of those data items to include one or more determined confidence values for the produced results that are based at least in part on the source information for the produced results and on the performing of the one or more analysis steps;

generating a source tracking graph that represents at least the determined source information for the produced results for the at least some data groupings, including, for each of the at least some data groupings, generating nodes in the source tracking graph that represent the one or more analysis steps for that data grouping and that represent the produced results for that data grouping, and further generating edges in the source tracking graph between pairs of those generated nodes to each represent data flow between the nodes of that pair corresponding to the performing of the one or more analysis steps for that data grouping, wherein at least one of those generated nodes includes at least one of the determined one or more confidence values for that data grouping; and storing, for each of the plurality of data groupings, the associated encoded data group for that data grouping to include the data items of the multiple types for that encoded data group, including using, for each of the at least some data groupings, information about at least one of the generated nodes in the source tracking graph for that data grouping as part of the at least one additional data item including source information for that encoded data group; and providing, in response to a received query about a specified type of repair or maintenance data, response information for the received query, including:

identifying one or more of the stored encoded data groups that match the query and are each associated with one of the at least some data groupings; and generating the response information to include, for each of the identified one or more encoded data groups, at least some of the data items of the multiple types for that encoded data group, including the source information for that encoded data group, and including the determined one or more confidence values for that encoded data group.

12. The system of claim 11 wherein the repair status information from the one or more documents indicates at least one of performed repair or maintenance actions for at least one device, wherein the received query relates to one device of the at least one device, and wherein the automated operations further include, in response to the received query, determining executable instructions to automatically implement further repair or maintenance actions for the one device, including transmitting the executable instructions to the one device and initiating execution of the executable instructions on the one device to cause automatic implementation of the further repair or maintenance actions for the one device.

13. The system of claim 11 wherein the stored instructions include software instructions that, when executed by the one or more computing systems, cause the one or more computing systems to perform further automated operations including:

generating one or more additional encoded data groups based at least in part on the multiple encoded data groups, including, for each of the one or more additional encoded data groups;

identifying, for an additional type of repair or maintenance data not included in the repair status information of the one or more documents, one or more of the stored encoded data groups each having one or more data items that affect the additional type of repair or maintenance data;

calculating, using at least the one or more data items in each of the identified one or more stored encoded data groups as input, the additional type of repair or maintenance data, and determining an additional confidence value for the calculated additional type of repair or maintenance data based at least in part on confidence values included in the identified one or more encoded data groups; and storing that additional encoded data group to include multiple data items including at least the calculated additional type of repair or maintenance data, and an indication of source information including at least the identified one or more encoded data groups, and the determined additional confidence value, and wherein the generating of the response information further includes, for each of at least one of the additional encoded data groups identified as matching the query, including in the generated response information at least some of the data items of each of the at least one additional encoded data groups, including the source information for that additional encoded data group, and including the determined additional confidence value for that encoded data group.

14. The system of claim 13 wherein the generating of one of the one or more additional encoded data groups further includes determining, for the additional type of repair or maintenance data for that one additional encoded data group, that a change has occurred in the one or more data items of the identified one or more encoded data groups for that one additional encoded data group since a prior calculation of the indicated additional type of repair or maintenance data, and performing the calculating and the storing for that one additional encoded data group in response to the determining that the change has occurred.

15. The system of claim 13 wherein the generating of one of the one or more additional encoded data groups further includes determining, for the additional type of repair or maintenance data for that one additional encoded data group, that a determined additional confidence value from a prior calculation of the indicated additional type of repair or maintenance data is below a defined threshold, and performing at least the calculating and the storing for that one additional encoded data group in response to the determining that the determined additional confidence value from the prior calculation is below the defined threshold.

16. The system of claim 11 wherein the repair status information is in multiple documents that are from multiple sources and in multiple formats and include both structured and unstructured data about at least one of repair or maintenance actions, wherein the plurality of data groupings include the at least some data groupings each having unstructured data and further include additional data groupings each having structured data, wherein the determining of the data items of the multiple types for each of the multiple encoded data groups further includes, for each of the additional data groupings each having structured data, using a structure of the structured data for that additional data grouping to extract information about a repair or maintenance action that is used as one or more of the data items of the multiple types for the associated encoded data group for that additional data grouping, and including determining at least one additional data item of those data items to include determined source information for the extracted information indicating at least some of the repair status information providing that additional data grouping, and further including determining at least one further data item of those data items to include one or more determined confidence values for the extracted information that are based at least in part on the source information for the produced results, wherein the generating of the source tracking graph further includes, each of the additional data groupings each having structured data, generating at least one additional node in the source tracking graph that represents the extracted information for that additional data grouping, wherein at least one of those generated at least one additional nodes includes at least one of the determined one or more confidence values for that additional data grouping, wherein the storing of the associated encoded data groups for the plurality of data groupings includes storing the associated encoded data groups in a common format, and wherein the generating of the response information further involves, for each of one or more additional identified encoded data groups that match the query and are each associated with one of the additional data groupings, including in the generated response information at least some of the data items of the multiple types for that additional identified encoded data group, including the source information for that additional identified encoded data group, and including the determined one or more confidence values for each of the at least one stored encoded data groups.

17. The system of claim 11 wherein the encoding of the repair status information into the multiple encoded data groups occurs at a first time, and wherein the automated operations further include determining, as a second time that is an amount of time after the first time exceeding a defined amount-of-time threshold, reducing at least one of the confidence values included in each of one or more of the stored multiple encoded data groups based on the amount of time after the first time.

18. The system of claim 11 wherein the repair or maintenance data included in each of one or more of the plurality of data groupings includes indications of a category of repair or maintenance action, an entity associated with performing of an instance of that category of repair or maintenance action, and an assertion regarding the performing of the instance of that category of repair or maintenance action, wherein the produced results for each of the one or more data groupings include the categorization of the repair and maintenance data and include a code associated with that categorization of the repair and maintenance data and include an identification of the entity and include an identification of the assertion, and wherein the determined one or more confidence values in the encoded data group for each of the one or more data groupings includes a first confidence value associated with accuracy of the code for that data grouping, and a second confidence value associated with accuracy of the identification of the entity for that data grouping, and a third confidence value associated with accuracy of the identification of the assertion for that data grouping.

19. The system of claim 11 wherein the repair status information includes medical data that is related to at least one medical patient and that includes structured data and unstructured data about actions to at least one of treat or prevent health issues of the at least one medical patient, wherein the categorization of the repair or maintenance data for each of at least some of the plurality of data encodings includes a medical code associated with at least one of a disease or a symptom or a procedure, wherein the structured data includes medical test results, and wherein the unstructured data includes medical appointment notes.

20. The system of claim 19 wherein the medical data further relates to multiple medical patients and the multiple encoded data groups include one or more encoded data groups for each of the multiple medical patients, wherein the received query includes an indication of one of the medical patients, and wherein the identified one or more stored encoded data groups that match the query are each associated with the one medical patient.

* * * * *